(12) United States Patent
Kobayashi et al.

(10) Patent No.: US 8,917,222 B2
(45) Date of Patent: Dec. 23, 2014

(54) DISPLAY DEVICE AND VIDEO VIEWING SYSTEM

(75) Inventors: Takahiro Kobayashi, Osaka (JP); Yoshio Umeda, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 599 days.

(21) Appl. No.: 13/336,490

(22) Filed: Dec. 23, 2011

(65) Prior Publication Data
US 2012/0162219 A1    Jun. 28, 2012

(30) Foreign Application Priority Data

Dec. 27, 2010  (JP) ................................. 2010-290202

(51) Int. Cl.
G09G 5/00      (2006.01)
H04N 13/04    (2006.01)
H04N 13/00    (2006.01)

(52) U.S. Cl.
CPC ....... *H04N 13/0438* (2013.01); *H04N 13/0018* (2013.01)
USPC ........ 345/6; 345/8; 345/90; 345/419; 349/13; 348/51

(58) Field of Classification Search
USPC ........ 345/6–8, 87, 90, 204, 214, 419; 349/13, 349/15; 348/51, 55, 56, E13.001
See application file for complete search history.

(56) References Cited

U.S. PATENT DOCUMENTS

| | | | |
|---|---|---|---|
| 6,266,042 B1 * | 7/2001 | Aratani | 345/698 |
| 7,660,487 B2 * | 2/2010 | Kobayashi et al. | 382/299 |
| 2004/0189565 A1 * | 9/2004 | Someya | 345/87 |
| 2007/0109241 A1 * | 5/2007 | Lee et al. | 345/89 |
| 2008/0186393 A1 * | 8/2008 | Lee et al. | 348/301 |
| 2009/0296824 A1 * | 12/2009 | Seo et al. | 375/240.24 |
| 2010/0120471 A1 * | 5/2010 | Uchikawa et al. | 455/566 |
| 2010/0134684 A1 * | 6/2010 | Yamada | 348/553 |
| 2012/0120209 A1 * | 5/2012 | Umeda et al. | 348/54 |
| 2013/0286167 A1 * | 10/2013 | Kobayashi et al. | 348/51 |

FOREIGN PATENT DOCUMENTS

| | | |
|---|---|---|
| JP | 62-133891 | 6/1987 |
| JP | 2009-25436 | 2/2009 |

* cited by examiner

*Primary Examiner* — Joe H Cheng
(74) *Attorney, Agent, or Firm* — Wenderoth, Lind & Ponack, L.L.P.

(57) ABSTRACT

A display device includes: a liquid crystal panel including a display surface on which frame images are displayed; a conversion portion for converting a frame image signal into a first image signal representing an image having a lower resolution and a second image signal representing an image having a higher resolution; and a liquid crystal driver for driving the liquid crystal panel with performing first and second scanning operations of the first and second image signals over pixels of the entire display surface. The liquid crystal driver performs the second scanning operation with targeting a drive luminance value which is set in response to an expected value of an achieved luminance value during the first scanning operation for the pixel of the display surface before the second scanning operation commences, and target luminance value for the pixels defined by the frame image signal.

15 Claims, 34 Drawing Sheets

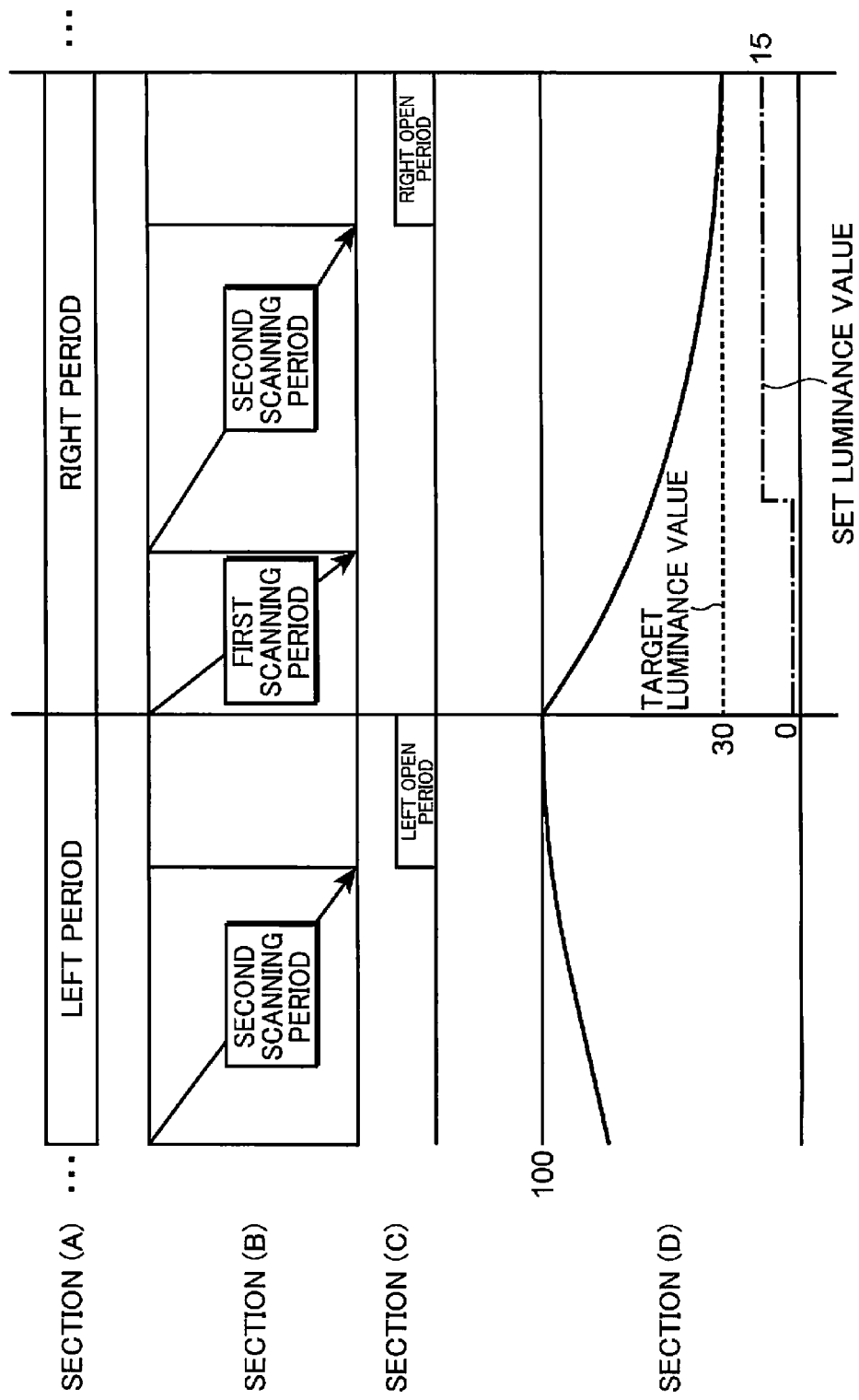

US 8,917,222 B2

DISPLAY DEVICE AND VIDEO VIEWING SYSTEM

TECHNICAL FIELD

The present invention is related to a display device and a video viewing system which display videos.

BACKGROUND OF THE INVENTION

A display device which makes a displayed video stereoscopically perceived alternately displays a left frame image (referred to as L frame image hereinafter) which is viewed by the left eye and a right frame image (referred to as R frame image hereinafter) which is viewed by the right eye, at predetermined intervals (e.g., field intervals). The displayed L and R frame images have contents different from each other by an amount of parallax. A viewer views the L and R frame images through an eyeglass device which has liquid crystal shutters driven in sync with display periods of the L and R frame images (c.f., JP S62-133891 A and JP 2009-25436 A). Thus, the viewer stereoscopically perceives objects rendered in the L and R frame images.

FIG. 32 is a block diagram showing a conventional video viewing system. The video viewing system depicted in FIG. 32 receives video signals (a left video signal and a right video signal) of 60 Hz.

The video viewing system 900 includes a video signal processor 901 which receives the video signal (the left and right video signals) of 60 Hz. The video signal processor 901 converts the input video signal into the left video signal and the right video signal of 120 Hz. The converted left and right video signals are output to a liquid crystal driver 902 and a backlight controller 903. The liquid crystal driver 902 converts the left and right video signals of 120 Hz into a video display format of a liquid crystal panel 904. The left and right video signals obtained through the conversion by the liquid crystal driver 902 are output to the liquid crystal panel 904. The backlight controller 903 outputs an emission control signal to a backlight source 905. The backlight source 905 irradiates light onto the liquid crystal panel 904 in response to the emission control signal (i.e., the backlight source 905 irradiates the back surface of the liquid crystal panel 904 with light). Thus, the L and R frame images are alternately displayed on the liquid crystal panel 904 at 120 Hz.

The eyeglass device 950 has a left shutter 951 and a right shutter 952. In response to the left and right video signals of 120 Hz obtained through the conversion by the video signal processor 901, a shutter control circuit 906 for the left shutter 951 and a shutter control circuit 907 for the right shutter 952 control the left and right shutters 951, 952 in sync with the left and right video signals.

FIG. 33 is a control timing chart of the conventional video viewing system 900. In FIG. 33, the section (A) shows scanning timings for the L and R frame images of the liquid crystal panel 904. The section (B) of FIG. 33 shows a lighting timing of the backlight source 905. The section (C) of FIG. 33 shows opening and closing timings of the shutters 951, 952 of the eyeglass device 950. The conventional video viewing system 900 is described with reference to FIGS. 32 and 33.

The left and right video signals are sequentially written into the liquid crystal panel 904. Meanwhile, the backlight source 905 is always on. The shutter control circuits 906, 907 control the shutters 951, 952. After the liquid crystal panel 904 is scanned so that the left and right video signals are alternately written into the liquid crystal panel 904, the shutters 951, 952 are opened and closed under the control of the shutter control circuits 906, 907 so that an open period of each shutter becomes the half of each video period. The L and R frame images are viewed by the left and right eyes of the viewer through the shutters 951, 952, respectively. As a result, the viewer creates optical stereoscopic images in the brain.

In the video viewing system which operates at the control timings shown in FIG. 33, the viewer views the L or R frame image only while the shutter 951, 952 is open (for a period long enough to view a video required for the creation of the stereoscopic images). Meanwhile, even in a period other than the period while the shutter 951, 952 is open, the backlight source 905 is always on. Therefore, the video viewing system which operates at the control timings shown in FIG. 33 is not preferable in terms of electric power saving.

FIG. 34 is another control timing chart for the conventional video viewing system 900. In FIG. 34, the section (A) shows scanning timings of the liquid crystal panel 904 for the L and R frame images. The section (B) of FIG. 34 shows a lighting timing of the backlight source 905. The section (C) of FIG. 34 shows opening and closing timings of the shutters 951, 952 of the eyeglass device 950. The conventional video viewing system 900 is further described with reference to FIGS. 32 to 34.

JP 2009-25436 A discloses control under which the backlight source 905 is on only while the L or R frame image is viewed. Unlike the control shown in FIG. 33, the backlight source 905 in the control depicted in FIG. 34 emits light only while the L or R frame image is viewed. Therefore, the control shown in FIG. 34 is superior to the control depicted in FIG. 33 in terms of the electric power saving.

The left shutter 951 is open after the liquid crystal panel 904 displays an L frame image, which is viewed by the left eye, and before the scanning operation of the right video signal for displaying the R frame image. Likewise, the right shutter 952 is open after the liquid crystal panel 904 displays the R frame image, which is viewed by the right eye, and before the scanning operation of the left video signal for displaying the L frame image.

As shown in FIGS. 33 and 34, the scanning operation of the left and/or right video signals starts from an upper portion of the liquid crystal panel 904. Thus, the scanning operation of the left and/or right video signals at a lower portion of the liquid crystal panel 904 happens after the scanning operation of the left and/or right video signals at the upper portion of the liquid crystal panel 904.

It depends on a type of a displayed video how long it takes for a liquid crystal to respond to the left and/or right video signals. For example, if there is a difference in luminance of a pixel between a preceding frame image and a subsequent frame image, it takes relatively long for the liquid crystal to respond.

If the left or right shutter 951, 952 waits for completion of L or R frame image display to open, there may be a shorter time for an open orientation of the left or right shutter 951, 952 because of the long response time of the liquid crystal. As a result, the viewer perceives dark stereoscopic images displayed on the liquid crystal panel 904.

Unless the left shutter 951 waits for the completion of the L frame image display to open, the viewer views the L frame image which is influenced and mixed by the preceding R frame image display. Likewise, if the right shutter 952 opens without waiting for the completion of the R frame image display, the viewer views the R frame image influenced and mixed by the preceding L frame image display. Such mixture between the L and R frame images is called crosstalk. A mixed amount of the preceding frame image (the L or R frame image) increases, in particular, at a lower position of the liquid crystal panel 904 because of the delayed scanning operation of the left and/or right video signal at the lower portion of the liquid crystal panel 904 and the response time of the liquid crystal. Therefore, it is difficult for the viewer to stereoscopically perceive the frame images displayed at the lower portion of the liquid crystal panel 904.

The aforementioned crosstalk problem becomes noticeable, in particular, in stereoscopic video display in which the L and R frame images rendering different contents from each other by the parallax amount are alternately displayed, although the crosstalk problem is a common problem to two-dimensional videos. If there is a large difference in luminance between the preceding and subsequent frame images in an area, it is likely that the viewer perceives the crosstalk. In particular, if the area where there is the large difference in luminance is scanned at a relatively late timing, it becomes more likely that the viewer perceives the crosstalk.

DISCLOSURE OF THE INVENTION

An object of the present invention is to provide a display device and a video viewing system configured to suppress the crosstalk.

According to one aspect of the present invention, a display device has: a liquid crystal panel including a display surface on which frame images are displayed; a conversion portion configured to convert a frame image signal to display the frame image into a first image signal representing an image having a resolution lower than what the frame image signal represents and a second image signal representing an image having a resolution higher than what the first image signal represents; and a liquid crystal driver configured to drive the liquid crystal panel with performing a first scanning operation of the first image signal and a second scanning operation of the second image signal over pixels of the entire display surface, wherein the liquid crystal driver performs the second scanning operation with targeting a drive luminance value, which is determined in response to an expected value of an achieved luminance value during the first scanning operation for the pixel before the second scanning operation commences and a target luminance value defined for the pixel by the frame image signal.

According to another aspect of the present invention, a video viewing system includes: a display device configured to display a left frame image, which is viewed by a left eye, and a right frame image, which is viewed by a right eye, so as to provide images which are stereoscopically perceived; and an eyeglass device including a left filter, which adjusts a light amount that reaches the left eye so that the left frame image is viewed, and a right filter, which adjusts a light amount that reaches the right eye so that the right frame image is viewed, wherein the display device includes a liquid crystal panel which alternately displays the left and right frame images on a display surface with time, a conversion portion configured to convert a frame image signal to display the left or right frame image into a first image signal representing an image having a resolution lower than what the frame image signal represents and a second image signal representing an image having a resolution higher than what the first image signal represents, and a liquid crystal driver configured to drive the liquid crystal drive panel with performing a first scanning operation of the first image signal and a second scanning operation of the second image signal over pixels of the entire display surface, and the liquid crystal driver performs the second scanning operation with targeting a drive luminance value, which is determined in response to an expected value of an achieved luminance value during the first scanning operation for the pixel before the second scanning operation commences and a target luminance value defined for the pixel by the frame image signal.

The display device and the video viewing system according to the present invention may suppress the crosstalk.

The objects, features and advantages of the present invention become more apparent by the following detailed description and the accompanying drawings.

BRIEF DESCRIPTION OF THE DRAWINGS

FIG. 6 is a conceptual view of an overdrive process;

DETAILED DESCRIPTION OF THE INVENTION

Figure 1:
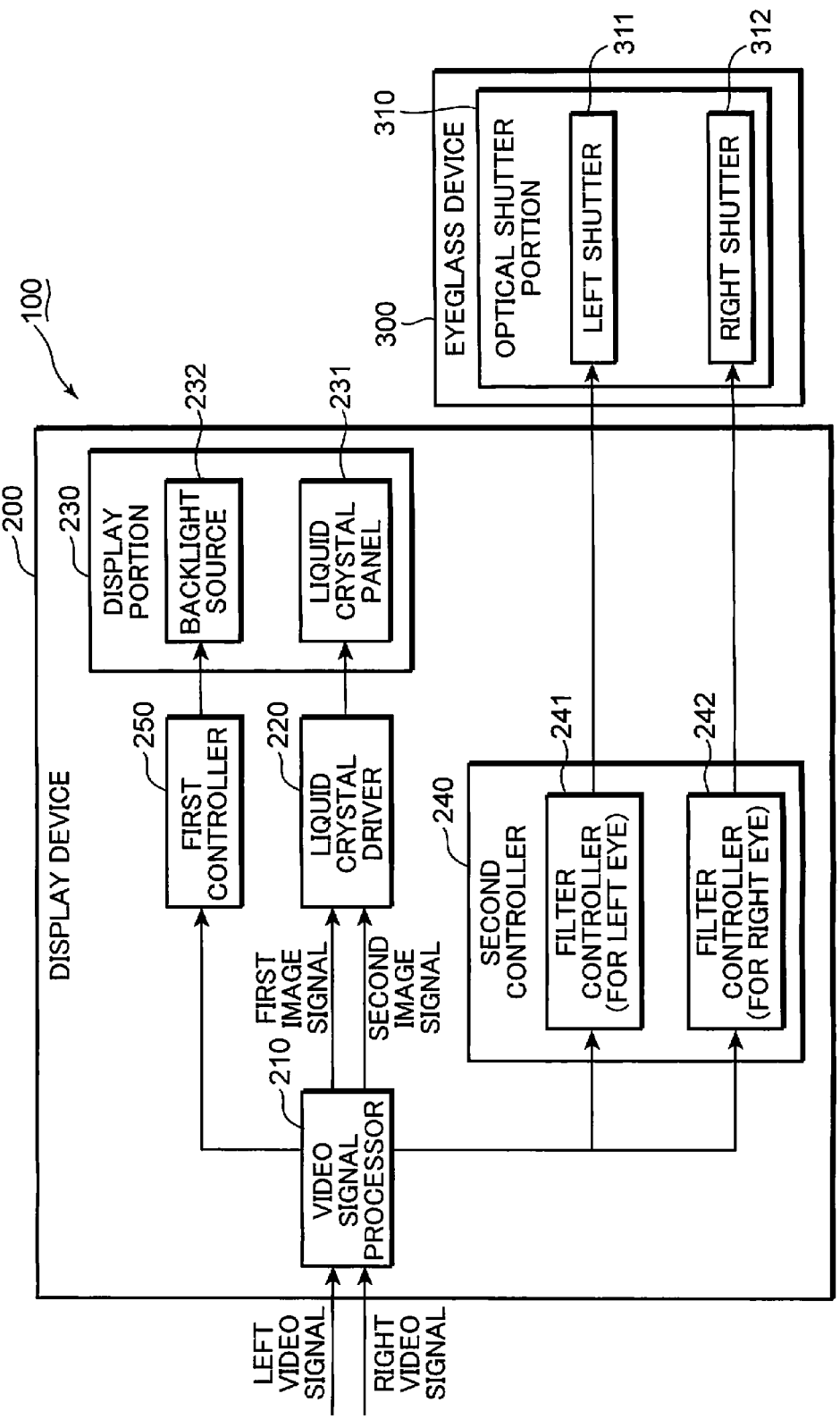
FIG. 1 is a schematic block diagram showing the configuration of a video viewing system and a display device according to the first embodiment.

Display devices and video viewing systems according to various embodiments are described with reference to the accompanying drawings. Identical components are denoted by the same reference symbols in the following embodiments. Redundant descriptions are not repeated for clarification as appropriate. Configurations, arrangements or shapes depicted in the drawings, and descriptions related to the drawings are merely for facilitating to make principles of the present embodiments understood, and do not limit the principles of the present embodiments.

<First Embodiment>

(Configuration of Video Viewing System)

Figure 2:
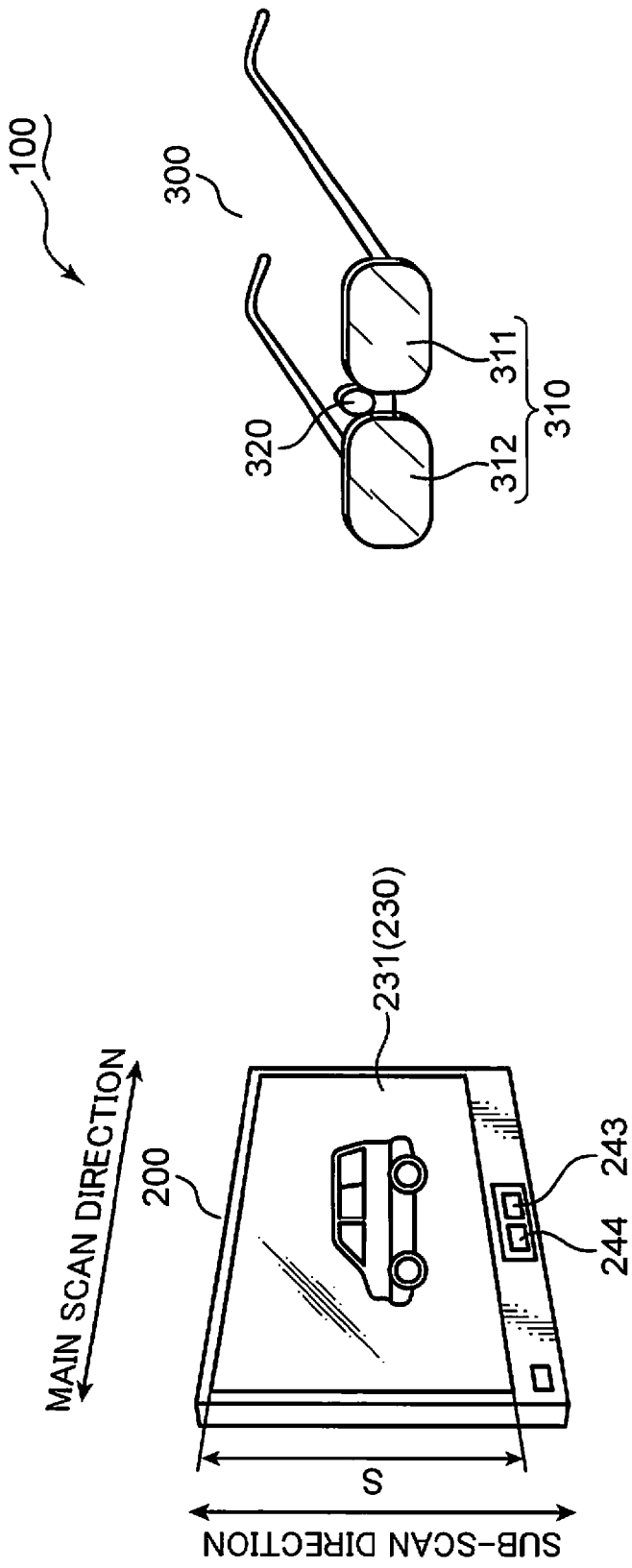
FIG. 2 is a schematic view of the video viewing system shown in FIG. 1.

FIG. 1 is a schematic block diagram showing the configuration of a video viewing system according to the first embodiment. FIG. 2 is a schematic view showing the video viewing system depicted in FIG. 1. A schematic configuration of the video viewing system is described with reference to FIGS. 1 and 2.

A video viewing system 100 has a display device 200 and an eyeglass device 300. The display device 200 displays frame images including left frame images (hereinafter, referred to as L frame images), which are viewed by the left eye, and right frame images (hereinafter, referred to as R frame images), which are viewed by the right eye. The eyeglass device 300 assists in viewing the L and R frame images which the display device 200 displays. The eyeglass device 300 performs a stereovision assistance which is in sync with the L and R frame images that the display device 200 displays, so that a viewer views the L and R frame images by the left and right eyes, respectively. Thus, the viewer stereoscopically perceives the frame images (the L and R frame images), which the display device 200 displays, through the eyeglass device 300 (the viewer perceives objects rendered in the L and R frame images as coming out or into a display surface on which the L and R frame images are displayed).

The eyeglass device 300, which looks like glasses for vision correction, includes an optical shutter portion 310, which has a left shutter 311 that is situated in the front of the left eye of the viewer and a right shutter 312 that is situated in the front of the right eye of the viewer. The left shutter 311 is opened if the display device 200 displays the L frame image whereas the left shutter 311 is closed if the display device 200 displays the R frame image. The right shutter 312 is closed if the display device 200 displays the L frame image whereas the right shutter 312 is opened if the display device 200 displays the R frame image. If the display device 200 displays the L frame image, the viewer views the L frame image only by the left eye because an optical path along which light travels from the L frame image to the left eye of the viewer is opened whereas an optical path along which light travels from the L frame image to the right eye of the viewer is closed. Likewise, if the display device 200 displays the R frame image, the viewer views the R frame image only by the right eye because an optical path along which light travels from the R frame image to the right eye of the viewer is opened whereas an optical path along which light travels from the R frame image to the left eye of the viewer is closed. In the present embodiment, the left shutter 311 is exemplified as the left filter. The right shutter 312 is exemplified as the right filter. Other optical elements which adjusts a light amount which reaches the left eye of the viewer from a video displayed by the display device 200 (referred to as a left light amount hereinafter) and a light amount which reaches the right eye of the viewer from the video (referred to as a right light amount hereinafter) may be used as the left and right filters. For example, deflecting elements (e.g., liquid crystal filters) which deflect light directed to the left and right eyes of the viewer, or other optical elements configured to adjust a light amount may be suitably used as the left and right filters. The left filter is controlled to increase the left light amount in sync with the display of the L frame images and decrease the left light amount in sync with the display of the R frame images. Likewise, the right filter is controlled to increase the right light amount in sync with the display of the R frame images and decrease the right light amount in sync with the display of the L frame images.

The display device 200 includes a video signal processor 210, a liquid crystal driver 220, a display portion 230, a first controller 250 and a second controller 240.

The video signal processor 210 receives video signals (left video signals and right video signals) having a vertical synchronous frequency which is used as a control base. The video signal processor 210 alternately outputs the received left video signal (referred to as an L signal hereinafter) and the received right video signal (referred to as an R signal hereinafter) at a frequency which is N times (where N is a natural number) as high as the vertical synchronous frequency that is used as the control base. In the present embodiment, an input video signal of 60 Hz is converted into an L signal and an R signal of 120 Hz. The L and R signals obtained through the conversion are output to the liquid crystal driver 220. The video signal processor 210 also outputs control signals to the first controller 250 in sync with the output of the L and R signals.

The display portion 230 has a backlight source 232. The first controller 250 controls the backlight source 232 of the display portion 230 in response to the control signal from the video signal processor 210. The video signal processor 210 outputs control signals to control the second controller 240 in sync with the output of the L and R signals. The second controller 240 controls the optical shutter portion 310 in response to the control signals from the video signal processor 210. The control signals output from first and/or second controllers 250, 240 may be the L and/or R signals obtained by the conversion of the video signal processor 210. Alternatively, the control signals may be vertical synchronous signals of 120 Hz of the L and/or R signals.

A video signal including video information between one vertical synchronous signal of the L signal and the next vertical synchronous signal which is subsequently input is referred to as an L frame image signal in the following descriptions. A video signal including video information between one vertical synchronous signal of the R signal and the next vertical synchronous signal which is subsequently input is referred to as an R frame image signal in the following descriptions. The L frame image signal is used for rendering an L frame image. Likewise, the R frame image signal is used for rendering an R frame image. In the present embodiment, the L and/or R frame image signals are exemplified as the frame image signals.

The display portion 230 has a liquid crystal panel 231 which uses a liquid crystal to alternately display the L and R frame images with time, in addition to the aforementioned backlight source 232. The backlight source 232 irradiates light onto the liquid crystal panel 231 in response to the control signal from the video signal processor 210. The liquid crystal driver 220 performs scanning operation by means of the frame image signals (the L or R frame image signals) in a main scan direction and a sub-scan direction, so as to drive the liquid crystals of the liquid crystal panel 231. As shown in FIG. 2, the horizontal direction of the liquid crystal panel 231 is exemplified as the main scan direction of the frame image signals. The vertical direction of the liquid crystal panel 231 is exemplified as the sub-scan direction of the frame image signals. In the following descriptions, an interval in the sub-scan direction used for the display of the frame images (a section from the upper edge to the lower edge of the liquid crystal panel 231) is referred to as the sub-scan interval S. The liquid crystal driver 220 performs the scanning operation by means of the L and R frame image signals alternately. Thus, the L and R frame images are alternately displayed on the liquid crystal panel 231 with time.

The video signal processor 210 outputs a first image signal and a second image signal subsequent to the first image signal to the liquid crystal driver 220 in correspondence with one L frame image. Likewise, the video signal processor 210 outputs a first image signal and a second image signal subsequent to the first image signal to the liquid crystal driver 220 in correspondence with one R frame image. The first image signal represents an image having a resolution lower than what the frame image signal (L or R frame image signal) input to the video signal processor 210 represents. The second image signal represents an image having a resolution higher than what the first image signal represents. In the present embodiment, the video signal processor 210 which converts the frame image signal into the first and second image signals is exemplified as the conversion portion.

The first and second image signals are input to the liquid crystal driver 220, respectively. The liquid crystal driver 220 performs a first scanning operation to drive the liquid crystals over the display surface of the liquid crystal panel 231 in response to the first image signal, and a second scanning operation to drive the liquid crystals over the display surface of the liquid crystal panel 231 in response to the second image signal. It should be noted that the second scanning operation is performed after the first scanning operation. Since the first image signal represents an image having a relatively low resolution as described above, it may take a shorter time for the liquid crystal driver 220 to perform the first scanning operation than the second scanning operation. As a result, even after the first scanning operation is performed, a sufficiently long time is secured for the second scanning operation which is performed before the left shutter 311 is opened or the right shutter 312 is closed.

The liquid crystal driver 220 converts the first and second image signals into a display format of the liquid crystal panel 231, in response to the vertical and horizontal synchronous signals included in the first and second image signals. The liquid crystal driver 220 performs the first and second scanning operations by means of the frame image signals of the first and second image signals obtained by the conversion for display of each frame image on the liquid crystal panel 231.

The liquid crystal panel 231 drives the liquid crystals by means of the liquid crystal driver 220 to modulate incident light from the rear surface in response to the input first and second image signals. Thus, the liquid crystal panel 231 alternately displays the L and R frame images, which are viewed by the left and right eyes, respectively. The liquid crystal panel 231 may suitably use various drive methodologies such as the in-plane switching (IPS) system, the vertical alignment (VA) system and the twisted nematic (TN) system.

The backlight source 232 emits light which enters from the rear surface of the liquid crystal panel 231 and travels toward the display surface of the liquid crystal panel 231. In the present embodiment, several light emission diodes (LEDs) (not shown) two-dimensionally aligned for surface light emission are used as the backlight source 232. Alternatively, several fluorescent tubes aligned for surface light emission may be used as the backlight source 232. The light emission diodes or fluorescent tubes used as the backlight source 232 may be situated on an edge of the liquid crystal panel 231 so as to perform surface light emission (edge type).

The first controller 250 outputs an emission control signal in response to the control signal of 120 Hz which is output from the video signal processor 210. The backlight source 232 may be turned on or off in response to the emission control signal.

The second controller 240 controls the optical shutter portion 310 of the eyeglass device 300 in response to display periods of the L and R frame images. The second controller 240 has a left filter controller 241 (hereinafter, referred to as an L filter controller 241) which controls the left shutter 311, and a right filter controller 242 (hereinafter, referred to as an R filter controller 242) which controls the right shutter 312. If the liquid crystal panel 231 alternately displays the L and R frame images, for example, at 120 Hz, the L filter controller 241 controls the eyeglass device 300 so that the left shutter 311 adjusts (increases or decreases) the left light amount at intervals of 60 Hz. Likewise, the R filter controller 242 controls the eyeglass device 300 so that the right shutter 312 adjusts (increases or decreases) the right light amount at intervals of 60 Hz.

As shown in FIG. 2, in the present embodiment, the display device 200 has a first transmitter 243 configured to transmit a first synchronous signal which is in sync with the display of the L frame image, and a second transmitter 244 configured to transmit a second synchronous signal which is in sync with the display of the R frame image. The eyeglass device 300 includes a receiver 320 which is situated between the left and right shutters 311, 312. The receiver 320 receives the first and second synchronous signals. Preferably, the first synchronous signal is different in waveform from the second synchronous signal. The receiver 320 identifies the first and second synchronous signal on the basis of the waveforms of the received synchronous signals. Thus, the eyeglass device 300 operates the left shutter 311 in response to the first synchronous signal. The eyeglass device 300 operates the right shutter 312 in response to the second synchronous signal. Other known communication technologies and other known signal process technologies may be used for wireless communication of the synchronous signals between the display device 200 and the eyeglass device 300, and internal processes on the synchronous signals (the first and second synchronous signals) by the eyeglass device 300. Alternatively, the communication of the synchronous signals (the first and second synchronous signals) between the display device 200 and the eyeglass device 300 may be performed by wire. The first transmitter 243 configured to transmit the first synchronous signal which is in sync with the display of a left video and the second transmitter 244 configured to transmit the second synchronous signal which is in sync with the display of the right video may be integrated into one transmission portion. In this case, the displays of the left and right videos may be alternately synchronized with risings of common synchronous signals.

The L and R filter controllers 241, 242 determine phases of change cycles of the left and right light amounts by the left and right shutters 311, 312 in response to the control signals from the video signal processor 210. The L and R filter controllers 241, 242 output the first and second synchronous signals in response to the determined phases. The left and right shutters 311, 312 increase or decrease the left and right light amounts in sync with the display of the L and R frame images in response to the first and second synchronous signals, respectively.

The second controller 240 may take account of response characteristics of the liquid crystal panel 231 and the crosstalk (mutual interference) between the displayed L and R frame images to determine lengths of periods while the left or right shutter 311, 312 increases the left or right light amount (hereinafter, referred to as light-amount increasing periods), and timings (phases) of the light-amount increasing periods. The L filter controller 241 controls the lengths and timings of the light-amount increasing periods related to the left light amount. The R filter controller 242 controls the lengths and timings of the light-amount increasing periods related to the right light amount.

The first controller 250, which operates in response to the control signal of 120 Hz of the video signal processor 210, outputs the emission control signal to emit light from the backlight source 232 in sync with light amount adjustments of the left and right shutters 311, 312. The backlight source 232 may be turned on or off in response to the emission control signal. In the present embodiment, the backlight source 232 is always on under the control of the first controller 250. Therefore, timings and lengths of viewing periods while the viewer may view the frame images are defined by the operation of the optical shutter portion 310 of the eyeglass device 300.

Alternatively, the first controller 250 may turn the backlight source 232 on in a part of the light-amount increasing period which are adjusted by the second controller 240 or a period which almost corresponds to the light-amount increasing period whereas the first controller 250 may turn the backlight source 232 off in the other periods. Under this control of the first controller 250 for turning on or off the backlight source 232, timings and lengths of the viewing periods while the viewer views the frame images are defined by the operation of turning on or off the backlight source 232.

(Conversion Method from Frame Image Signals into First Image Signals)

Figure 3:
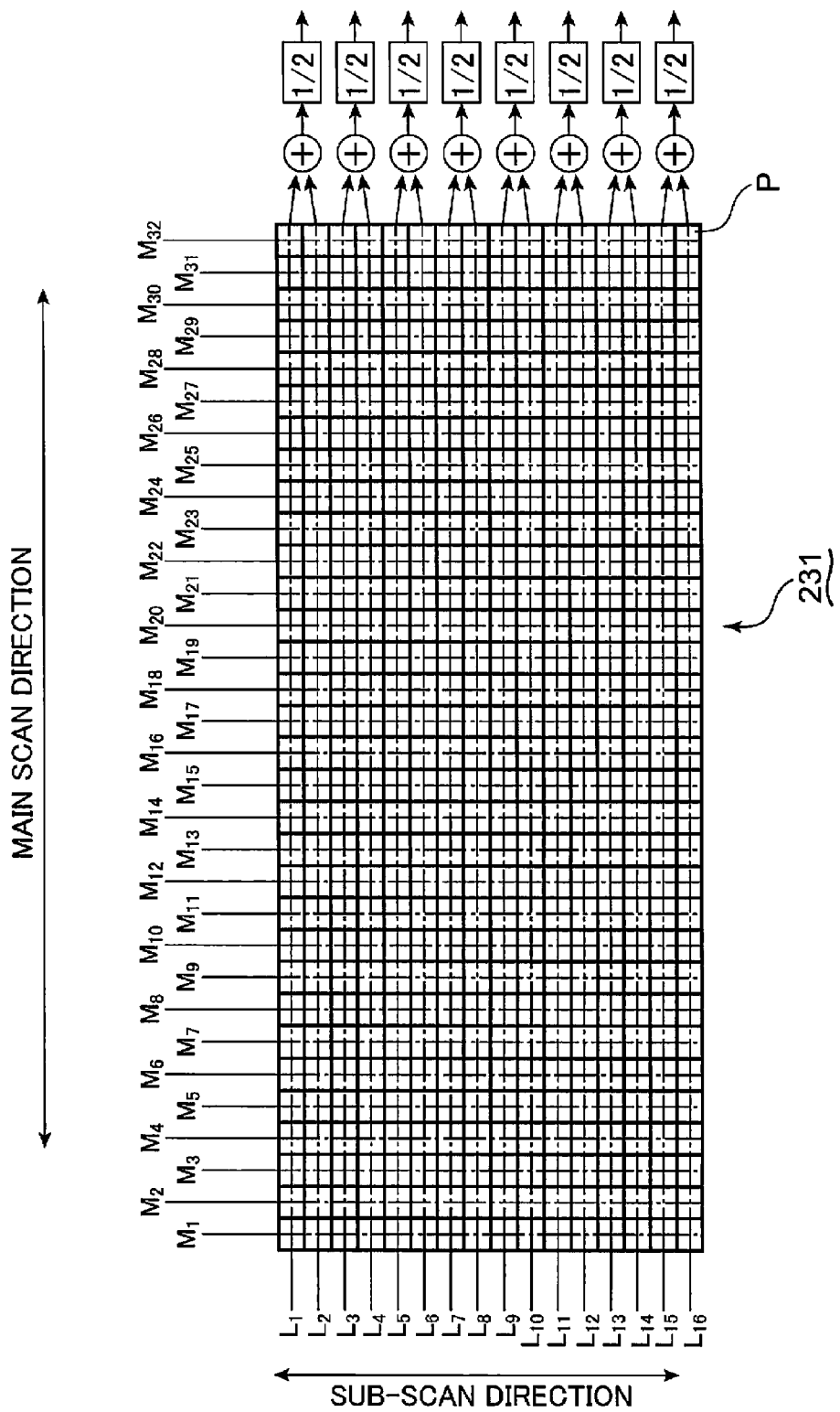
FIG. 3 is a conceptual view of an averaging process which is performed by a video signal processor of the display device shown in FIG. 1.
Figure 4:
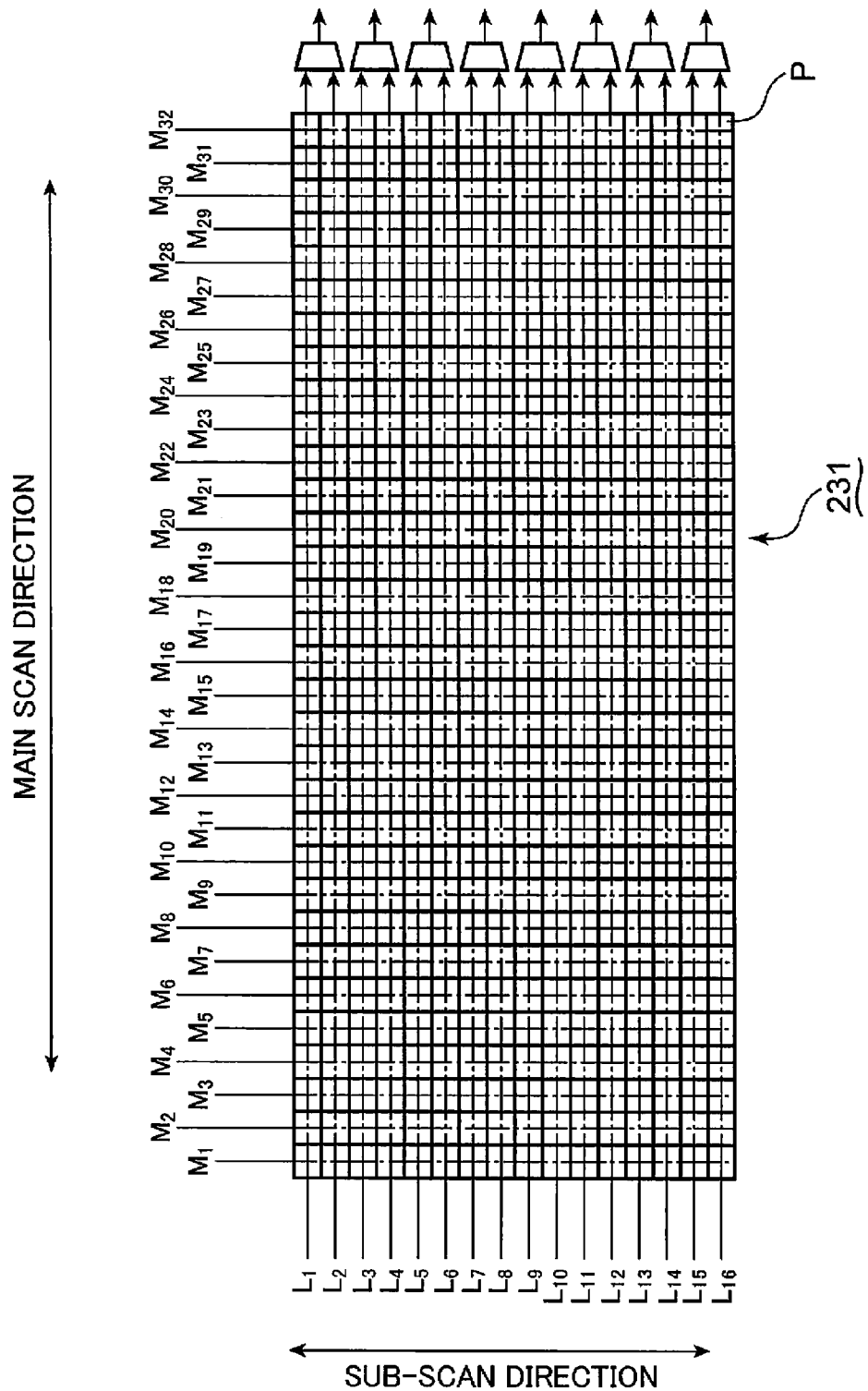
FIG. 4 is a conceptual view of a selecting process which is performed by the video signal processor of the display device shown in FIG. 1.

FIGS. 3 and 4 are schematic views showing a part of the liquid crystal panel 231. The conversion from the frame image signal into the first image signal is generally described with reference to FIGS. 1, 3 and 4.

The liquid crystal panel 231 has several gate lines extending in the main scan direction and several data lines extending in the sub-scan direction. FIG. 3 shows gate lines $L_1$ to $L_{16}$ aligned in the sub-scan direction and data lines $M_1$ to $M_{32}$ aligned in the main scan direction. A pixel P and the liquid crystal (not shown) corresponding to the pixel P is allocated to each of the intersections of the gate lines $L_1$ to $L_{16}$ and the data lines $M_1$ to $M_{32}$. Drive amounts of the liquid crystals are determined in response to voltages applied to the gate lines $L_1$ to $L_{16}$ and the data lines $M_1$ to $M_{32}$.

In the present embodiment, the video signal processor 210 generates the first image signal so that pixels $P_{2t-1}$ arranged along a gate line $L_{2t-1}$ and pixels $P_{2t}$ arranged along a gate line $L_{2t}$ have equalized luminance value (where t is a natural number). In the first scanning operation, the liquid crystal corresponding to the pixel $P(L_1, M_1)$ situated at the intersection of the gate line $L_1$ and the data line $M_1$ and the pixel $P(L_2, M_1)$ situated at the intersection of the gate line $L_2$ and the data line $M_1$ are driven so that the luminance values of the pixels $P(L_1, M_1)$, $P(L_2, M_1)$ are equalized. Likewise, in the first scanning operation, the liquid crystal corresponding to the pixel $P(L_{15}, M_{17})$ situated at the intersection of the gate line $L_{15}$ and the data line $M_{17}$ and the pixel $P(L_{16}, M_{17})$ situated at the intersection of the gate line $L_{16}$ and the data line $M_{17}$ are driven so that the luminance values of the pixels $P(L_{15}, M_{17})$, $P(L_{16}, M_{17})$ are equalized. Similarly, liquid crystals corresponding to the pixel $P(L_7, M_{32})$ situated at the intersection of the gate line $L_7$ and the data line $M_{32}$ and the pixel $P(L_8, M_{32})$ situated at the intersection of the gate line $L_8$ and the data line $M_{32}$ are driven in the first scanning operation so that the luminance values of the pixels $P(L_7, M_{32})$, $P(L_8, M_{32})$ are equalized. Therefore, in the first scanning operation, the liquid crystal corresponding to a given pixel on the display surface of the liquid crystal panel 231 and another pixel aligned with the given pixel in the sub-scan direction is driven so that the luminance values of the given pixel and the other pixel are equalized. In the present embodiment, a group of pixels corresponding to the liquid crystals, which are driven so that the luminance values are equalized, are exemplified as the pixel group.

The conversion from the frame image signal into the first image signal shown in FIG. 3 is based on averaging of the luminance values of the frame images. Each frame image signal determines a luminance value for each pixel P in response to the displayed frame images. Thus, a luminance value $B(L_1, M_1)$ which the frame image signal input to the video signal processor 210 determines for the pixel $P(L_1, M_1)$ may be different from a luminance value $B(L_2, M_1)$ which the frame image signal determines for the pixel $P(L_2, M_1)$. The video signal processor 210 averages the luminance values $B(L_1, M_1)$, $B(L_2, M_1)$, so as to set the equalized luminance values for the pixels $P(L_1, M_1)$, $P(L_2, M_1)$.

The conversion from the frame image signal into the first image signal shown in FIG. 4 is based on selection of a luminance value of the frame image. The video signal processor 210 selects one luminance value, for example, from the luminance values $B(L_1, M_1)$, $B(L_2, M_1)$. Then, the video signal processor 210 sets the equalized luminance values for the pixels $P(L_1, M_1)$, $P(L_2, M_1)$ in response to the selected luminance value. For example, luminance values, which the frame image signal assigns to pixels that are aligned along one predetermined gate lines so that the gate lines are treated as one set, may be correspondingly set for other pixels which are aligned along other gate lines. For example, luminance values which the frame image signal assigns to pixels aligned along the gate line $L_1$ may be set for pixels aligned along the gate line $L_2$. Alternatively, the video signal processor 210 may select a larger or small one of the luminance values (e.g., the luminance values $B(L_1, M_1)$, $B(L_2, M_1)$) which the frame image signal determines for two pixels (e.g., the pixels $P(L_1, M_1)$, $P(L_2, M_1)$) to generate the first image signal so that the selected luminance value is set for both pixels. Alternatively, the video signal processor 210 may select a luminance value to generate the first image signal on the basis of other suitable criteria.

In the present embodiment, the averaging or selecting process is performed on a set of two adjacent pixels aligned in the sub-scan direction. Alternatively, the averaging or selecting process may be performed on a set of more than two pixels aligned in the sub-scan direction.

(First and Second Scanning Operations)

Figure 5A:
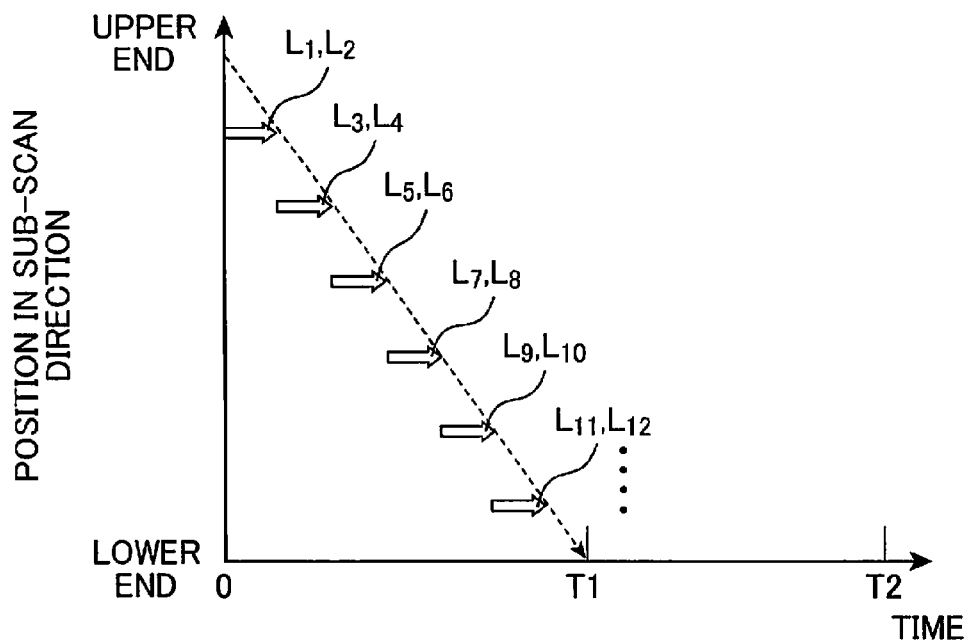
FIG. 5A is a conceptual view of a first scanning operation of a liquid crystal driver of the display device shown in FIG. 1.
Figure 5B:
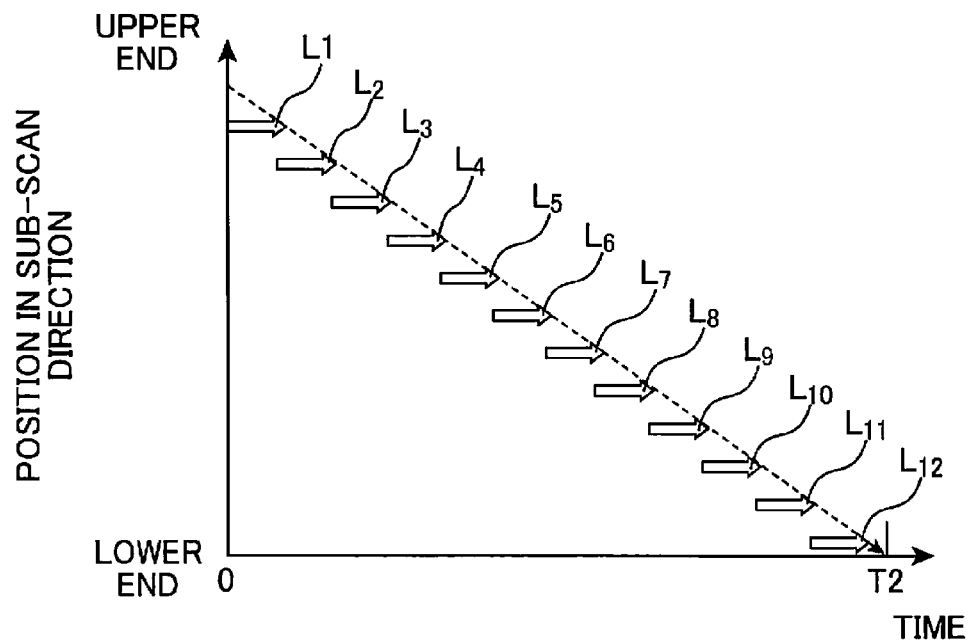
FIG. 5B is a conceptual view of a second scanning operation of the liquid crystal driver of the display device shown in FIG. 1.

FIGS. 5A and 5B are schematic graphs showing scanning operations which the liquid crystal driver 220 performs. FIG. 5A shows the first scanning operation in response to the first image signal. FIG. 5B shows the second scanning operation in response to the second image signal. FIGS. 5A and 5B show the scanning operations on the gate lines $L_1$ to $L_{12}$. The horizontal axes of FIGS. 5A and 5B mean axes of time during the scanning operations from the gate lines $L_1$ to $L_{12}$. The vertical axes of FIGS. 5A and 5B show sub-scan directional positions of the liquid crystal panel 231. The first and second scanning operations are described with reference to FIGS. 1, 3 and 5B.

The first image signal equalizes the luminance value of pixels aligned in the sub-scan direction by the averaging or selecting process described with reference to FIGS. 3 and 4. Luminance values of pixels aligned in the sub-scan direction on the gate lines $L_{2t-1}$ and $L_{2t}$ are equalized (where t is a natural number) in the present embodiment. Thus, the liquid crystal driver 220 may simultaneously write the first image signal on the gate lines $L_{2t-1}$, $L_{2t}$. As a result, the liquid crystals corresponding to the pixels on the gate lines $L_{2t-1}$, $L_{2t}$ are driven at the same time.

The second image signal is generated in response to the frame image signal (the L and R frame image signals) after the overdrive process, which is described below. Since the overdrive process is not a process for equalizing the luminance values of two pixels, unlike the aforementioned averaging or selecting process, the liquid crystal driver 220 sequentially performs writing from the gate line $L_1$.

In the present embodiment, since the liquid crystal driver 220, which performs the first scanning operation, simultaneously writes the first image signal on a set of two gate lines $L_{2t-1}$, $L_{2t}$, a time period T1 of the first scanning operation until writing up to the gate line $L_{12}$ is completed becomes a half of a time period T2 of the second scanning operation until writing up to the gate line $L_{12}$ is completed. Since the first scanning operation starts early to drive the liquid crystals of the liquid crystal panel 231 over the entire display surface within a relatively short time, there is little crosstalk at a lower area of the display surface.

(Principles of Overdrive Process)

The overdrive process may be exemplified as a method for bringing the luminance values of the pixels of the liquid crystal panel to target luminance values (luminance values for the pixels defined by the frame image signal).

FIG. 6 is a schematic timing chart showing principles of the overdrive process. The overdrive process is described with reference to FIG. 6.

The L and R frame images are alternately displayed on the liquid crystal panel. Left and right periods for displaying the L and R frame images are shown in the section (A) of FIG. 6. The overdrive process in the right period is described hereinafter. The principles of the overdrive process performed in the right period are similarly applied to the left period.

As shown in the section (B) of FIG. 6, the first and second scanning operations of the L frame image signal are performed in the left period. The first and second scanning operations of the R frame image signal are performed in the right period.

The section (C) of FIG. 6 shows an opening/closing operation of the optical shutter portion. The left shutter is opened just before the start timing of the right period. The right shutter is opened immediately before the start timing of another left period.

The section (D) of FIG. 6 shows a change in luminance of a specific pixel of the liquid crystal panel. In the below descriptions, the L frame image signal defines a target luminance value of "100". The R frame image signal defines a target luminance value of "30".

In the right period, the video signal processor compares the luminance value which the L frame image signal defines with the luminance value which the R frame image signal defines, so that the video signal processor determines that it is required to reduce the luminance value of the pixel from "100" to "30". In order to quickly bring the luminance value of the pixel to the target luminance value of "30" which the R frame image signal defines, the video signal processor outputs a drive signal for the first scanning operation so that the drive signal defines a luminance value of "0" lower than the target luminance value of "30" which the R frame image signal defines. The liquid crystal driver drives the liquid crystal in response to the drive signal defining the luminance value of "0". Therefore, the luminance value of the pixel may get very close to the target luminance value of "30" defined by the R frame image signal during the first scanning operation.

The video signal processor outputs a drive signal for the second scanning operation so that the drive signal defines a luminance value between the target luminance value "30" defined by the R frame image signal and the luminance value "0" defined by the drive signal for the first scanning operation. Therefore, the luminance value of the pixel reaches the target luminance value "30" by the time at which the right shutter opens. In FIG. 6, the drive signal for the second scanning operation defines a luminance value of "15". As a result, a change rate of the luminance value of the pixel is gradually reduced during the second scanning operation so that the luminance value approaches the target luminance value "30". While the right shutter is open, the viewer may perceive pixels having luminance value equivalent or close to the target luminance value with the right eye.

Figure 7:
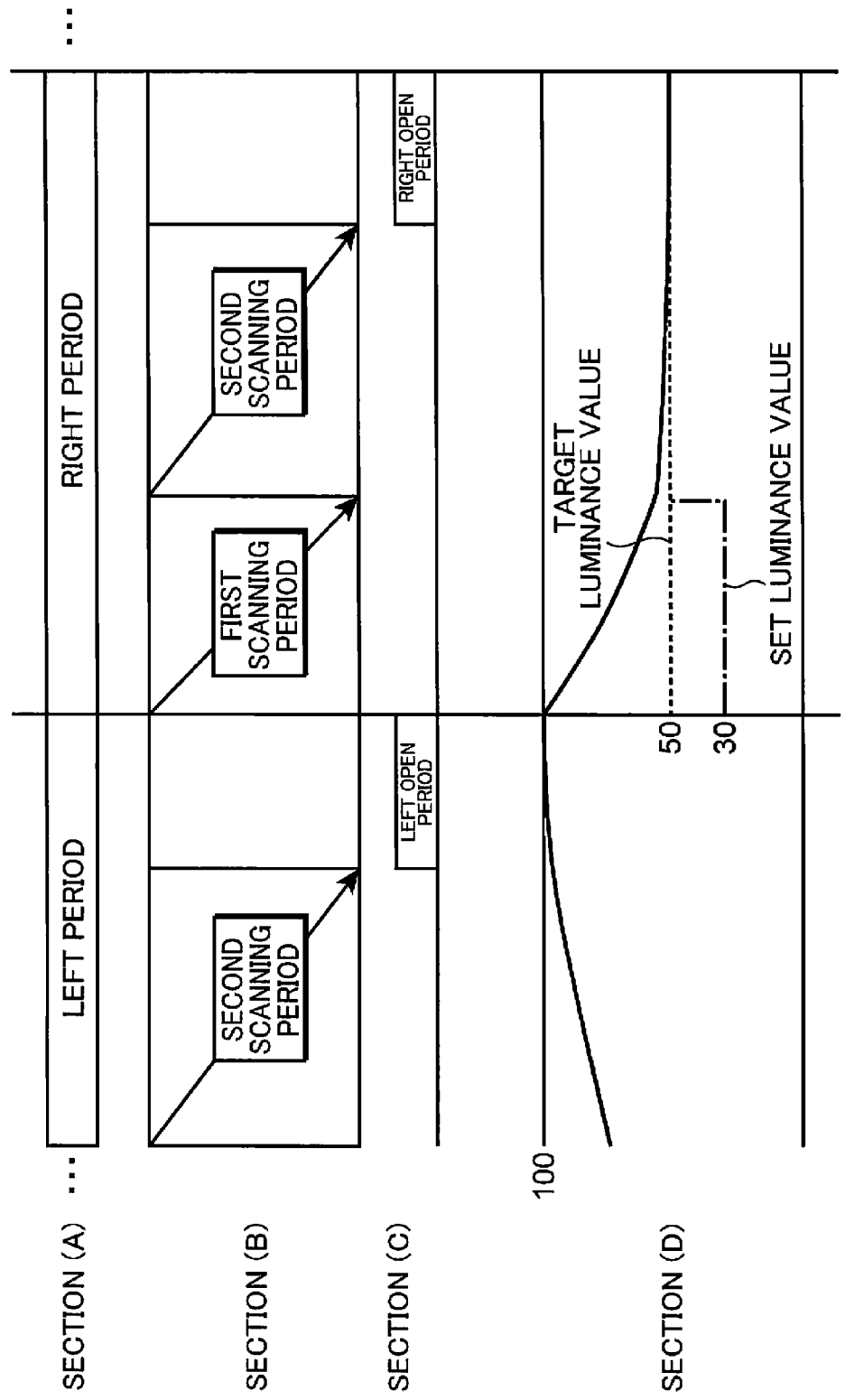
FIG. 7 is a schematic timing chart showing a pattern of the overdrive process.
Figure 8:
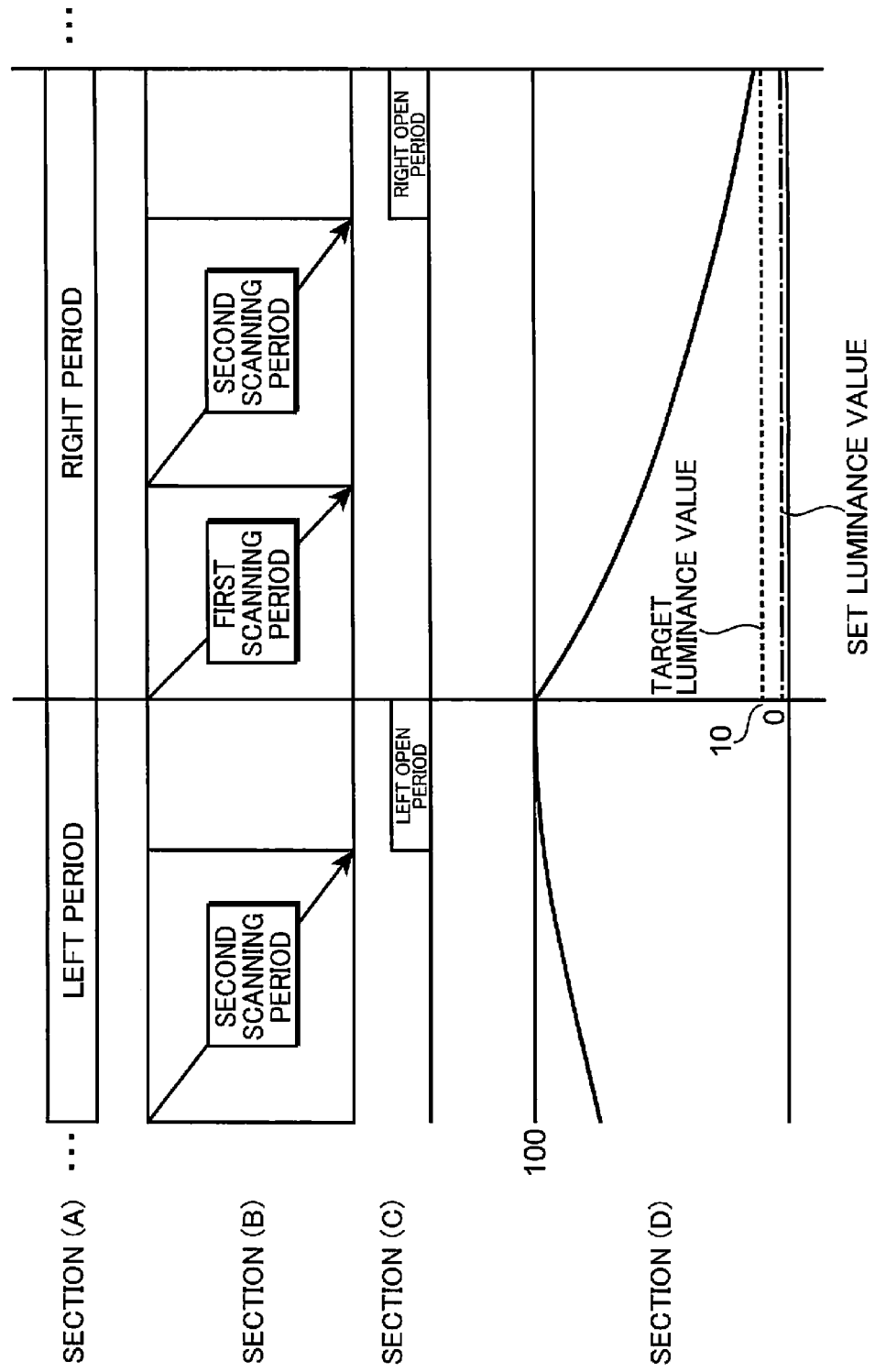
FIG. 8 is a schematic timing chart showing a pattern of the overdrive process.

FIG. 7 is a schematic timing chart showing the overdrive process under a small difference between luminance values which the L and R frame image signals define. FIG. 8 is a schematic timing chart showing the overdrive process under a relatively large difference between luminance values which the L and R frame image signals define. The difference in luminance value between the L and R frame image signals shown in FIG. 6 is set between differences of the luminance values depicted in FIGS. 7 and 8. The overdrive process is further described with reference to FIGS. 6 to 8.

Like FIG. 6, the left and right periods for displaying the L and R frame images, respectively, are shown in the sections (A) of FIGS. 7 and 8. The overdrive process in the right period is described hereinafter. The principles of the overdrive process performed in the right period are similarly applied to the left period.

The first and second scanning operations are shown in the sections (B) of FIGS. 7 and 8. The first and second scanning operations of the L frame image signal are performed in the left period. The first and second scanning operations of the R frame image signal are performed in the right period.

The sections (C) of FIGS. 7 and 8 show the opening/closing operation of the optical shutter portion. The left shutter is opened just before the start timing of the right period. The right shutter is opened just before the start timing of another left period.

The sections (D) of FIGS. 7 and 8 show changes in luminance of a specific pixel of the liquid crystal panel, respectively. In the following descriptions, the L frame image signal defines a target luminance value of "100".

As shown in FIG. 7, if the L frame image signal defines the target luminance value of "100" and the subsequent R frame image signal defines a target luminance value of "50", the video signal processor performs an overdrive process on a drive signal for the first scanning operation to set a luminance value lower than the target luminance value of "50" which the R frame image signal defines (a set luminance value of "30" is shown in FIG. 7). As a result, the first scanning operation makes the luminance value of the pixel substantially reach the target luminance value of "50" defined by the R frame image signal. The video signal processor does not perform an overdrive process on a drive signal which is used in the subsequent second scanning operation. Therefore, the video signal processor outputs the drive signal for the second scanning operation which defines a luminance value equivalent to the target luminance value of "50" that the R frame image signal defines. As a result, if the right shutter is opened, the viewer may perceive pixels having brightness which is close to the target luminance value.

As described with reference to FIG. 6, if the L frame image signal defines the target luminance value of "100" and the subsequent R frame image signal defines the target luminance value of "30", the video signal processor performs the overdrive processes on the drive signals for the first and second scanning operations, respectively. As described above, the drive signal for the first scanning operation after the overdrive process defines the luminance value of "0" lower than the target luminance value of "30" which the R frame image signal defines. The drive signal for the second scanning operation after the overdrive process defines the luminance value of "15" lower than the target luminance value of "30" which the R frame image signal defines. As a result, if the right shutter is opened, the viewer may perceive pixels having brightness which is close to the target luminance value.

As shown in FIG. 8, if the preceding L frame image signal defines a target luminance value of "100" and the subsequent R frame image signal defines a target luminance value of "10", the video signal processor performs the overdrive process on the drive signals for the first and second scanning operations to set a luminance value lower than the target luminance value of "10" which the R frame image signal defines. If there is an excessively large difference between the target luminance values of the L and R frame image signals, the luminance value of the pixel may not reach the target luminance value even if luminance value which differs from the target luminance value defined by the R frame image signal at the maximum are set in the first and second scanning operations. Therefore, the video signal processor sets both luminance values to "0", which the drive signals for the first and second scanning operations define. As a result, if the right shutter is open, the viewer may perceive pixels having a luminance value as close to the target luminance value as possible.

(Resultant Problem from Resolution Reduction and Overdrive Process)

The averaging or selecting process described with reference to FIGS. 3 and 4 contributes to generation of the first image signal representing a frame image having a resolution lower than that of the frame image which the frame image signal input to the video signal processor represents. The generation of the first image signal makes the first scanning operation shorter as described with reference to FIG. 5A. As a result, it becomes earlier to start driving the liquid crystals over the entire liquid crystal panel, which results in decreased crosstalk. Unlike the averaging or selecting process which put it forward to start driving the liquid crystals over the liquid crystal panel, the overdrive process accelerates the liquid crystal drive for each individual pixel, so as to contribute to a reduction in crosstalk. A combination of the averaging/selecting process and the overdrive process is expected to contribute to a further reduction of the crosstalk, but their combination causes another problem.

Figure 9:
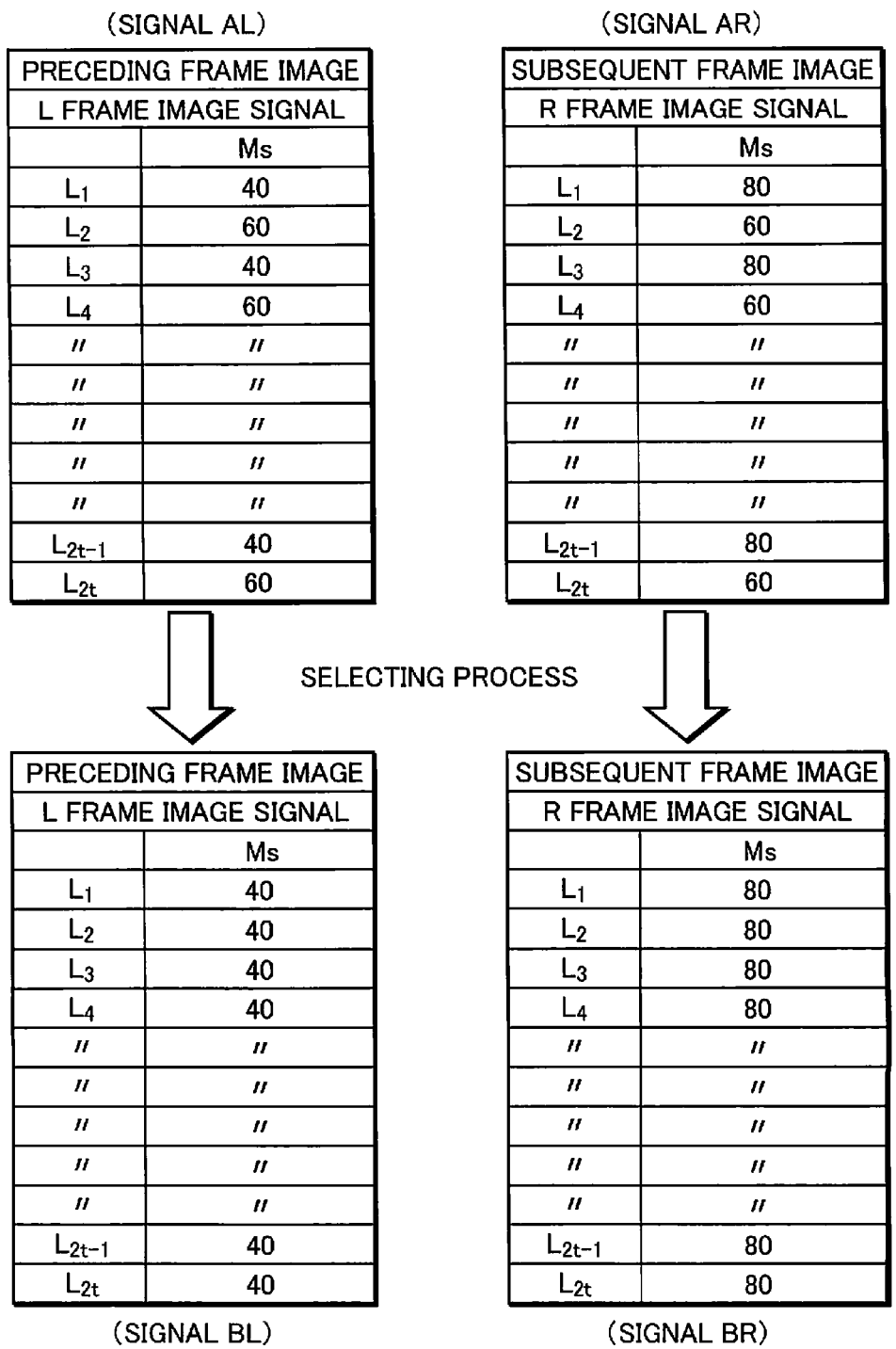
FIG. 9 is tables exemplarily showing luminance data included in a frame image signal which is input to the video signal processor.

FIG. 9 shows a luminance value represented by the frame image signal which is input to the video signal processor. The problem caused by the combination of the averaging/selecting process and the overdrive process is described with reference to FIGS. 3, 4 and 9.

FIG. 9 shows luminance values assigned to pixels which are aligned along a specific data line Ms. The upper tables in FIG. 9 show luminance values defined by the L and R frame image signals which are input to the video signal processor. The lower tables in FIG. 9 show luminance values defined by the drive signals after the selecting process described with reference to FIG. 4.

The L frame image signal input to the video signal processor defines luminance values of "40" for pixels on odd-numbered gate lines $L_1, L_3, \ldots,$ and $L_{2t-1}$ (where t is a natural number) and luminance values of "60" for pixels on even-numbered gate lines $L_2, L_4, \ldots,$ and $L_{2t}$ (where t is a natural number). The R frame image signal input to the video signal processor defines luminance values of "80" for pixels on the odd-numbered gate lines $L_1, L_3, \ldots,$ and $L_{2t-1}$ (where t is a natural number) and luminance values of "60" for pixels on the even-numbered gate lines $L_2, L_4, \ldots,$ and $L_{2t}$ (where t is a natural number). The gate line $L_1$ is situated at an upper portion of the liquid crystal panel (i.e., a position where the scanning operation is performed earlier) and the gate line $L_{2t}$ is situated at a lower portion of the liquid crystal panel (i.e., a position where the scanning operation is performed later).

The larger number given to the gate line L means that the liquid crystal corresponding to the pixel is driven at a late timing.

The video signal processor performs the selecting process, for example, in response to the luminance values assigned to the pixels on the odd-numbered gate lines $L_1, L_3, \ldots,$ and $L_{2t-1}$ (where t is a natural number). Therefore, the pixels on the even-numbered gate lines $L_2, L_4, \ldots,$ and $L_{2t}$ (where t is a natural number) have luminance values equivalent to those assigned to the pixels on the odd-numbered gate lines $L_1, L_3, \ldots,$ and $L_{2t-1}$ (where t is a natural number). As a result, the L frame image signal after the selecting process defines the luminance values of "40" for all of the pixels on the data lines Ms. The R frame image signal after the selecting process defines the luminance values of "80" for all of the pixels on the data lines Ms.

In the following descriptions, the L frame image signal which has not been subjected to the selecting process is referred to as "signal AL". The L frame image signal subjected to the selecting process is referred to as "signal BL". The R frame image signal which has not been subjected to the selecting process is referred to as "signal AR". The R frame image signal subjected to the selecting process is referred to as "signal BR".

Figure 10:
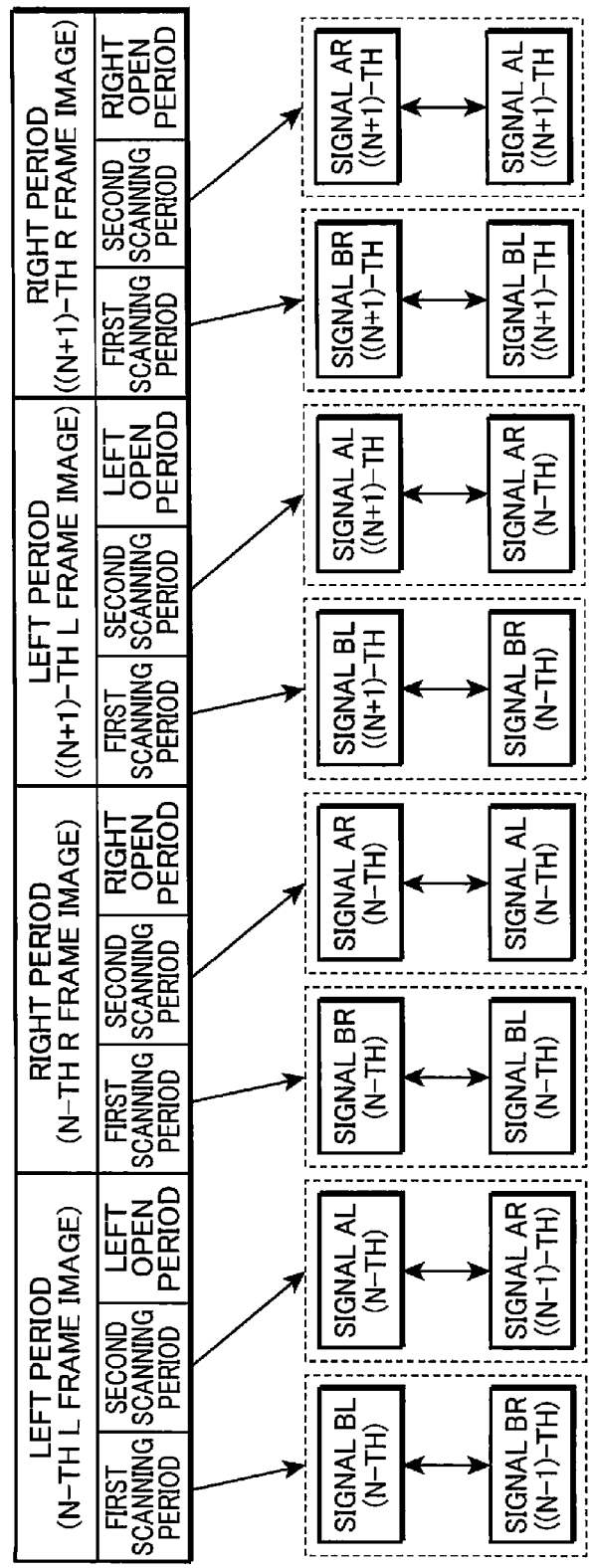
FIG. 10 is a schematic chart showing a comparison timing of the luminance data of the frame image signal shown in FIG. 9.

FIG. 10 is a schematic view showing signal processes by means of the averaging/selecting process and the overdrive process. The signal processes by means of the averaging/selecting process and the overdrive process are described with reference to FIGS. 5A to 10.

The left and right periods for displaying the L and R frame images, respectively, are alternately set as shown in FIG. 10. Each left period includes the first scanning period for performing the first scanning operation, the second scanning period for performing the second scanning operation following the first scanning period, which are described with reference to FIGS. 5A and 5B, and a left open period during which the left shutter is open. The left open period is set after the end of the second scanning period and before the start of the right period. Likewise, the right period has the first scanning period for performing the first scanning operation, the second scanning period for performing the second scanning operation after the first scanning period, which are described with reference to FIGS. 5A and 5B, and a right open period during which the right shutter is open. The right shutter open period is set after the end of the second scanning period and before the start of the left period.

As described with reference to FIGS. 6 to 8, the overdrive process is based on the comparison between luminance values which the preceding frame image signal and the next frame image signal define. Therefore, the overdrive process is performed, for example, with a delaying process on the frame image signals.

In the first scanning period of the right period for displaying the N-th R frame image shown in FIG. 10, the signal BR generated by the selecting process on the signal AR for displaying the N-th R frame image is compared with the signal BL used in the last left period for displaying the N-th L frame image to determine a luminance value by the overdrive process.

In the second scanning period of the right period for displaying the N-th R frame image, the signal AR for displaying the N-th R frame image is compared with the signal AL used in the last left period for displaying the N-th L frame image to determine a luminance value by the overdrive process.

Figure 11:
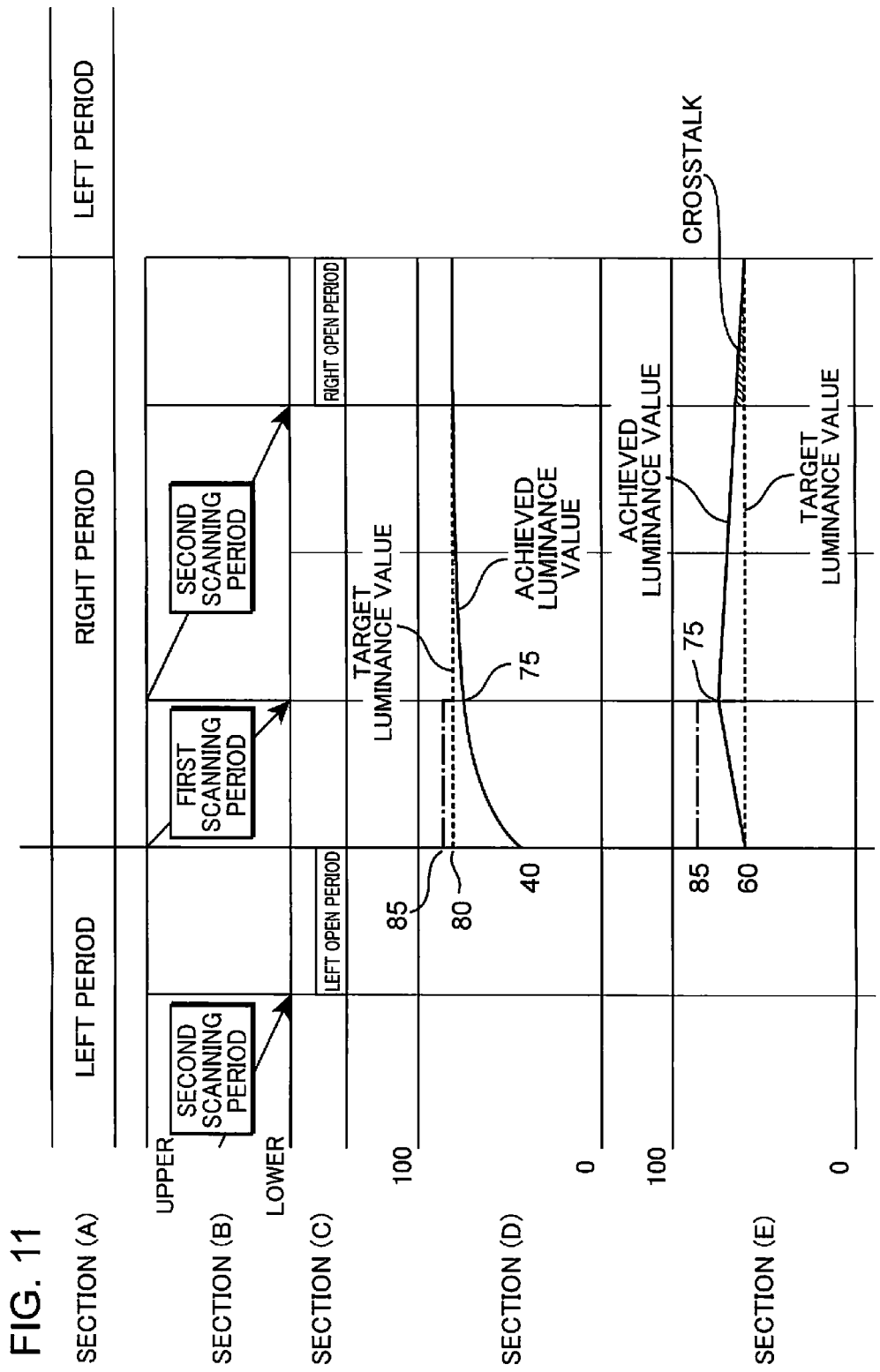
FIG. 11 is a timing chart showing a problem resulting from a combination between the resolution reducing process (the averaging process or the selecting process) and the overdrive process.

FIG. 11 is a schematic timing chart showing changes in luminance of pixels resulting from the signal processes described with reference to FIG. 10. The problem resulting from the combination of the averaging/selecting process and the overdrive process is further described with reference to FIGS. 3 to 11.

The left and right periods for displaying the L and R frame images, respectively, are shown in the section (A) of FIG. 11. The changes in luminance of the pixel in the right period are described below.

The first and second scanning operations are shown in the section (B) of FIG. 11. The first and second scanning operations of the L frame image signal are performed in the left period. The first and second scanning operations of the R frame image signal are performed in the right period. In order to perform the first scanning operation, the video signal processor performs the averaging or selecting process described with reference to FIGS. 3 and 4, and the overdrive process described with reference to FIGS. 6 to 8.

The section (C) of FIG. 11 shows the opening/closing operation of the optical shutter portion. The left shutter is open in a period after the second scanning operation ends and before the right period starts. The right shutter is open in a period after the second scanning operation ends and before another left period starts.

The section (D) of FIG. 11 shows a change in luminance of the pixel positioned at the intersection of the gate line $L_1$ and the data line Ms. The section (E) of FIG. 11 shows a change in luminance of the pixel positioned at the intersection of the gate line $L_2$ and the data line Ms.

As described with reference to FIG. 10, the video signal processor compares the signal BR generated for displaying the N-th R frame image with the signal BL generated for displaying the last L frame image to determines a luminance value which the drive signal defines for the first scanning operation of the right period for displaying the N-th R frame image. According to Tables shown in FIG. 9, the signal BR represents the luminance values of "80" and the signal BL represents the luminance values of "40" for all pixels on the data line Ms. The video signal processor determines that it is required to increase the luminance values of the pixels on the data line Ms from "40" to "80", and performs the overdrive process. As a result of the overdrive process, the drive luminance value is set to "85" for the first scanning operation.

As a result of the first scanning operation, the pixels on the odd-numbered gate lines $L_1, L_3, \ldots,$ and $L_{2t-1}$ (where t is a natural number) are driven from the luminance value "40" defined by the preceding signal AL toward the drive luminance value "85". The luminance value of the pixel positioned at the intersection between the gate line $L_1$ and the data line Ms arrives at a luminance value of "75" before the second scanning operation starts. The pixels on the even-numbered gate lines $L_2, L_4, \ldots,$ and $L_{2t}$ (where t is a natural number) are driven from the luminance value "60" defined by the preceding signal AR toward the drive luminance value "85". The luminance value of the pixel positioned at the intersection between the gate line $L_2$ and the data line Ms arrives at the luminance value of "75" before the second scanning operation starts.

In the second scanning period, the video signal processor refers the signals AL, AR to determine whether the overdrive process is required. For example, the video signal processor determines that the overdrive process of the first scanning operation has made the luminance values of the pixels on the odd-numbered gate lines $L_1, L_3, \ldots,$ and $L_{2t-1}$ (where t is a natural number) sufficiently close to the target luminance value. The video signal processor then determines that the overdrive process is not required for the pixels on the even-numbered gate lines $L_2, L_4, \ldots,$ and $L_{2t}$ (where t is a natural number) because there are a small difference between the luminance values which the signals AL, AR define, respectively (the luminance difference shown in FIG. 9 is "0"). As a result, the video signal processor generates a drive signal for setting the luminance values of "80", which the R frame image signal defines for the pixels on the odd-numbered gate lines $L_1, L_3, \ldots,$ and $L_{2t-1}$ (where t is a natural number). Once the second scanning operation starts, the luminance values of the pixels on the odd-numbered gate lines $L_1, L_3, \ldots,$ and $L_{2t-1}$ (where t is a natural number) becomes sufficiently close to the luminance values of "80" which the R frame image signal defines. Thus, if the right shutter is opened, the viewer may perceive the pixels having the luminance values of "80" defined by the R frame image signal. The video signal processor generates a drive signal for setting the luminance values of "60" which the R frame image signal defines for the pixels on the even-numbered gate lines $L_2, L_4, \ldots,$ and $L_{2t}$ (where t is a natural number). The luminance values of the pixels on the even-numbered gate lines $L_2, L_4, \ldots,$ and $L_{2t}$ (where t is a natural number) are quite far from the target luminance value of "60" at the start of the second scanning operation, because of the aforementioned selecting process and the overdrive process on the pixels on the odd-numbered gate lines $L_1, L_3, \ldots,$ and $L_{2t-1}$ (where t is a natural number). Thus, the luminance value of the pixels on the even-numbered gate lines $L_2, L_4, \ldots,$ and $L_{2t}$ (where t is a natural number) do not reach the target luminance values of "60" at the open timing of the right shutter even if the liquid crystals are driven in response to the driving signal which sets the luminance values of "60". The difference between the target luminance values of "60" and the achieved luminance values depicted by the solid line of the section (E) of FIG. 11 is perceived as crosstalk by the viewer.

As described above, the reduction in the resolution of the frame image signal such as the averaging or selecting process shortens a period of time while the first scanning operation is performed, but it potentially causes unnecessary changes in luminance of the pixels. The overdrive process potentially amplifies the unnecessary changes in luminance. Thus, the simple combination between the reduction in resolution of the frame image signal and the overdrive process may facilitate to cause the crosstalk.

(Video Signal Processor)

Figure 12:
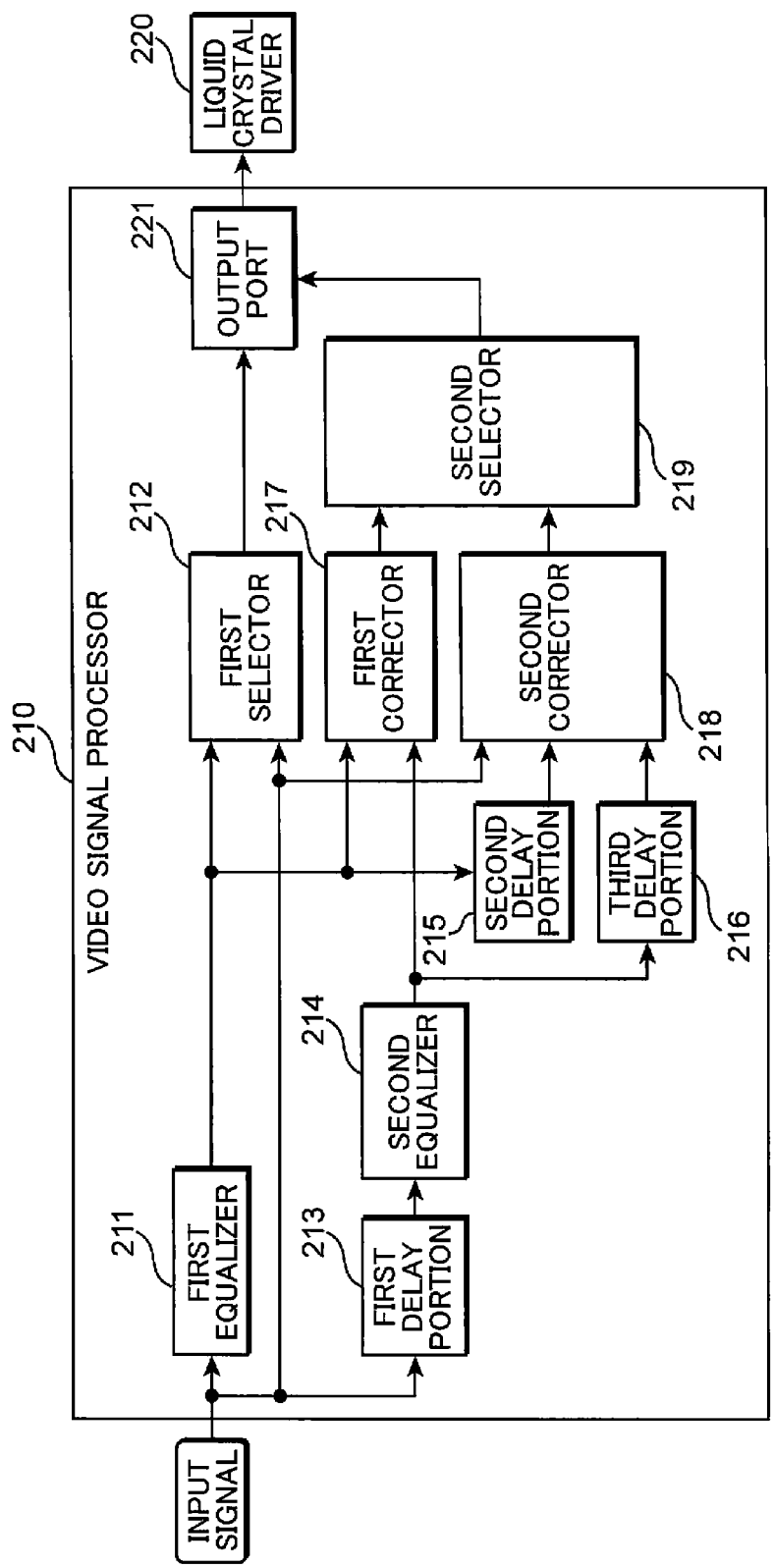
FIG. 12 is a block diagram showing a schematic function configuration of the video signal processor of the display device depicted in FIG. 1.

FIG. 12 is a block diagram schematically showing a function configuration of the video signal processor 210 of the display device 200 according to the present embodiment. The video signal processor 210 performs the resolution reduction on the frame image signal and the overdrive process with causing little crosstalk. The video signal processor 210 is described with reference to FIGS. 1 and 12.

The video signal processor 210 includes a first equalizer 211, a first selector 212, a first delay portion 213, a second equalizer 214, a second delay portion 215, a third delay portion 216, a first corrector 217, a second corrector 218, a second selector 219 and an output port 221.

The frame image signals (the L and R frame image signals) are input to the first equalizer 211, the first delay portion 213 and the first selector 212. The first delay portion 213 delays the input frame image signal by one frame and outputs the delayed frame image signal to the second equalizer 214. For example, if the L frame image signal is input, the first delay portion 213 outputs the input preceding R frame image signal to the second equalizer 214. Likewise, if the R frame image signal is input, the first delay portion 213 outputs the input preceding L frame image signal to the second equalizer 214.

Figure 13:
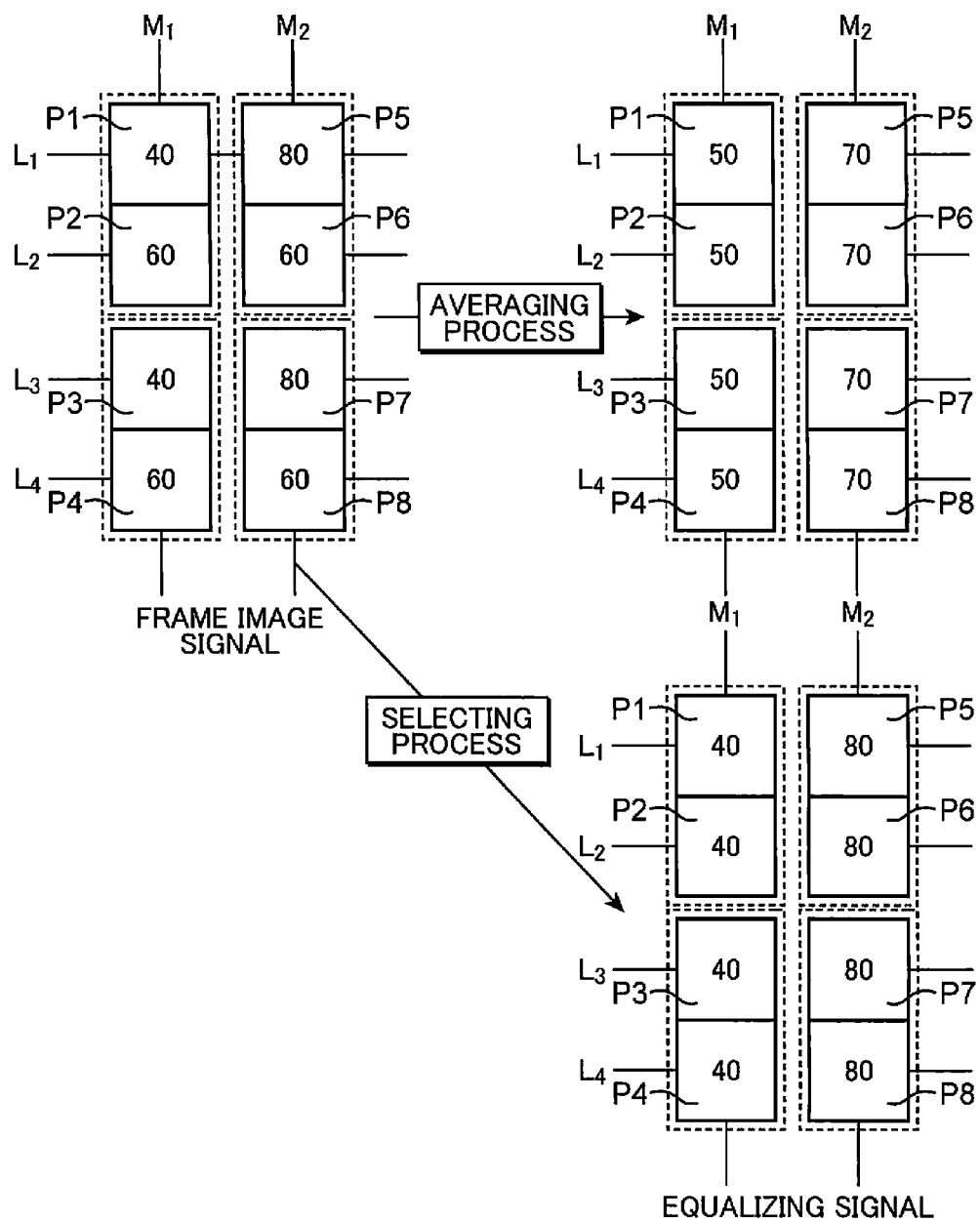
FIG. 13 is a conceptual view schematically showing changes in luminance of pixels in response to the averaging or selecting process which is performed by an equalizer of the video signal processor depicted in FIG. 12.

FIG. 13 schematically shows equalizing processes (the averaging or selecting process) which the first and second equalizers 211, 214 perform. The first and second equalizers 211, 214 are described with reference to FIGS. 12 and 13.

FIG. 13 shows two data lines $M_1, M_2$, four gate lines $L_1$ to $L_4$, and pixels P1 to P8 corresponding to the intersections of the data lines $M_1, M_2$ and the gate lines $L_1$ to $L_4$. The pixels P1 to P4 are aligned along the data line $M_1$ extending in the sub-scan direction. The pixels P5 to P8 are aligned along the data line $M_2$ extending in the sub-scan direction.

The frame image signal has luminance data which define luminance values of the pixels P1 to P8. The first and second equalizers 211, 214 divide the luminance data into several groups in correspondence with the data lines. Data groups have luminance values corresponding to the pixels, respectively. Therefore, the data groups are set to correspond to the pixels which are aligned in the sub-scan direction. The data group of the pixels P1, P2, the data group of the pixels P3, P4, the data group of the pixels P5, P6 and the data group of the pixels P7, P8 are set in FIG. 13. The frame image signal defines luminance values of "40" for the pixels P1, P3, luminance values of "60" for the pixels P2, P4, P6, P8 and luminance values of "80" for the pixels P5, P7. In the present embodiment, a set of the pixels corresponding to those data groups is exemplified as the pixel group.

The first and second equalizers 211, 214 perform the averaging or selecting process on each data group to equalize the luminance values of the pixels in the corresponding data group. If the first and second equalizers 211, 214 perform the averaging process, an equalizing signal which defines luminance values of "50" for the pixels P1, P2, P3, P4 and luminance values of "70" for the pixels P5, P6, P7, P8, respectively. If the first and second equalizers 211, 214 perform the selecting process in response to the luminance values of the pixels on an odd-numbered gate line, an equalizing signal is generated to define luminance values of "40" for the pixels P1, P2, P3, P4 and luminance values of "80" for the pixels P5, P6, P7, P8, respectively. In the present embodiment, the common luminance value to the pixels corresponding to the data group (the luminance value determined by the averaging or selecting process) is exemplified as the equalized luminance value.

The first equalizer 211 outputs the equalizing signal to the first selector 212 and the second delay portion 215. The second equalizer 214 outputs the equalizing signal to the first corrector 217 and the third delay portion 216.

The first selector 212 is described with reference to FIGS. 12 and 13.

As aforementioned, the frame image signal and the equalizing signal generated by the first equalizer 211 are output to the first selector 212. The first selector 212 outputs the equalizing signal in the first scanning period, during which the first scanning operation is performed, and the frame image signal in the second scanning period during which the second scanning operation is performed.

Figure 14:
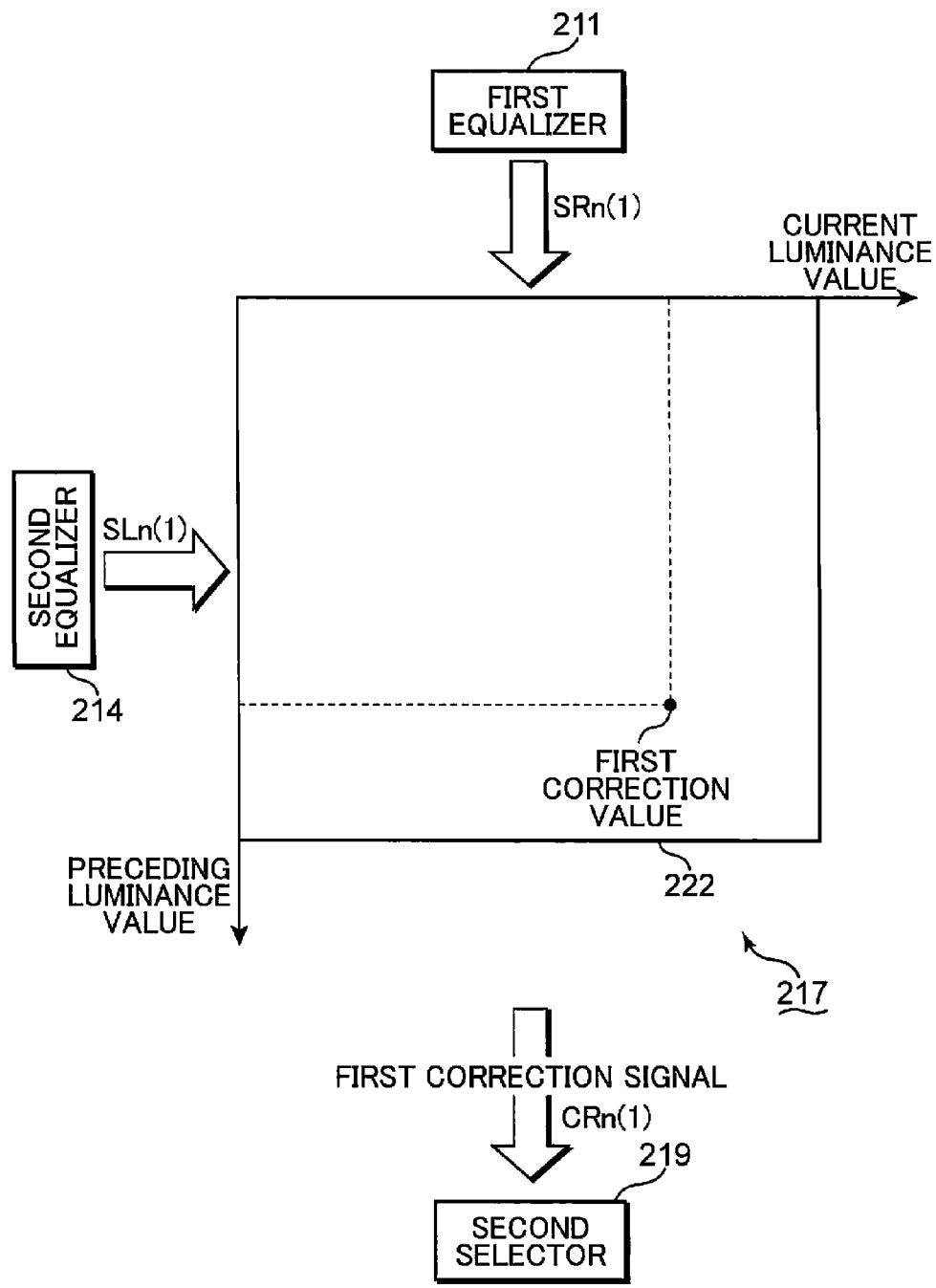
FIG. 14 is a conceptual view schematically showing a process for determining a first correction value by means of a first corrector of the video signal processor depicted in FIG. 12.

FIG. 14 is a conceptual view of a first correction table which the first corrector 217 stores. The first corrector 217 is described with reference to FIGS. 1, 5A and 5B and FIGS. 12 to 14.

The first corrector 217 receives the equalizing signals from the first and second equalizers 211, 214. As described above, the second equalizer 214 outputs the equalizing signal in response to the frame image signal delayed by the first delay portion 213. The coordinate axis corresponding to an input from the first equalizer 211 of the first correction table 222 shown in FIG. 14 represents a current luminance value which the equalizing signal from the first equalizer 211 defines. The coordinate axis corresponding to an input from the second equalizer 214 of the first correction table 222 represents a preceding luminance value which the equalizing signal from the second equalizer 214 defines.

The first corrector 217 determines first correction values for the pixels P1 to P8 in response to the current values defined by the equalizing signal from the first equalizer 211 and the preceding luminance values defined by the equalizing signal from the second equalizer 214 to output a first correction signal, which includes information about the first correction values, to the second selector 219. For example, the absolute value of the first correction value is set to be larger as a difference between the current and preceding luminance values increases. If the current luminance value is higher than the preceding luminance value, the first correction value is set to a positive value. If the current luminance value is lower than the preceding luminance value, the first correction value is set to a negative value. As described below, it depends on the selected first correction value how great laminate values the pixels P1 to P8 achieve by means of the first scanning operation. In the present embodiment, the first correction table 222 is exemplified as the first table. The first correction value of the first correction table 222 selected in response to the current and preceding luminance values is exemplified as the first data.

The second selector 219 outputs the first correction signal in the first scanning period during which the first scanning operation is performed. Therefore, the equalizing signal generated by the first equalizer 211 and the first correction value generated by the first corrector 217 are input to the output port 221 in the first scanning period.

The output port 221 adds the current luminance value defined by the equalizing signal, which is generated by the first equalizer 211, to the first correction value defined by the first correction signal. As described above, if the current luminance value is higher than the preceding luminance value, the first correction value is set to a positive value. Therefore, the added value calculated by the output port 221 becomes larger than the current luminance value. If the current luminance value is lower than the preceding luminance value, the resultant added value from the calculation in the output port 221 becomes smaller than the current luminance value because the first correction value is set to a negative value. In the first scanning period during which the first scanning operation is performed, the output port 221 outputs a first image signal including information about the added value to the liquid crystal driver 220.

The liquid crystal driver 220 drives the liquid crystals of the liquid crystal panel 231 in response to the first image signal. As described with reference to FIG. 5A, the liquid crystal driver 220 simultaneously drives the liquid crystals corresponding to the pixels P1, P2 in the first scanning period. The liquid crystal driver 220 simultaneously drives the liquid crystals corresponding to the pixels P5, P6. The liquid crystals of the pixels, which correspond to the gate lines $L_1$, $L_2$, start to be driven in response to the horizontal synchronous signals, which correspond to the gate lines $L_1$ and $L_2$. As a result, the liquid crystal driver 220 simultaneously drives the liquid crystals corresponding to the pixels P3, P4. The liquid crystal driver 220 simultaneously drives the liquid crystals corresponding to the pixels P7, P8.

The luminance values defined for the pixels in the data group are equalized because both of the two signals input to the first corrector 217 are the equalizing signals. Therefore, the first correction values determined by means of the first correction table 222 become equivalent over the pixels in the data group. As a result, the luminance values defined by the first image signal which is output from the output port 221 also become equivalent for the pixels of the data group.

Therefore, the achieved luminance values of the pixels in the data group by means of the first scanning operation in response to the first image signal become substantially equivalent.

The second and third delay portions 215, 216 are described with reference to FIG. 12.

As described above, the equalizing signal generated by the first equalizer 211 is input to the second delay portion 215. As described above, the equalizing signal generated by the first equalizer 211 is converted into the first image signal by the output port 221 and then output to the liquid crystal driver 220 in the first scanning period while the equalizing signal generated by the first equalizer 211 is delayed by the second delay portion 215 and then output to the second corrector 218 in the second scanning period during which the subsequent second scanning operation is performed.

As aforementioned, the equalizing signal generated by the second equalizer 214 is input to the third delay portion 216. Since the second equalizer 214 generates the equalizing signal in response to the frame image signal, which the first delay portion 213 delays by one frame, the equalizing signal generated by the second equalizer 214 becomes equivalent to the equalizing signal which is output from the first equalizer 211 to generate the first image signal used for displaying the preceding frame image. The equalizing signal which the second equalizer 214 generates is used to generate the first correction signal by means of the first corrector 217 in the first scanning period as aforementioned, and further delayed by the third delay portion 216 to output to the second corrector 218 in the second scanning period during which the subsequent second scanning operation is performed.

Figure 15:
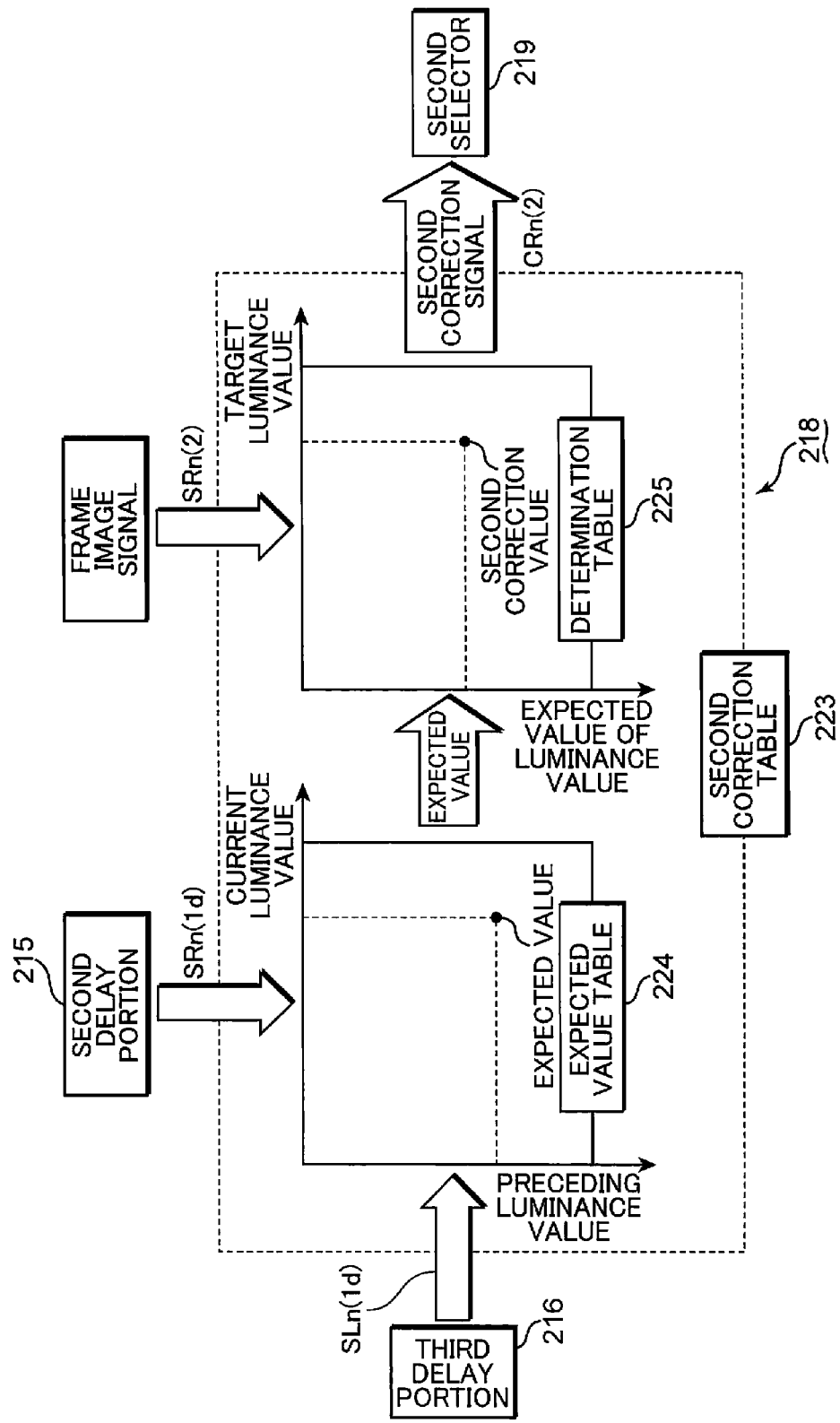
FIG. 15 is a conceptual view schematically showing a process for determining a second correction value by means of a second corrector of the video signal processor depicted in FIG. 12.

FIG. 15 is a conceptual view of a second correction table which the second corrector 218 stores. The second corrector 218 is described with reference to FIG. 1 and FIGS. 11 to 15.

The second corrector 218 receives the frame image signal, the equalizing signal output from the first equalizer 211 through the second delay portion 215 and the equalizing signal output from the second equalizer 214 through the third delay portion 216.

The second corrector 218 stores the second correction table 223. The second correction table 223 includes an expected value table 224 and a determination table 225.

The achieved luminance values of the pixels in the first scanning period do not always reach the set luminance values which the first image signal defines. The expected value table 224 stores data about expected luminance values of the pixels which are achieved in response to the first image signal in the first scanning period. The luminance value of the equalizing signal output from the second delay portion 215 are equivalent to the luminance value (current luminance value) of the equalizing signal from the first equalizer 211 described with reference to FIG. 14. Accordingly, the coordinate axis corresponding to an input from the second delay portion 215 in the expected value table 224 shown in FIG. 15 represents the current luminance value. The luminance value of the equalizing signal output from the third delay portion 216 is equivalent to the luminance value (preceding luminance value) of the equalizing signal from the second equalizer 214 described with reference to FIG. 14. Therefore, the coordinate axis corresponding to an input from the third delay portion 216 in the expected value table 224 shown in FIG. 15 represents the preceding luminance value.

The second corrector 218 extracts the luminance values, which the pixels P1 to P8 are expected to achieve in the first scanning period, from the data stored in the expected value table 224, in response to the current luminance values defined by the equalizing signal from the second delay portion 215 and the preceding luminance values defined by the equalizing signal from the third delay portion 216. In the present embodiment, the data extracted from the expected value table 224 by the second corrector 218 are exemplified as the achieved luminance values.

The luminance value which the frame image signal defines for each pixel is a target luminance value to be perceived by the viewer. Ideally, if the left shutter 311 is open, a luminance value of a pixel reaches the luminance value, which the L frame image signal defines, while if the right shutter 312 is open, the luminance value of the pixel reaches the luminance value, which the R frame image signal defines. As described with reference to FIG. 11, the difference between the target luminance value and the luminance value of the pixel viewed by the viewer are perceived as the crosstalk.

The determination table 225 stores data about second correction values which are output in the second scanning period. The coordinate axis corresponding to an input of the frame image signal in the determination table 225 shown in FIG. 15 shows the target luminance value which the frame image signal defines. The coordinate axis corresponding to an input from the expected value table 224 in the determination table 225 shows the expected value of the luminance value extracted from the expected value table 224 (i.e., the luminance value expected of the pixel to reach in the first scanning period). The second corrector 218 determines the second correction values for the pixels P1 to P8 in response to the target luminance values and the expected values of the luminance values, respectively, and then outputs a second correction signal including information about the second correction values to the second selector 219. For example, the absolute value of the second correction value is set to be larger as a difference between the expected value of the luminance value and the target luminance value increases. In the present embodiment, the second correction table 223 is exemplified as the second table. The data about the second correction values stored in the determination table 225 are exemplified as the second data.

The second selector 219 outputs the second correction signal in the second scanning period during which the second scanning operation is performed. Therefore, the output port 221 receives the frame image signal and the second correction signal generated by the second corrector 218 in the second scanning period.

The output port 221 adds the target luminance value, which the frame image signal defines, to the second correction value, which the second correction signal defines, to determine a drive luminance value, which is used in the second scanning period. In the second scanning period during which the second scanning operation is performed, the output port 221 outputs a second image signal, which includes information about the calculated drive luminance value, to the liquid crystal driver 220.

The liquid crystal driver 220 drives the liquid crystals of the liquid crystal panel 231 in response to the second image signal. As a result of driving the liquid crystals by means of the second image signal, the luminance values of the pixels P1 to P8 change toward the target luminance values.

Figure 16:
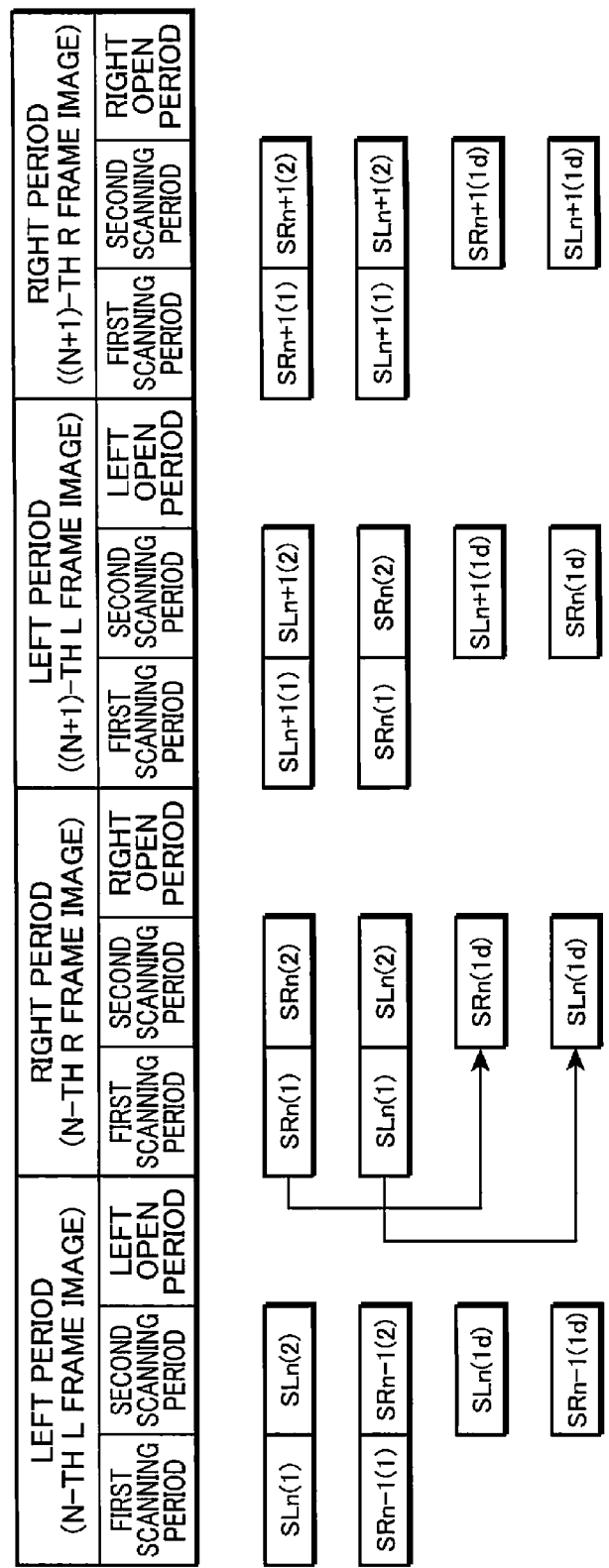
FIG. 16 is a schematic view showing signal outputs of the video signal processor depicted in FIG. 12.
Figure 17:
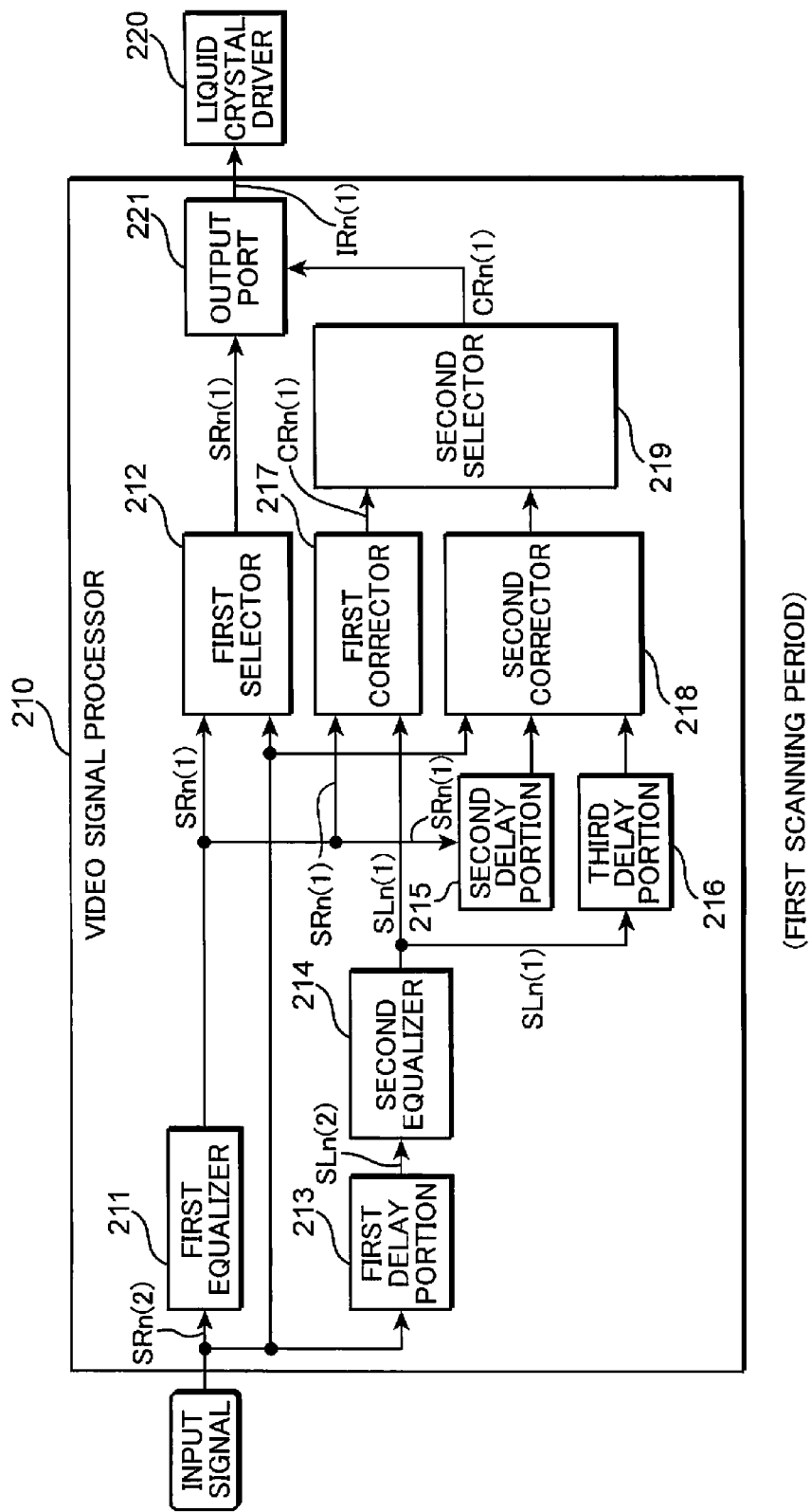
FIG. 17 is a block diagram showing signals which the video signal processor depicted in FIG. 12 outputs in a first scanning period.
Figure 18:
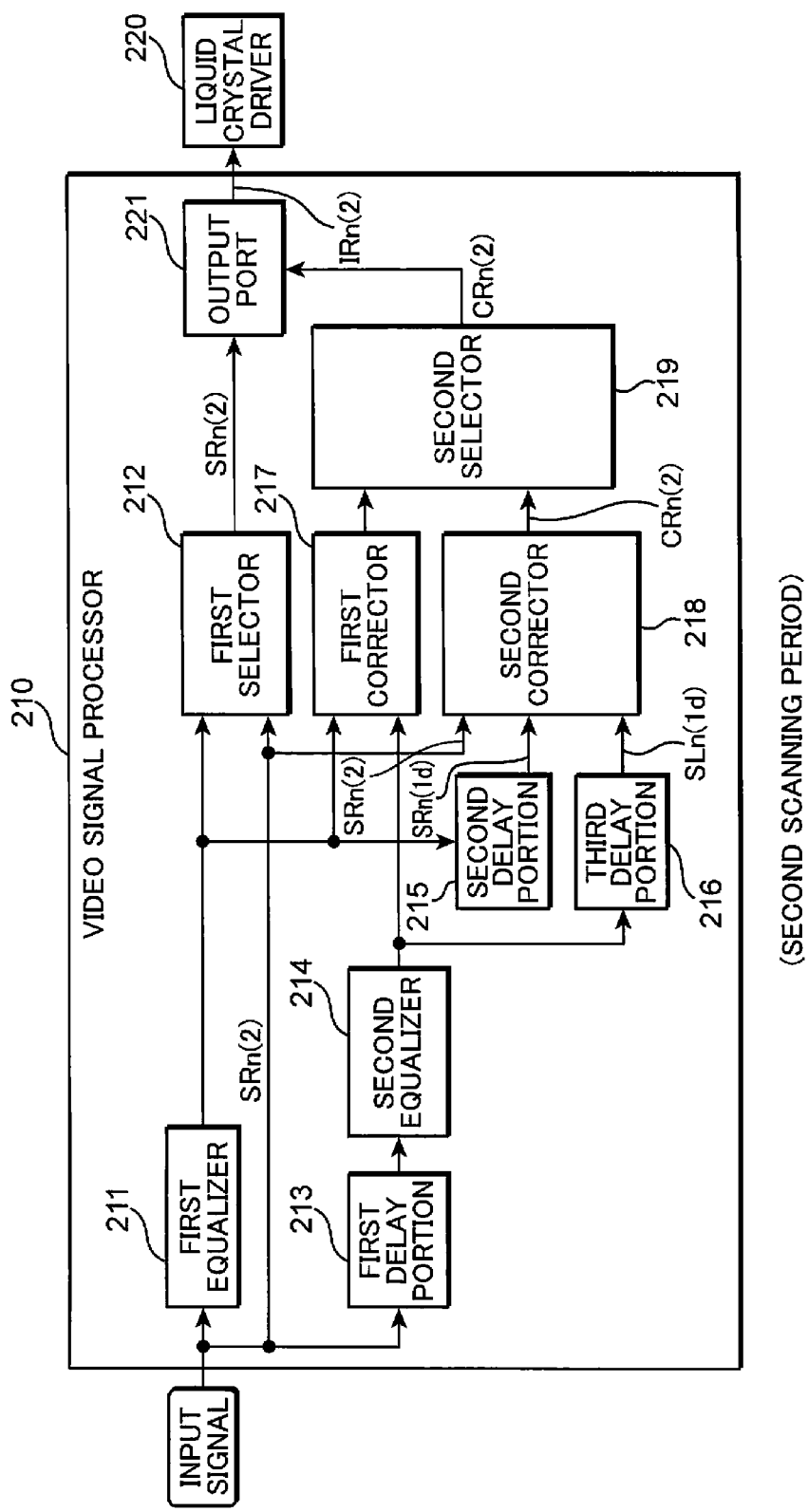
FIG. 18 is a block diagram showing signals which the video signal processor depicted in FIG. 12 outputs in a second scanning period.

FIG. 16 is a schematic view showing signal outputs in the video signal processor 210. FIG. 17 is a schematic block diagram showing signal outputs in the video signal processor 210 during the first scanning period. FIG. 18 is a schematic block diagram showing signal outputs in the video signal processor 210 during the second scanning period. The signal outputs in the video signal processor 210 are described with reference to FIGS. 13 to 18.

FIG. 16 shows the left period for displaying the N-th L frame image, the right period for displaying the N-th R frame image, the left period for displaying the (N+1)-th L frame image, and the right period for displaying the (N+1)-th R frame image. Signal outputs in the right period for displaying the N-th R frame image are described hereinafter. Principles of the signal outputs in the right period for displaying the N-th R frame image are applied even to the other periods.

As shown in FIG. 17, if the N-th R frame image signal SRn(2) is input in the first scanning period, the first equalizer 211 performs the averaging or selecting process described with reference to FIG. 13 to generate and output the equalizing signal SRn(1). The equalizing signal SRn(1) is input to the second corrector 218 through the first selector 212, the first corrector 217 and the second delay portion 215.

The first delay portion 213 has acquired the N-th L frame image signal SLn(2) in the left period for displaying the last N-th L frame image. The first delay portion 213 delays the L frame image signal SLn(2) to output the delayed signal to the second equalizer 214 in the first scanning period of the right eye for displaying the subsequent N-th R frame image.

The second equalizer 214 performs the averaging or selecting process described in association with FIG. 13 to generate and output an equalizing signal SLn(1). The equalizing signal SLn(1) is input to the first corrector 217 and the third delay portion 216.

As described with reference to FIG. 14, in the first scanning period, the first corrector 217 determines the first correction value by means of the first correction table 222 in response to the current luminance value which the equalizing signal SRn(1) defines and the preceding luminance value which the equalizing signal SLn(1) defines. The first corrector 217 outputs the first correction signal CRn(1), which includes information about the determined first correction value, to the second selector 219.

The first and second selectors 212, 219 output the equalizing signal SRn(1) and the first correction signal CRn(1) to the output port 221 in sync with each other. The output port 221 adds the equalizing signal SRn(1) to the first correction signal CRn(1), so as to generate the first image signal IRn(1). The first image signal IRn(1) is output to the liquid crystal driver 220.

As shown in FIG. 18, the N-th R frame image signal SRn(2) is input to not only the first equalizer 211 but also the first selector 212. In the second scanning period, the first selector 212 outputs the R frame image signal SRn(2).

The N-th R frame image signal SRn(2) is input to the second corrector 218. The second delay portion 215 delays the equalizing signal SRn(1) acquired in the first scanning period to output the delayed signal as the equalizing signal SRn(1d) to the second corrector 218 in the second scanning period. The third delay portion 216 delays the equalizing signal SLn(1) acquired in the first scanning period to output the delayed signal as the equalizing signal SLn(1d) to the second corrector 218 in the second scanning period.

As described with reference to FIG. 15, in the second scanning period, the second corrector 218 determines the expected value of the luminance value, which is achieved in the first scanning period, by means of the expected value table 224 in response to the current luminance value, which the equalizing signal SRn(1d) defines, and the preceding luminance value, which the equalizing signal SLn(1d) defines. The second corrector 218 determines the second correction value by means of the determination table 225 in response to the determined expected value and the target luminance value which the R frame image signal SRn(2) defines. The second corrector 218 outputs the second correction signal CRn(2), which defines information about the determined second correction value, to the second selector 219.

The second selector 219 outputs the second correction signal CRn(2) to the output port 221 in sync with the first selector 212. The output port 221 adds the R frame image signal SRn(2) to the second correction signal CRn(2), so as to generate the second image signal IRn(2). The second image signal IRn(2) is output to the liquid crystal driver 220.

Figure 19:
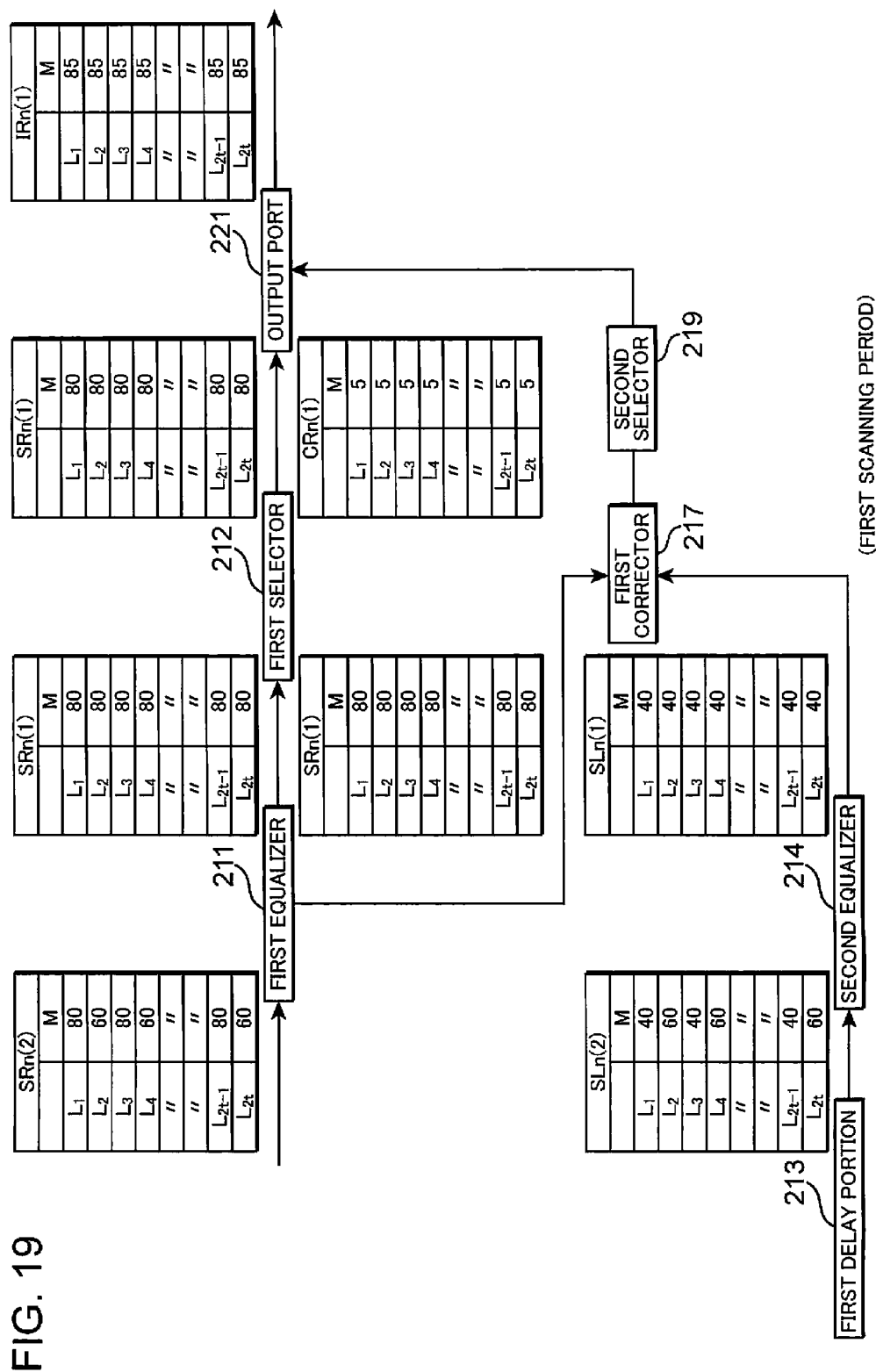
FIG. 19 is a schematic block diagram showing luminance data included in the signals which the video signal processor depicted in FIG. 12 outputs in the first scanning period.

FIG. 19 shows luminance data included in the signals which are output in the first scanning period. Changes in the luminance data in the first scanning period are described with reference to FIGS. 13, 14, 17 and 19. Tables of FIG. 19 show luminance value of pixels aligned along a data line M.

The N-th R frame image signal SRn(2) which is input to the first equalizer 211 represents luminance values of "80" for the pixels corresponding to the odd-numbered gate lines $L_1$, $L_3$, . . . , and $L_{2t-1}$. The R frame image signal SRn(2) represents luminance values of "60" for the pixels corresponding to the even-numbered gate lines $L_2$, $L_4$, . . . , and $L_{2t}$.

The first equalizer 211 executes the selecting process described with reference to FIG. 13 in response to the luminance values of the pixels corresponding to the odd-numbered gate lines $L_1$, $L_3$, . . . , and $L_{2t-1}$, to generate the equalizing signal SRn(1). As a result, the equalizing signal SRn(1) represents luminance values of "80" for the pixels corresponding to the odd-numbered gate lines $L_1$, $L_3$, . . . , and $L_{2t-1}$ and the pixels corresponding to the even-numbered gate lines $L_2$, $L_4$, . . . , and $L_{2t}$. The equalizing signal SRn(1) is output to the first selector 212 and the first corrector 217. The first selector 212 outputs the equalizing signal SRn(1) to the output port 221.

In the first scanning period of the right period for displaying the N-th R frame image, the first delay portion 213 outputs the L frame image signal SLn(2) acquired in the left period for displaying the last N-th L frame image. The L frame image signal SLn(2) defines luminance values of "40" for the pixels corresponding to the odd-numbered gate lines $L_1$, $L_3$, . . . , and $L_{2t-1}$. The L frame image signal SLn(2) defines luminance values of "60" for the pixels corresponding to the even-numbered gate lines $L_2$, $L_4$, . . . , and $L_{2t}$. The L frame image signal SLn(2) is input to the second equalizer 214.

The second equalizer 214 performs the selecting process described with reference to FIG. 13 in response to the luminance values of the pixels corresponding to the odd-numbered gate lines $L_1$, $L_3$, . . . , and $L_{2t-1}$, so as to generate the equalizing signal SLn(1). As a result, the equalizing signal SLn(1) represents luminance values of "40" for the pixels corresponding to the odd-numbered gate lines $L_1$, $L_3$, . . . , and $L_{2t-1}$ and the pixels corresponding to the even-numbered gate lines $L_2$, $L_4$, . . . , and $L_{2t}$. The equalizing signal SLn(1) is output to the first corrector 217.

As described with reference to FIG. 14, the first corrector 217 uses the first correction table 222 to generate the first correction signal CRn(1) in response to the equalizing signals SRn(1), SLn(1). The first corrector 217 determines the first correction value for each pixel in response to the luminance value, which the equalizing signal SRn(1) represents, and the preceding luminance value, which the equalizing signal SLn(1) represents. Since the equalizing signal SRn(1) shown in FIG. 19 represents the current luminance values of "80" for all pixels along the data line M while the equalizing signal SLn(1) represents the preceding luminance values of "40" for all pixels along the data line M, the first corrector 217 determines first correction values of "5" for all pixels along the data line M to generate the first correction signal CRn(1). The first correction signal CRn(1) is then output to the output port 221 through the second selector 219.

The output port 221 adds the luminance value, which the first correction signal CRn(1) indicates, to the first correction value, which the equalizing signal SRn(1) indicates for each pixel. Since the equalizing signal SRn(1) shown in FIG. 19 represents the current luminance values of "80" for all pixels along the data line M while the first correction signal CRn(1) represents the first correction values of "5" for all pixels along the data line M, the first image signal IRn(1), which is output from the output port 221, defines the luminance values of "85" for all pixels along the data line M.

Figure 20:
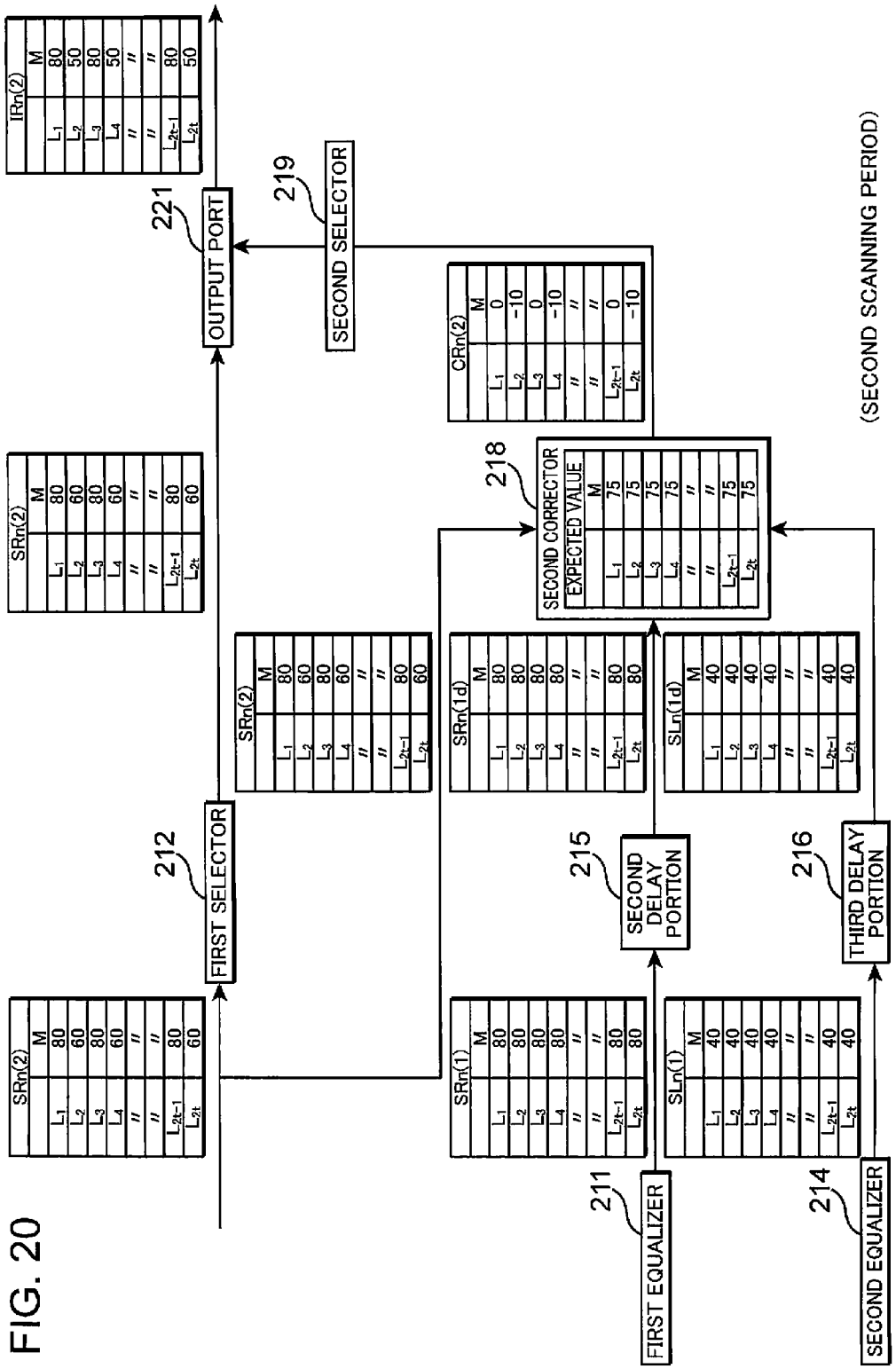
FIG. 20 is a schematic block diagram showing luminance data included in the signals which the video signal processor depicted in FIG. 12 outputs in the second scanning period.

FIG. 20 shows luminance data included in the signals which are output in the second scanning period. Changes in luminance data in the second scanning period are described with reference to FIG. 15 and FIGS. 17 to 20. The tables of FIG. 20 show the luminance values of the pixels aligned along the data line M.

The N-th R frame image signal SRn(2) is input to the first selector 212 and the second corrector 218. The first selector 212 outputs the R frame image signal SRn(2) to the output port 221 in the second scanning period.

In the first scanning period, the equalizing signal SRn(1) output from the first equalizer 211 is input to the second delay portion 215. The second delay portion 215 delays the equalizing signal SRn(1) to output the delayed signal as the equalizing signal SRn(1d) in the second scanning period. It should be noted that the luminance value which the equalizing signal SRn(1) defines for each pixel and the luminance value which the equalizing processes SRn(1d) defines for each pixel are equivalent.

In the first scanning period, the equalizing signal SLn(1) output from the second equalizer 214 is input to the third delay portion 216. The third delay portion 216 delays the equalizing signal SLn(1) to output the delayed signal as the equalizing signal SLn(1d) in the second scanning period. It should be noted that the luminance value which the equalizing signal SLn(1) defines for each pixel and the luminance value which the equalizing processes SLn(1d) defines for each pixel are equivalent.

The second delay portion 215 outputs the equalizing signal SRn(1d) to the second corrector 218. The equalizing signal SRn(1d) represents luminance values of "80" for the pixels corresponding to the odd-numbered gate lines $L_1$, $L_3$, . . . , and $L_{2t-1}$ and the pixels corresponding to the even-numbered gate lines $L_2$, $L_4$, . . . , and $L_{2t}$.

The third delay portion 216 outputs the equalizing signal SLn(1d) to the second corrector 218. The equalizing signal SLn(1d) represents luminance values of "40" for the pixels corresponding to the odd-numbered gate lines $L_1$, $L_3$, . . . , and $L_{2t-1}$ and the pixels corresponding to the even-numbered gate lines $L_2$, $L_4$, . . . , and $L_{2t}$.

As described with reference to FIG. 15, the second corrector 218 uses the expected value table 224 to determine the expected value of the luminance value, which each pixel is expected to reach in the first scanning period in response to the current luminance value that the equalizing signal SRn(1d) represents, and the preceding luminance value which the equalizing signal SLn(1d) represents. Since the equalizing signal SRn(1) shown in FIG. 19 represents the current luminance values of "80" for all pixels along the data line M while the equalizing signal SLn(1) represents the current luminance values of "40" for all pixels along the data line M, the second corrector 218 determines the expected values of the luminance values of "75" for all pixels along the data line M.

The second corrector 218 then uses the determination table 225 to determine the second correction value for each pixel in response to the expected value of the luminance value determined for each pixel and the target luminance value which the R frame image signal SRn(2) defines for each pixel.

The R frame image signal SRn(2) shown in FIG. 20 defines the target luminance values of "80" for the pixels corresponding to the odd-numbered gate lines $L_1, L_3, \ldots,$ and $L_{2t-1}$. The expected values of the luminance values for the pixels corresponding to the odd-numbered gate lines $L_1, L_3, \ldots,$ and $L_{2t-1}$ determined by means of the expected value table 224 are "75". The luminance values of the pixels corresponding to the odd-numbered gate lines $L_1, L_3, \ldots,$ and $L_{2t-1}$ are close enough to the target luminance values of "80" in the first scanning period. Therefore, the second corrector 218 sets the second correction values of "0" for the luminance values of the pixels corresponding to the odd-numbered gate lines $L_1, L_3, \ldots,$ and $L_{2t-1}$.

The R frame image signal SRn(2) shown in FIG. 20 defines the target luminance values of "60" for the pixels corresponding to the even-numbered gate lines $L_2, L_4, \ldots,$ and $L_{2t}$. The expected values of the luminance values for the pixels corresponding to the even-numbered gate lines $L_2, L_4, \ldots,$ and $L_{2t}$ determined by means of the expected value table 224 are "75". The luminance values of the pixels corresponding to the odd-numbered gate lines $L_1, L_3, \ldots,$ and $L_{2t-1}$ are very higher than the target luminance values of "60" in the first scanning period. Thus, the second corrector 218 sets the second correction values of "−10" for the luminance values of the pixels corresponding to the even-numbered gate lines $L_2, L_4, \ldots,$ and $L_{2t}$.

The second corrector 218 generates the second correction signal CRn(2) including information about the second correction values set as described above. The second correction signal CRn(2) is output to the output port 221 through the second selector 219.

The output port 221 adds the luminance value, which the R frame image signal SRn(2) defines, to the second correction value, which the second correction signal CRn(2) defines for each pixel. Since the R frame image signal SRn(2) shown in FIG. 20 defines the target luminance values of "80" for the pixels corresponding to the odd-numbered gate lines $L_1, L_3, \ldots,$ and $L_{2t-1}$ while the second correction signal CRn(2) defines the second correction values of "0" for the pixels corresponding to the odd-numbered gate lines $L_1, L_3, \ldots,$ and $L_{2t-1}$, the second image signal IRn(2) which is output from the output port 221 defines the drive luminance values of "80" for the pixels corresponding to the odd-numbered gate lines $L_1, L_3, \ldots,$ and $L_{2t-1}$. Since the R frame image signal SRn(2) defines the target luminance values of "60" for the pixels corresponding to the even-numbered gate lines $L_2, L_4, \ldots,$ and $L_{2t}$ while the second correction signal CRn(2) defines the second correction values of "−10" for the pixels corresponding to the even-numbered gate lines $L_2, L_4, \ldots,$ and $L_{2t}$, the second image signal IRn(2) output from the output port 221 defines the target luminance values of "50" for the pixels corresponding to the even-numbered gate lines $L_2, L_4, \ldots,$ and $L_{2t}$.

Figure 21:
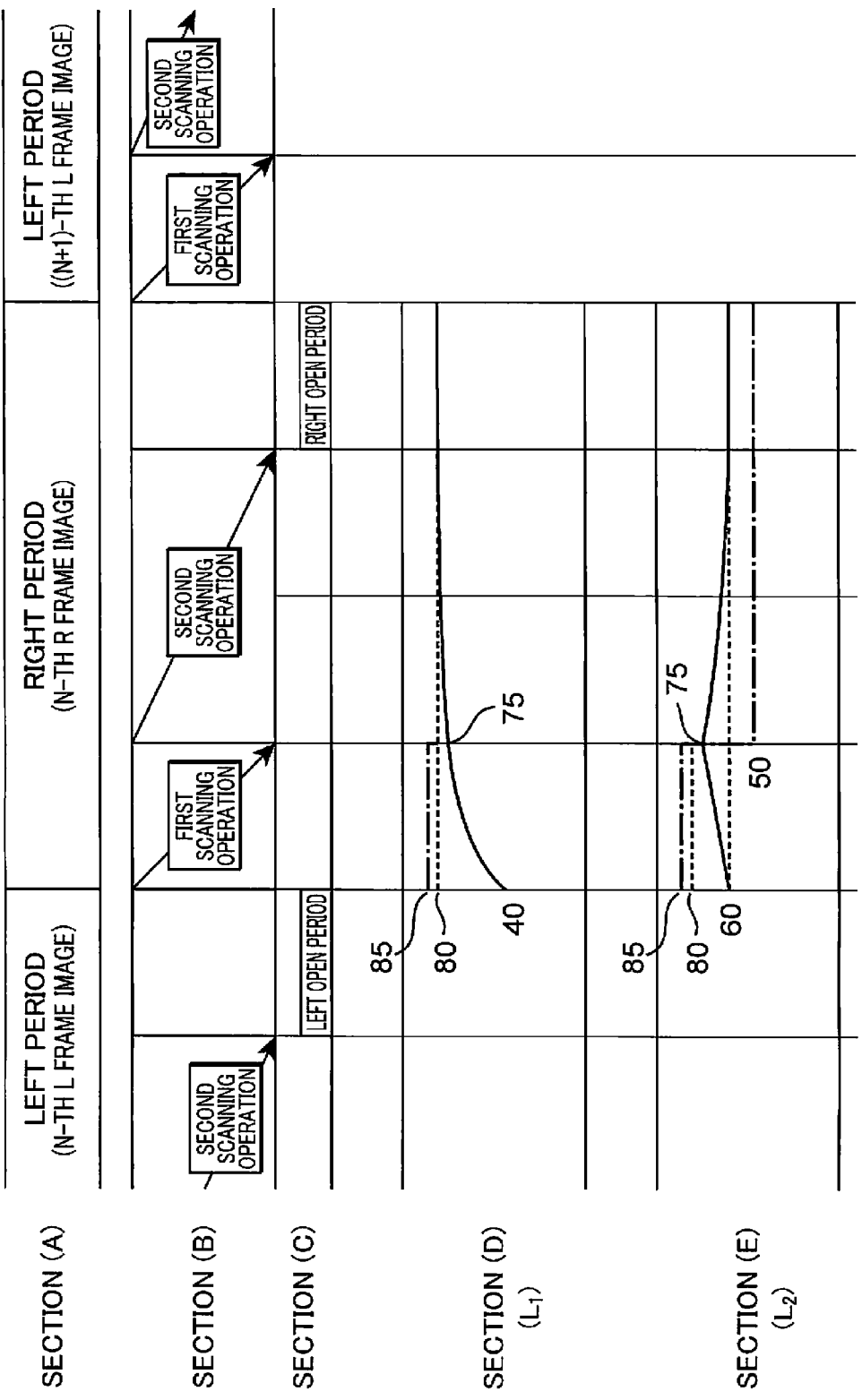
FIG. 21 is a timing chart schematically showing changes in luminance of pixels which are caused by the scanning operations by means of first and second image signals output from an output port of the video signal processor depicted in FIG. 12.

FIG. 21 is a schematic timing chart showing changes in luminance of pixels in response to the first and second image signals IRn(1), IRn(2) described with reference to FIGS. 19 and 20. The changes in the luminance of the pixels are described with reference to FIGS. 1, 5A, 5B and 11 and FIGS. 19 to 21.

The left period for displaying the N-th L frame image, the right period for displaying the N-th R frame image and the left period for displaying the (N+1)-th L frame image are shown in the section (A) of FIG. 21. The changes in luminance of the pixels in the right period are described hereinafter.

The first and second scanning operations are shown in the section (B) of FIG. 21. In the first scanning period of the right period, the liquid crystal driver 220 uses the first image signal IRn(1) for the first scanning operation. The liquid crystal driver 220 simultaneously drives the liquid crystal corresponding to a set of the pixels corresponding to one odd-numbered gate line and the pixels corresponding to one even-numbered gate line as described with reference to FIG. 5A. As a result, the first image signal IRn(1) is sequentially written in the set of the gate lines $L_1, L_2$, the set of the gate lines $L_3, L_4, \ldots,$ and the set of the gate lines $L_{2t-1}, L_{2t}$. In the second scanning period of the right period, the liquid crystal driver 220 uses the second image signal IRn(2) to perform the second scanning operation. The liquid crystal driver 220 sequentially writes the second image signal IRn(2) in the gate lines $L_1, L_2, L_3, L_4, \ldots, L_{2t-1},$ and $L_{2t}$ as described with reference to FIG. 5B.

The section (C) of FIG. 21 shows the opening/closing operation of the optical shutter portion 310. The left shutter 311 is open in a period after the second scanning operation ends and before the right period starts. The right shutter 312 is open in a period after the second scanning operation ends and before another left period starts.

The section (D) of FIG. 21 shows a change in luminance of the pixel positioned at the intersection of the gate line $L_1$ and the data line M. The section (E) of FIG. 21 shows a change in luminance of the pixel positioned at the intersection of the gate line $L_2$ and the data line M.

As described with reference to FIGS. 19 and 20, the L frame image signal SLn(2) used for displaying the L frame image in the last left period defines the target luminance values of "40" for the pixels corresponding to the odd-numbered gate lines $L_1, L_3, \ldots,$ and $L_{2t-1}$. Thus, the luminance value of the pixel shown in the section (D) starts changing from about "40". The L frame image signal SLn(2) defines the target luminance values of "60" for the pixels corresponding to the even-numbered gate lines $L_2, L_4, \ldots,$ and $L_{2t}$. Therefore, the luminance value of the pixel shown in the section (E) starts changing from about "60".

As described with reference to FIG. 19, the first image signal IRn(1) sets the drive luminance values of "85" for all pixels along the data line M. Therefore, if the first scanning operation is performed, the luminance values of the pixels along the data line M start changing toward the drive luminance value of "85".

As a result of the first scanning operation, immediately before the second scanning operation starts, the luminance values of the pixels along the data line M reach the expected values of the luminance values of "75" determined by means of the expected value table 224 of the second corrector 218 or become substantially the expected values of the luminance values of "75".

The second image signal IRn(2) sets the drive luminance values of "80" for the pixels corresponding to the odd-numbered gate lines $L_1, L_3, \ldots,$ and $L_{2t-1}$ as described with reference to FIG. 20. Thus, the pixels corresponding to the odd-numbered gate lines $L_1, L_3, \ldots,$ and $L_{2t-1}$ start changing toward the drive luminance values of "80" during the second scanning operation. As describe above, since the luminance values of the pixels corresponding to the odd-numbered gate lines $L_1, L_3, \ldots,$ and $L_{2t-1}$ are close enough to the target luminance values which the R frame image signal SRn(2) defines, as the result of the first scanning operation, the luminance values of the pixels reach the target luminance values when the right shutter 312 is opened.

The second image signal IRn(2) defines the drive luminance values of "50" for the pixels corresponding to the even-numbered gate lines $L_2, L_4, \ldots,$ and $L_{2f}$. Therefore, the pixels corresponding to the even-numbered gate lines $L_2$, $L_4, \ldots,$ and $L_{2f}$ start changing toward the drive luminance value of "50" during the second scanning operation. Since the drive luminance values of "50" are lower than the target luminance values of "60" which the R frame image signal SRn(2) defines, the liquid crystals corresponding to the pixels corresponding to the even-numbered gate lines $L_2, L_4, \ldots,$ and $L_{2f}$ are driven by a relatively large drive force. Therefore, the luminance values of the pixels are sufficiently close to the target luminance values, which the R frame image signal SRn(2) defines, when the right shutter 312 is opened.

As shown in the section (E) of FIG. 21, the pixels corresponding to the gate line $L_2$, on which the second scanning operation is performed relatively early, substantially reach the target luminance value of "60" when the right shutter 312 is opened.

A further improvement of the crosstalk may be achieved even by opening/closing control on the optical shutter portion 310 of the eyeglass device 300 and/or lighting control on the backlight source 232. For example, an amount of the crosstalk is reduced by delaying each of open timings at which the left and right shutters 311, 312 of the eyeglass device 300 are opened. The delay of the timings, at which the left and right shutters 311, 312 are opened, may shorten the open periods of the left and right shutters 311, 312 to decrease a light amount which is perceived by the viewer. The decrease in the light amount perceived by the viewer which results from the shorter open periods of the left and right shutters 311, 312 may be compensated by an increased light amount from the backlight source 232. Therefore, the further reduction of the crosstalk is appropriately achieved.

(Second Embodiment)

Figure 22:
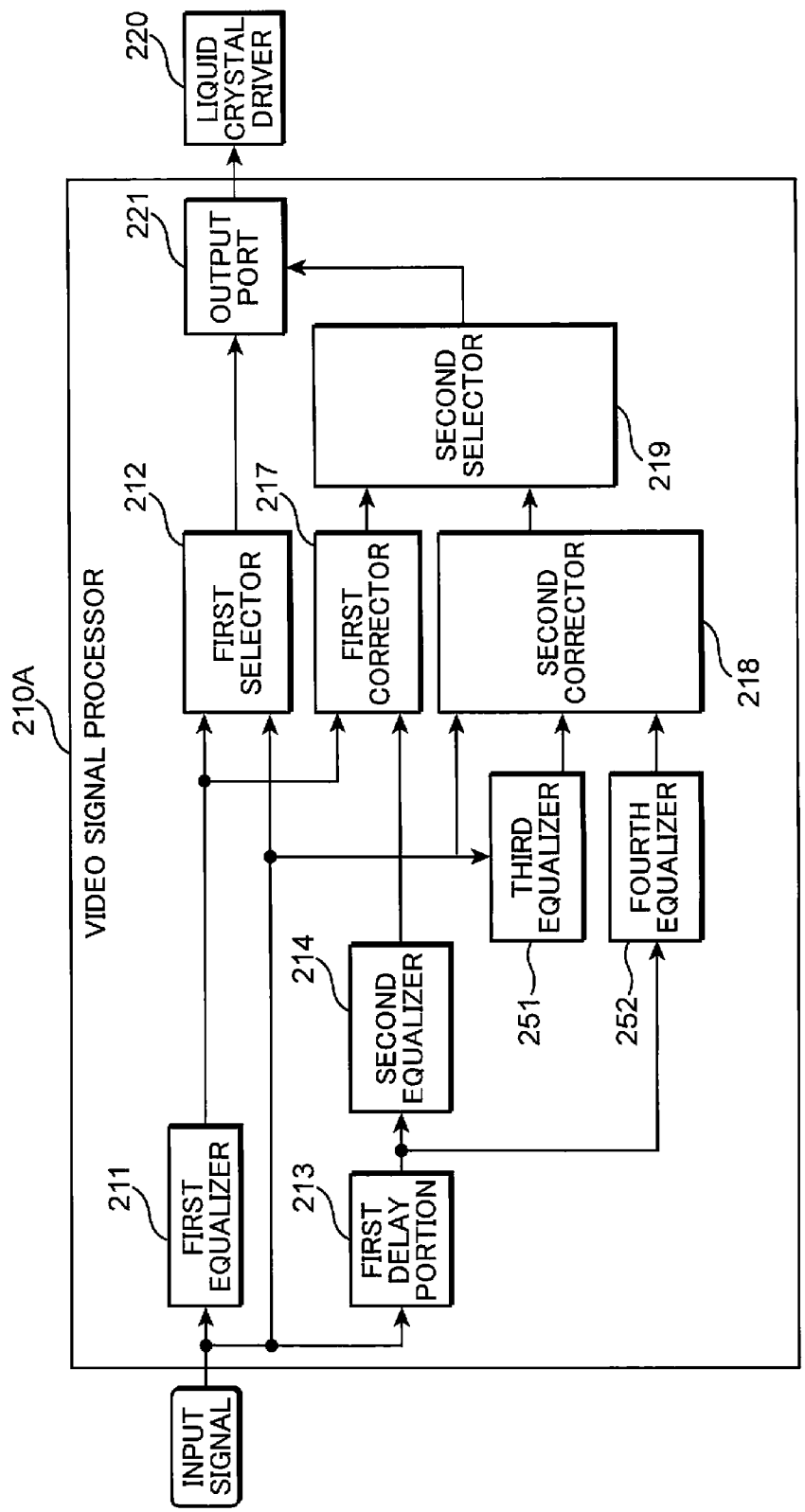
FIG. 22 is a schematic block diagram of a video signal processor used in a video viewing system and a display device according to the second embodiment.

FIG. 22 is a schematic block diagram of a video signal processor used in a video viewing system and a display device according to the second embodiment. Components other than the video signal processor are the same as the components described in the context of the first embodiment. The same reference symbols are assigned to the identical components to the first embodiment. The descriptions in the context of the first embodiment are appropriately applied to components which are not described below. The video signal processor used in the video viewing system and the display device according to the second embodiment is described with reference to FIGS. 13 and 22.

The video signal processor 210A used in the video viewing system and the display device according to the second embodiment includes a third equalizer 251 and a fourth equalizer 252, in addition to the first equalizer 211, the first selector 212, the first delay portion 213, the second equalizer 214, the first corrector 217, the second corrector 218, the second selector 219 and the output port 221, which are the same as those of the first embodiment. The third and fourth equalizers 251, 252 perform the averaging or selecting process described with reference to FIG. 13.

Figure 23:
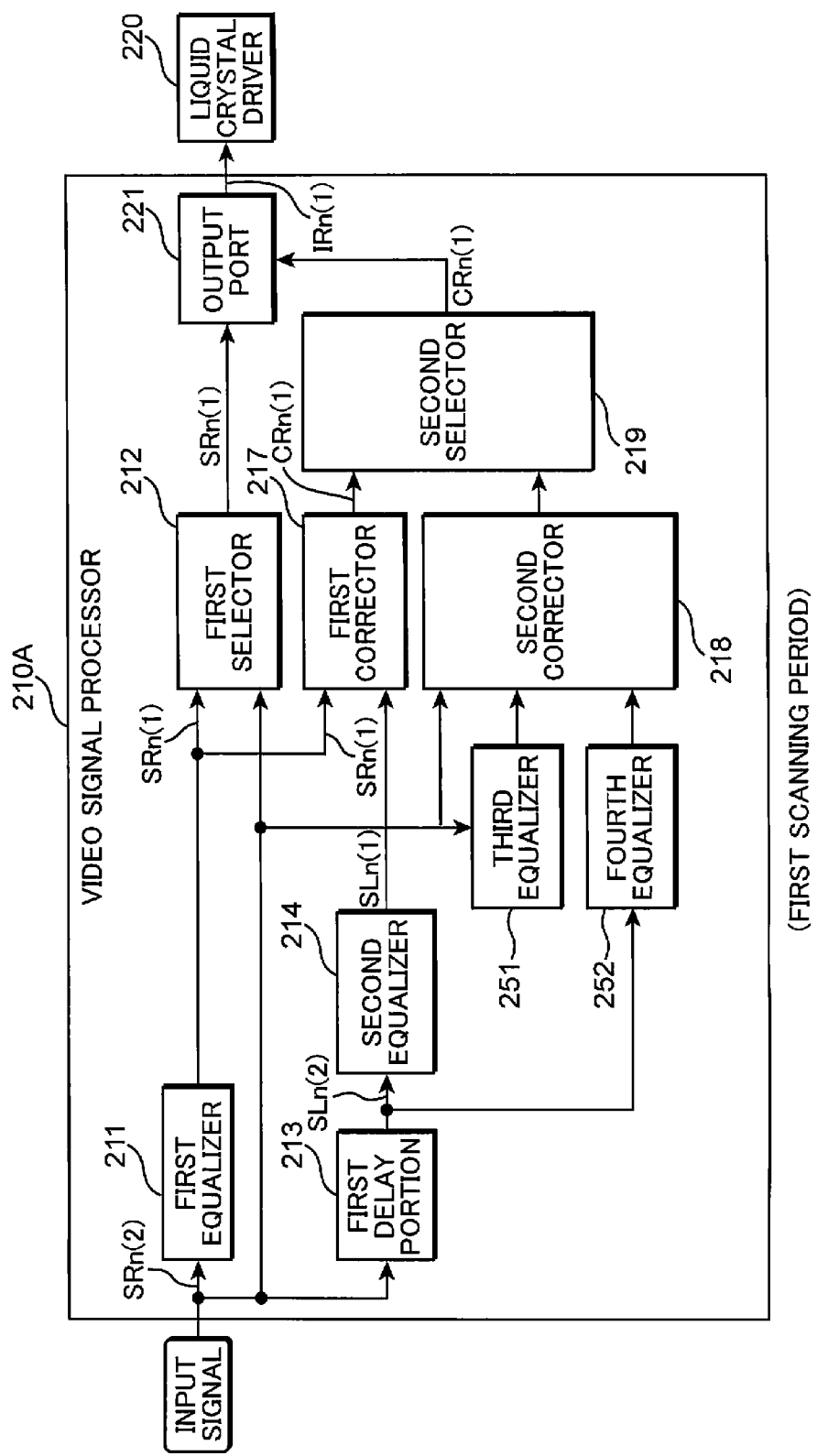
FIG. 23 is a schematic block diagram showing signals which the video signal processor depicted in FIG. 22 outputs in the first scanning period.
Figure 24:
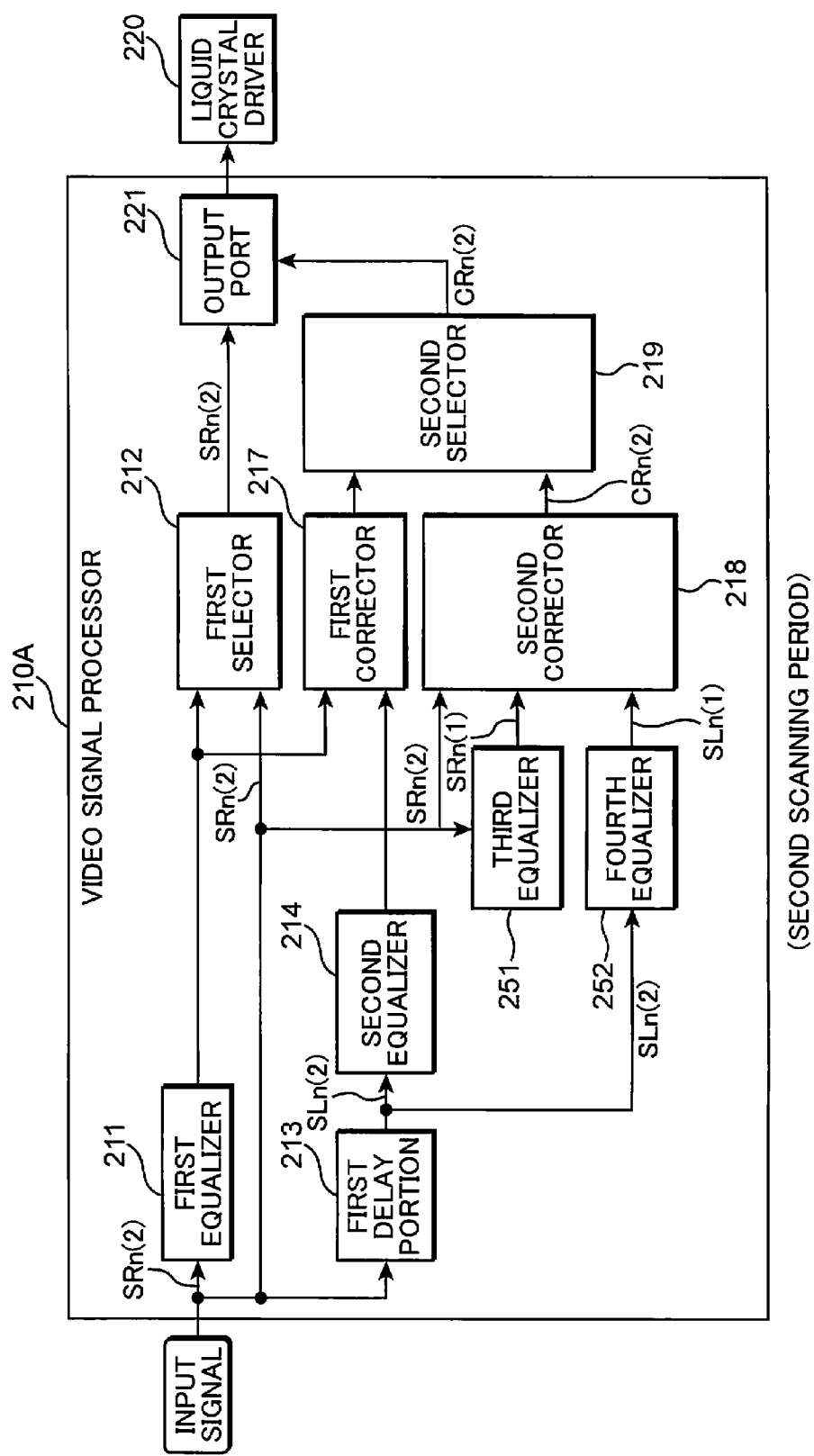
FIG. 24 is a schematic block diagram showing signals which the video signal processor depicted in FIG. 22 outputs in the second scanning period.

FIG. 23 is a schematic block diagram showing signal outputs in the video signal processor 210A in the first scanning period. FIG. 24 is schematic block diagram showing signal outputs in the video signal processor 210A in the second scanning period. The signal outputs in the video signal processor 210A are described with reference to FIGS. 13 to 18 and FIGS. 23 and 24. FIG. 16 is used to show the signal outputs in the video signal processor 210A.

If the N-th R frame image signal SRn(2) is input, the first equalizer 211 performs the averaging or selecting process described with reference to FIG. 13 to generate and output the equalizing signal SRn(1) in the first scanning period. The equalizing signal SRn(1) is input to the first selector 212 and the first corrector 217.

The first delay portion 213 acquires the N-th L frame image signal SLn(2) in the left period for displaying the last N-th L frame image. The first delay portion 213 delays the L frame image signal SLn(2) to output the delayed signal to the second equalizer 214 in the first scanning period of the right period for displaying the subsequent N-th R frame image.

The second equalizer 214 performs the averaging or selecting process described with reference to FIG. 13 to generate and output the equalizing signal SLn(1). The equalizing signal SLn(1) is input to the first corrector 217.

The input signals to the first corrector 217 (the second embodiment) shown in FIG. 23 are the same as the input signals to the first corrector 217 (the first embodiment) shown in FIG. 17. Therefore, the first corrector 217 of the second embodiment also outputs the first correction signal CRn(1), like the first embodiment. The first correction signal CRn(1) is generated according to the generation principles described with reference to FIG. 14.

In the first scanning period, the first and second selectors 212, 219 output the equalizing signal SRn(1) and the first correction signal CRn(1) to the output port 221, respectively, in sync with each other. The input signals to the output port 221 (the second embodiment) shown in FIG. 23 are the same as the input signals to the output port 221 (the first embodiment) shown in FIG. 17. Therefore, the output port 221 generates the first image signal IRn(1) in the first scanning period. The generation of the first image signal IRn(1) follows the principles described in the context of the first embodiment. The first image signal IRn(1) is output to the liquid crystal driver 220.

The N-th R frame image signal SRn(2) is input to not only the first equalizer 211 but also the first selector 212. In the second scanning period, the first selector 212 outputs the R frame image signal SRn(2).

The N-th R frame image signal SRn(2) is input to the second corrector 218 and the third equalizer 251. The third equalizer 251 performs the averaging or selecting process described with reference to FIG. 13 to generate and output the equalizing signal SRn(1). The equalizing signal SRn(1) is input to the second corrector 218.

The N-th L frame image signal SLn(2) output from the first delay portion 213 is output to not only the second equalizer 214 but also the fourth equalizer 252. The third equalizer 251 performs the averaging or selecting process described with reference to FIG. 13 to generate and output the equalizing signal SLn(1). The equalizing signal SLn(1) is input to the second corrector 218.

The equalizing signal SRn(1) input to the second corrector 218 of the second embodiment includes data about current luminance values equivalent to those of the equalizing signal SRn(1*d*) input to the second corrector 218 of the first embodiment. The equalizing signal SLn(1) input to the second corrector 218 of the second embodiment includes data about preceding luminance values equivalent to those of the equalizing signal SLn(1*d*) input to the second corrector 218 of the first embodiment. The second corrector 218 of the second embodiment receives the R frame image signal SRn(2), like the second corrector 218 of the first embodiment. Thus, the second correction signal CRn(2) is generated according to the principles described with reference to FIG. 15 like the first embodiment.

The second selector 219 outputs the second correction signal CRn(2) to the output port 221 in the second scanning period. The input signals to the output port 221 (the second embodiment) shown in FIG. 24 are the same as the input signals to the output port 221 (the first embodiment) shown in FIG. 18. Thus, the output port 221 generates the second image signal IRn(2) in the second scanning period. The generation of the second image signal IRn(2) follows the principles described in the context of the first embodiment. The second image signal IRn(2) is output to the liquid crystal driver 220.

The video signal processor 210A of the second embodiment has the third and fourth equalizers 251, 252, instead of the second and third delay portions 215, 216 of the first embodiment. Therefore, the video signal processor 210A of the second embodiment is superior to the video signal processor 210 of the first embodiment in terms of reduced memory elements which function as the second and third delay portions 215, 216.

(Third Embodiment)

In the third embodiment, control in response to a display area of a frame image is described.

Figure 25:
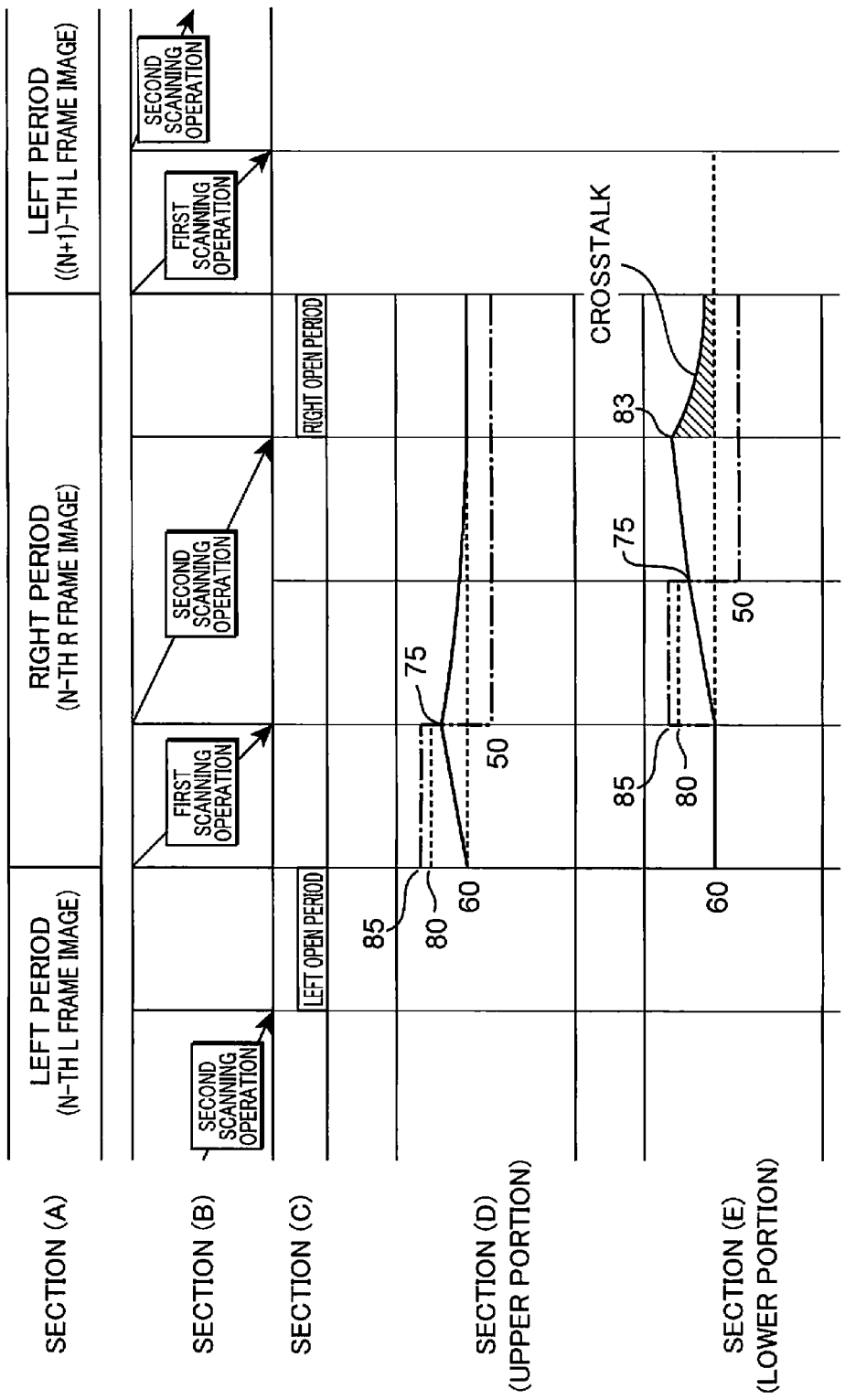
FIG. 25 is a timing chart showing problems of control without taking account of a pixel position.

FIG. 25 is a schematic timing chart showing changes in luminance of pixels when the second corrector 218 outputs equivalent second correction values for an upper portion and a lower portion of a frame image. Resultant problems from the equivalent second correction values used for the upper and lower portions of the frame image are described with reference to FIGS. 1, 5A, 5B, 15 and 25.

The left period for displaying the N-th L frame image, the right period for displaying the N-th R frame image and the left period for displaying the (N+1)-th L frame image are shown in the section (A) of FIG. 25. Changes in luminance of pixels in the right period are described.

The section (B) of FIG. 25 shows the first and second scanning operations. The second scanning period during which the second scanning operation is performed is longer than the first scanning period during which the first scanning operation is performed as described with reference to FIGS. 5A and 5B.

The section (C) of FIG. 25 shows the opening/closing operation of the optical shutter portion 310. The left shutter 311 is open in a period after the second scanning operation ends and before the right period starts. The right shutter 312 is open in a period after the second scanning opertion ends and before the left period starts.

The section (D) of FIG. 25 is a timing chart showing changes in luminance of a pixel positioned at the upper portion of the liquid crystal panel 231. The section (E) of FIG. 25 is a timing chart showing a change in luminance of a pixel positioned at the lower portion of the liquid crystal panel 231. The timing charts shown in the sections (D), (E) of FIG. 25 are obtained by means of the L and R frame image signals which set equivalent target luminance values for the pixels in the upper and lower portions of the liquid crystal panel 231.

As described in the context of the first and second embodiments, the second corrector 218 determines the second correction value in response to the target luminance values which the L and R frame image signals define. Therefore, if the L and R frame image signals set the equivalent target luminance values for the pixels positioned at the upper and lower portions of the liquid crystal panel 231 and unless the second corrector 218 takes account of the pixel positions, the second corrector 218 determines equivalent second correction values for the pixels at the upper and lower portions of the liquid crystal panel 231, respectively. In the timing chart of FIG. 25, the second corrector 218 sets an expected value of "75" in response to the target luminance values, which the L and R frame image signals define to output the second correction signal CRn(2).

As described above, since the second scanning period during which the second scanning operation is performed is longer than the first scanning period during which the first scanning operation is performed, luminance values which the pixels achieve are different between the pixels at the upper and lower portions in the liquid crystal panel 231 at the beginning of the second scanning period. In the timing chart of FIG. 25, the pixel at the upper portion of the liquid crystal panel 231 achieves the luminance value of "75" which is equivalent to the expected value whereas the pixel at the lower portion of the liquid crystal panel 231 achieves a luminance value of "83" larger than the expected value. Thus, the crosstalk is easily perceived by the viewer in the lower portion (an area where the timing of the scanning operation is late) of the liquid crystal panel 231 although the crosstalk is improved as compared to the process which does not consider the expected value.

Figure 26:
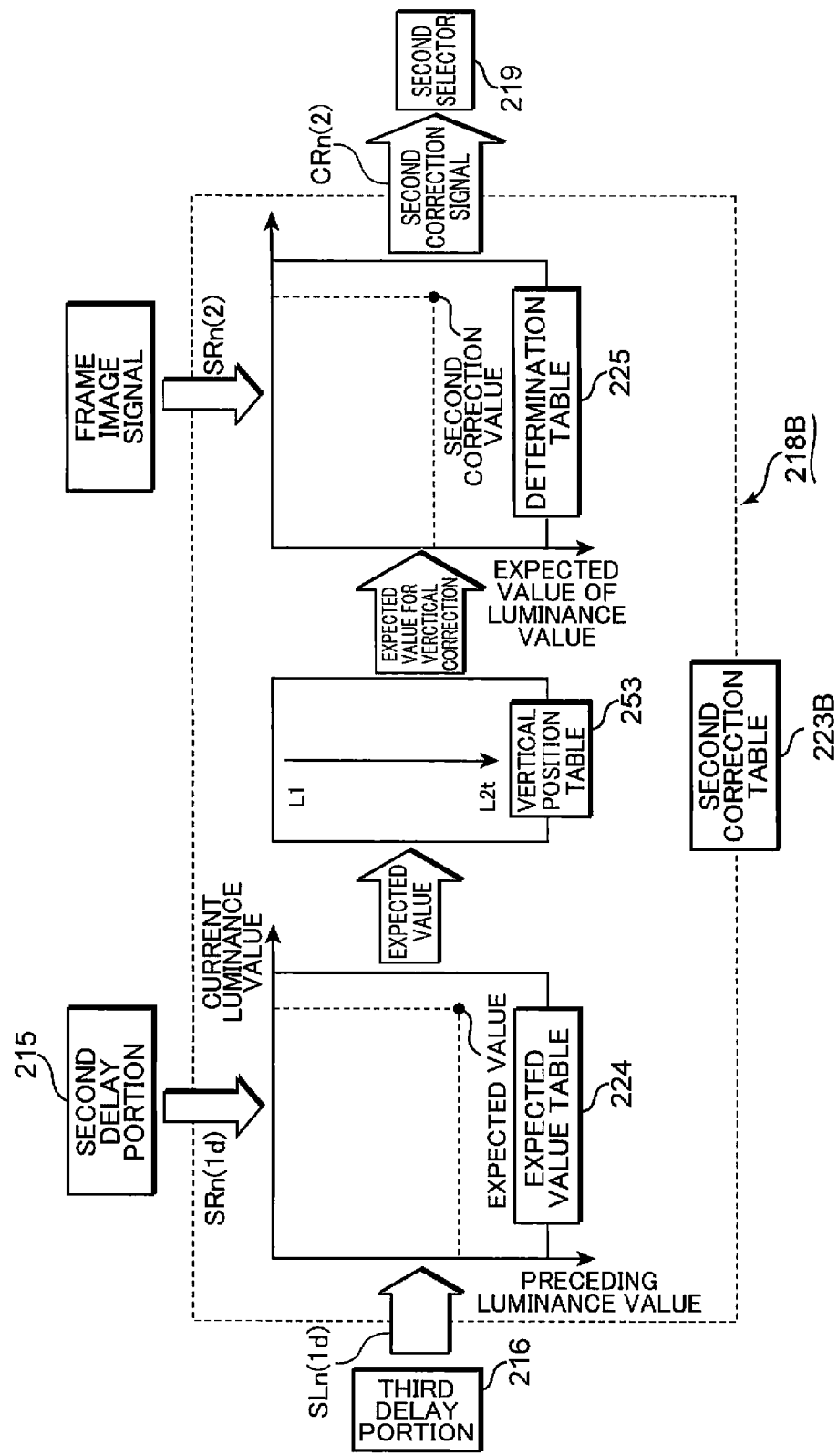
FIG. 26 is a conceptual view schematically showing a generating process of second correction signals by means of a second corrector used in a video viewing system and a display device according to the third embodiment.

FIG. 26 is a conceptual view of a second correction table stored in the second corrector, which is used in a video viewing system and a display device according to the third embodiment. Components other than the second corrector are identical to the components described in the context of the first or second embodiment. The same reference symbols are assigned to the same components as those of the first embodiment. The descriptions in the context of the first embodiment are appropriately applied to components which are not described below. The second correction table, which the second corrector stores, is described with reference to FIGS. 15 and 26.

The second correction table 223B stored in the second corrector 218B includes a vertical position table 253, in addition to the expected value table 224 and the determination table 225 which are the same as those of the first embodiment. A process for determining an expected value by means of the expected value table 224 follows the principles of the first embodiment.

The vertical position table 253 includes vertical correction data which are determined in response to vertical positions of the pixels. The second corrector 218B uses the vertical correction value obtained from vertical position table 253B to determine a vertical correction value in response to the vertical positions of the pixels, which are read from the equalizing signals SRn(1d) and/or SLn(1d). The second corrector 218B uses the vertical correction value obtained from the vertical position table 253 to correct the expected value obtained from the expected value table 224. The second corrector 218B uses the determination table 225 to determine the second correction value in response to the corrected expected value and the frame image signal SRn(2). As a result, a drive luminance value having a value farther from the target luminance value defined by the R frame image signal SRn(2) is set for a pixel on the gate line $L_{2t}$ on which the second scanning operation starts relatively later. In the present embodiment, the vertical position table 253 is exemplified as the position table for adjusting the expected value in response to the positions of the pixels.

Figure 27:
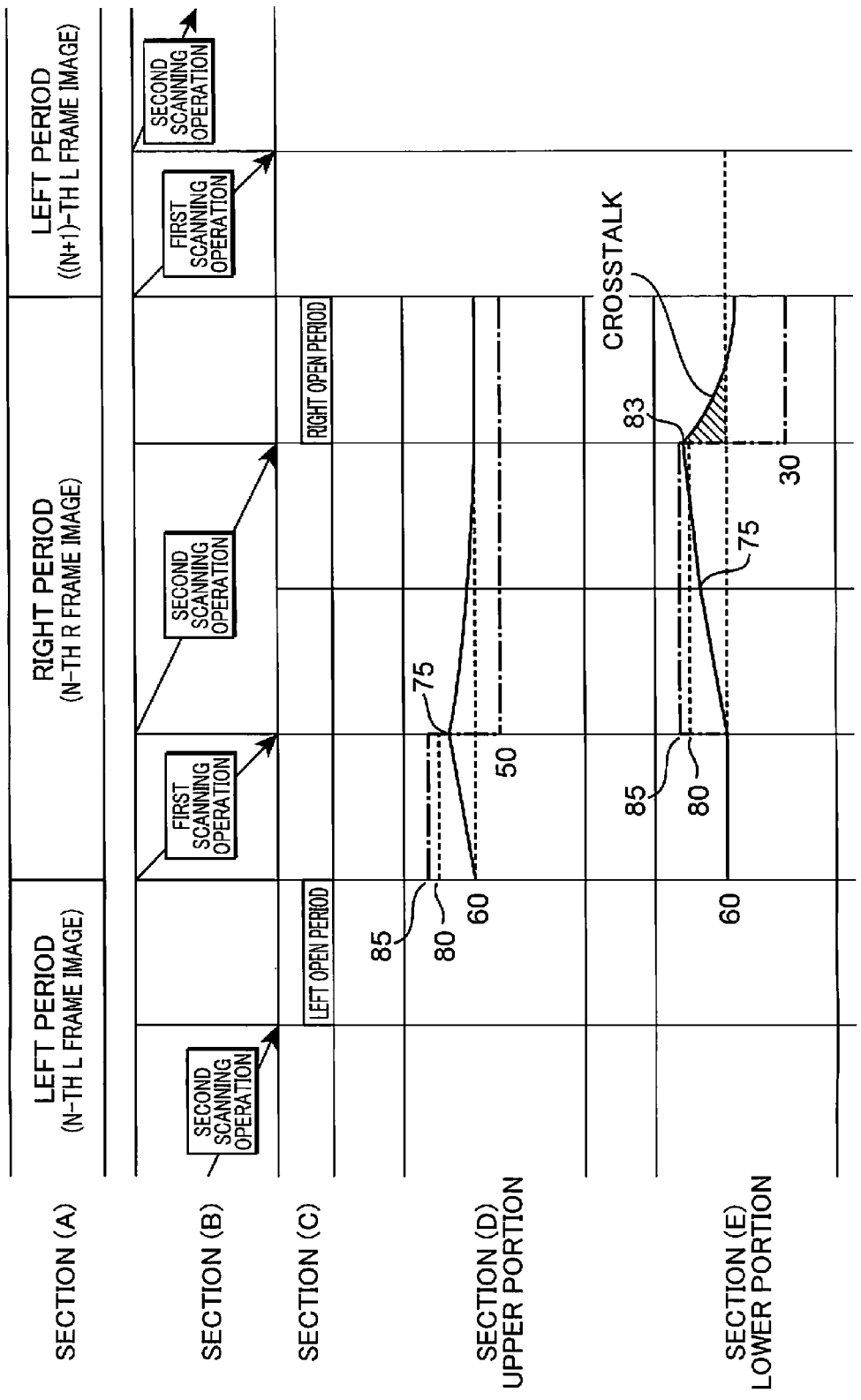
FIG. 27 is a timing chart schematically showing changes in luminance of pixels of the video viewing system and the display device according to the third embodiment.

FIG. 27 is a schematic timing chart showing changes in luminance of pixels. The sections (A) to (E) of FIG. 27 are similar to the sections (A) to (E) of FIG. 25. Decreased crosstalk of the pixels at the lower portion is described with reference to FIGS. 25 and 26.

Since the second corrector 218B adjusts a magnitude of the second correction value in response to the vertical positions of the pixels, a pixel on the gate line $L_2$ on which the second scanning operation starts relatively early reduces the luminance value toward a drive luminance value of "50" in the second scanning operation while a pixel on the gate line $L_{2t}$ on which the second scanning operation starts late reduces the luminance value toward a drive luminance value of "30". Therefore, as the start timing of the second scanning operation becomes late, the luminance value of the pixel changes rapidly. As a result, the crosstalk at the area where the start timing of the second scanning operation is late is appropriately decreased.

(Fourth Embodiment)

Figure 28:
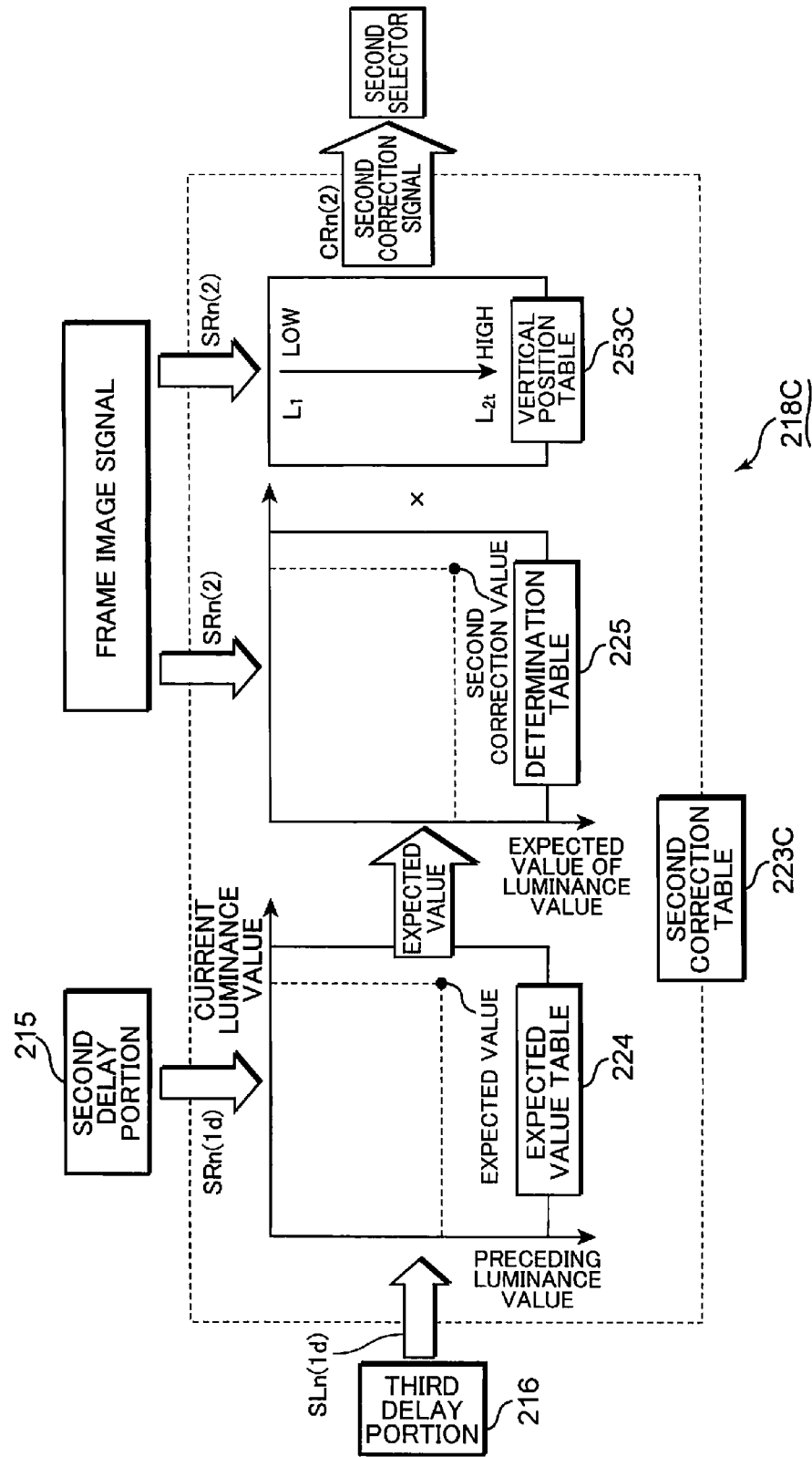
FIG. 28 is a conceptual view schematically showing a generating process of second correction signals by means of a second corrector used in a video viewing system and a display device according to the fourth embodiment.

FIG. 28 is a conceptual view of a second correction table which is stored in the second corrector of a video viewing system and a display device according to the fourth embodiment. Components other than the second corrector are identical to the components described in the context of the first or second embodiment. The same reference symbols are assigned to the components identical to those of the first embodiment. The descriptions in the context of the first embodiment are appropriately applied to components which are not described below. The second correction table stored in the second corrector is described with reference to FIGS. 15 and 28.

The second correction table 223C which is stored in the second corrector 218C includes a vertical position table 253C, in addition to the expected value table 224 and the determination table 225 which are the same as those of the first embodiment. The process procedures until the determination of the second correction value by means of the expected value table 224 and the determination table 225 follows to the principles of the first embodiment.

The vertical position table 253C has data about amplification coefficients determined in response to the vertical positions of the pixels. The second corrector 218C uses the vertical position table 253C to amplify the second correction values in response to the vertical positions of the pixels, which are read from the R frame image signal SRn(2). For example, the second corrector 218C multiplies the second correction value by a coefficient of "1" for a pixel on the gate line $L_1$ on which the second scanning operation starts relatively early. The second corrector 218C also multiplies the second correction value by a coefficient larger "1" for a pixel on the gate line $L_{2t}$ on which the second scanning operation starts relatively late. As a result, a drive luminance value having a value far from the target luminance value defined by the R frame image signal SRn(2) is set for a pixel on the gate line $L_{2t}$ on which the second scanning operation starts relatively later. Therefore, like the third embodiment, the crosstalk in areas where the start timing of the second scanning operation is late is appropriately decreased.

The control in response to the vertical positions described in the context of the third and fourth embodiments may be achieved even by means of other methods. For example, the second corrector may include a different expected value table every vertical position.

(Fifth Embodiment)

The luminance value, which the pixel achieves when the second scanning operation starts, are affected by not only the vertical positions but also a luminance value, which the pixel achieves when the first scanning operation starts (i.e., the luminance value, which the pixel achieves in display of a preceding frame image). Control in light of the luminance value, which the pixel achieves when the first scanning operation starts, is described in the present embodiment.

Figure 29:
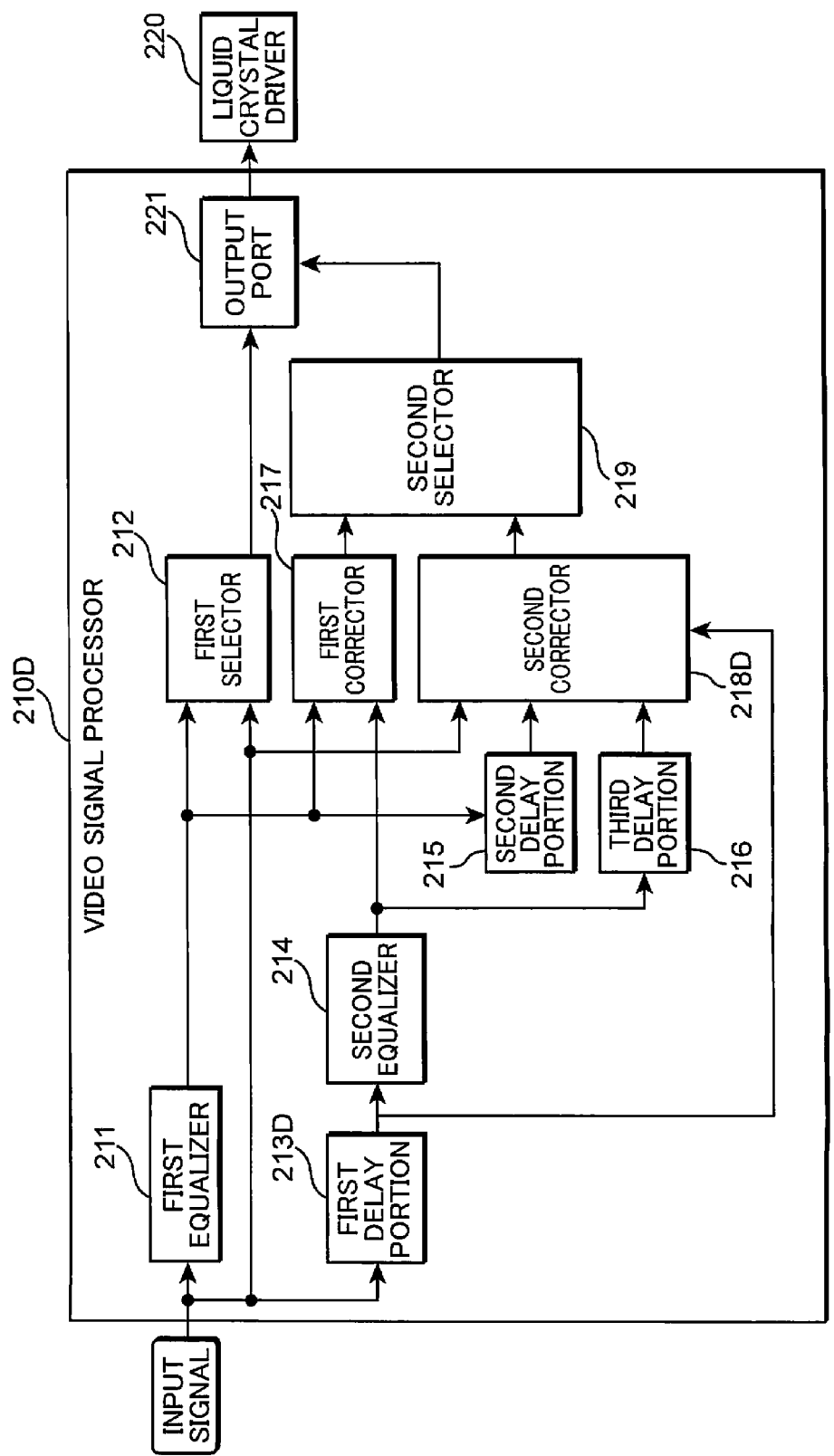
FIG. 29 is a schematic block diagram of a video signal processor used in a video viewing system and a display device according to the fifth embodiment.

FIG. 29 is a schematic block diagram of a video signal processor used in a video viewing system and a display device according to the fifth embodiment. Components other than the video signal processor are the same as the components described in the context of the first embodiment. The same reference symbols are assigned to the same components as those of the first embodiment. The descriptions in the context of the first embodiment are appropriately applied to components which are not described below. The video signal processor of the video viewing system and the display device according to the fifth embodiment is described with reference to FIG. 29.

The video signal processor 210D of the video viewing system and the display device according to the fifth embodiment has a first delay portion 213D and a second corrector 218D, in addition to the first equalizer 211, the first selector 212, the second equalizer 214, the second delay portion 215, the third delay portion 216, the first corrector 217, the second selector 219 and the output port 221, which are the same as those of the first embodiment. The first delay portion 213D outputs an image signal of a preceding frame to not only the second equalizer 214 but also the second corrector 218D unlike the first embodiment. The second corrector 218D uses an output signal from the first delay portion 213D to determine an expected value. The second corrector 218D adjusts the expected values in response to the vertical positions of the pixels according to the principles described in the context of the third and fourth embodiments.

Control of the video signal processor 210D on the first scanning operation is the same as the control described in the context of the first embodiment. The control of the video signal processor 210D on the second scanning operation is described hereinafter.

Figure 30:
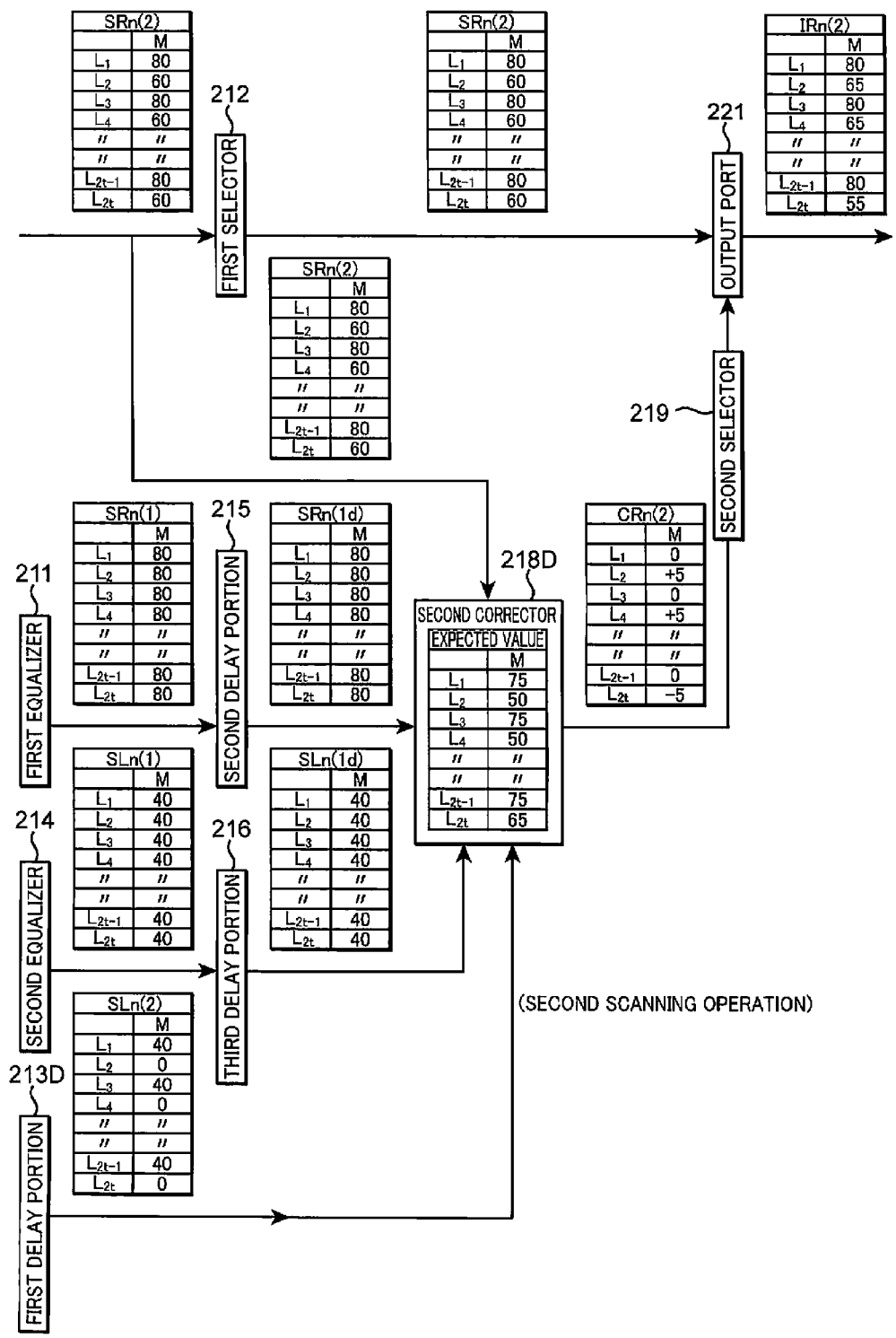
FIG. 30 is a schematic block diagram showing luminance data included in signals which the video signal processor depicted in FIG. 29 outputs in a second scanning period.

FIG. 30 shows luminance data included in signal outputs in the second scanning operation for displaying the N-th R frame image. Changes in the luminance data during the second scanning period are described with reference to FIGS. 1, 29 and 30. Tables in FIG. 30 show luminance values of the pixels aligned along the data line M.

Like the first embodiment, the N-th R frame image signal SRn(2) is input to the first selector 212 and the second corrector 218D. The first selector 212 outputs the R frame image signal SRn(2) to the output port 221 in the second scanning period. The R frame image signal SRn(2) defines luminance values of "80" for the pixels on the odd-numbered gate lines $L_1$, $L_3$, . . . , and $L_{2t-1}$ (where t is a natural number) and luminance values of "60" for the pixels on the even-numbered gate lines $L_2$, $L_4$, . . . , and $L_{2t}$ (where t is a natural number).

As described above, the first delay portion 213D outputs the N-th L frame image signal SLn(2) to the second corrector 218D in the second scanning period. The L frame image signal SLn(2) defines luminance values of "40" for the pixels on the odd-numbered gate lines $L_1$, $L_3$, . . . , and $L_{2t-1}$ (where t is a natural number) and luminance values of "0" for the pixels on the even-numbered gate lines $L_2$, $L_4$, . . . , and $L_{2t}$ (where t is a natural number).

Like the first embodiment, the second delay portion 215 outputs the equalizing signal SRn(1d), which is generated in response to the R frame image signal SRn(2), to the second corrector 218D. The equalizing signal SRn(1d) defines luminance values of "80" for all pixels on the data line M.

Like the first embodiment, the third delay portion 216 outputs the equalizing signal SLn(1d), which is generated in response to the L frame image signal SLn(2), to the second corrector 218D. The equalizing signal SLn(1d) defines luminance values of "40" for all pixels on the data line M.

The second corrector 218D refers to the luminance values defined by L frame image signal SLn(2), which is output from the first delay portion 213D. Unlike the first embodiment, the luminance values, which the L frame image signal SLn(2) defines for the pixels on the even-numbered gate lines $L_2$, $L_4$, . . . , and $L_{2t}$ (where t is a natural number), are much lower than the luminance values which the L frame image signal SLn(2)

defines for the pixels on the odd-numbered gate lines $L_1$, $L_3$, ..., and $L_{2t-1}$ (where t is a natural number). Thus, it is expected that the luminance value, which the pixels on the even-numbered gate lines $L_2$, $L_4$, ..., and $L_{2t}$ (where t is a natural number) achieve at the start of the second scanning operation, are lower than the luminance value, which the pixels on the odd-numbered gate lines $L_1$, $L_3$, ..., and $L_{2t-1}$ (where t is a natural number) achieve at the start of the second scanning operation. Therefore, the second corrector 218D determines expected values, which are smaller than the expected values determined for the pixels on the odd-numbered gate lines $L_1$, $L_3$, ..., and $L_{2t-1}$ (where t is a natural number), for the pixels on the even-numbered gate lines $L_2$, $L_4$, ..., and $L_{2t}$ (where t is a natural number).

The second corrector 218D adjusts the expected values in response to the positions of the pixels, as described in the context of the third and fourth embodiments. Thus, the second corrector 218D sets the expected values of "50" for the pixels on the even-numbered gate line $L_2$ in the upper portion of the liquid crystal panel 231 and the expected values of "65" for the pixels on the even-numbered gate line $L_{2t}$ in the lower portion of the liquid crystal panel 231. In the present embodiment, the second corrector 218D sets the expected values of "75" for all pixels on the odd-numbered gate lines $L_1$, $L_3$, ..., and $L_{2t-1}$ (where t is a natural number) for clarification of the descriptions. The second corrector 218D may perform the adjustment in response to the positions of the pixels, as described in the context of the third and fourth embodiments, even on the pixels on the odd-numbered gate lines $L_1$, $L_3$, ..., and $L_{2t-1}$ (where t is a natural number).

As described above, the R frame image signal SRn(2) defines the luminance values of "60" for the pixels on the even-numbered gate lines $L_2$, $L_4$, ..., and $L_{2t}$ (where t is a natural number). The second corrector 218D sets expected values of "50" for the pixels on the even-numbered gate line $L_2$ positioned at the upper portion of the liquid crystal panel 231. Therefore, the second corrector 218D compares the luminance values of "60" with the expected values of "50" to determine second correction values of "+5" for the pixels on the even-numbered gate line $L_2$ positioned at the upper portion of the liquid crystal panel 231.

As described above, the second corrector 218D sets expected values of "65" for the pixels on the even-numbered gate line $L_{2t}$ positioned at the lower portion of the liquid crystal panel 231. Therefore, the second corrector 218D compares the luminance values of "60" with the expected values of "65" to determine second correction values of "−5" for the pixels on the even-numbered gate line $L_{2t}$ positioned at the lower portion of the liquid crystal panel 231.

Like the first embodiment, the second corrector 218D outputs the second correction signal CRn(2), which includes information about the second correction values, to the second selector 219. The output port 221 generates and outputs the second image signal IRn(2), like the first embodiment. The generated second image signal IRn(2) defines the drive luminance values of "80" for all pixels on the odd-numbered gate lines $L_1$, $L_3$, ..., and $L_{2t-1}$ (where t is a natural number). The second image signal IRn(2) further defines the drive luminance values of "65" for the pixels on the even-numbered gate line $L_2$ positioned at the upper portion of the liquid crystal panel 231. The second image signal IRn(2) also defines the drive luminance values of "55" for the pixels on the even-numbered gate line $L_{2t}$ positioned at the lower portion of the liquid crystal panel 231.

Figure 31:
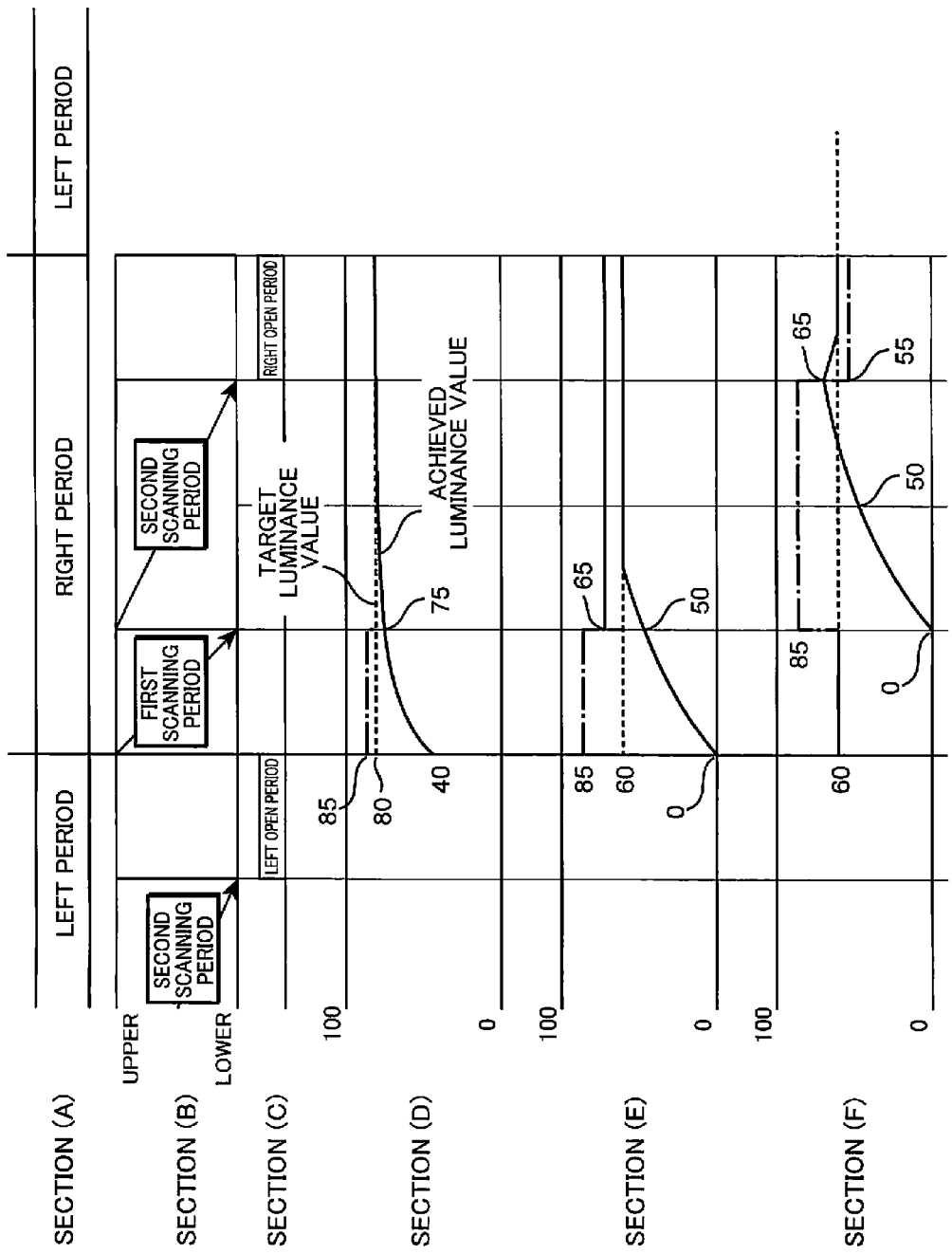
FIG. 31 is a timing chart schematically showing changes in luminance of pixels of the video viewing system and the display device according to the fifth embodiment.
Figure 32:
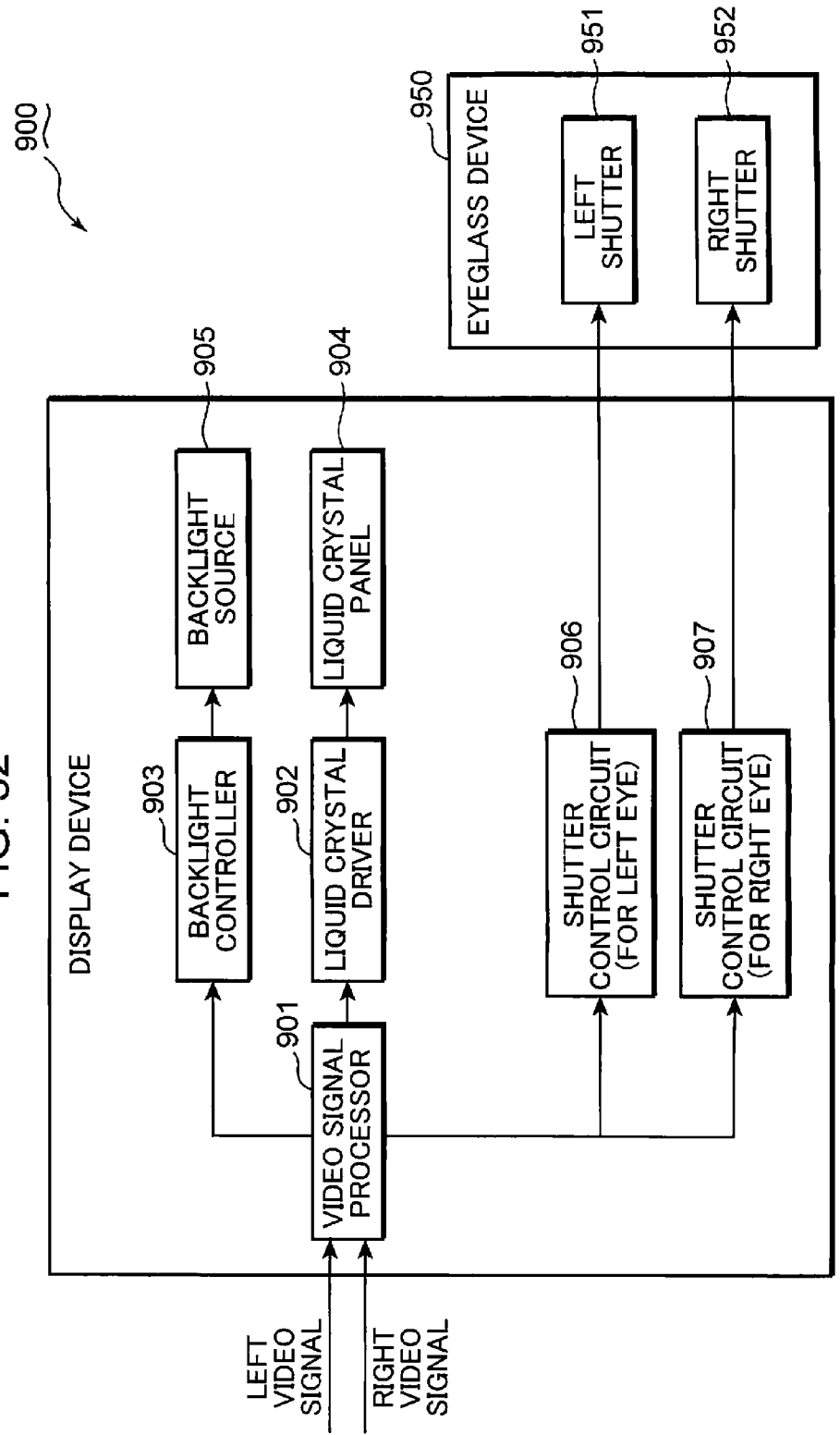
FIG. 32 is a block diagram showing a configuration of a conventional video viewing system.
Figure 33:
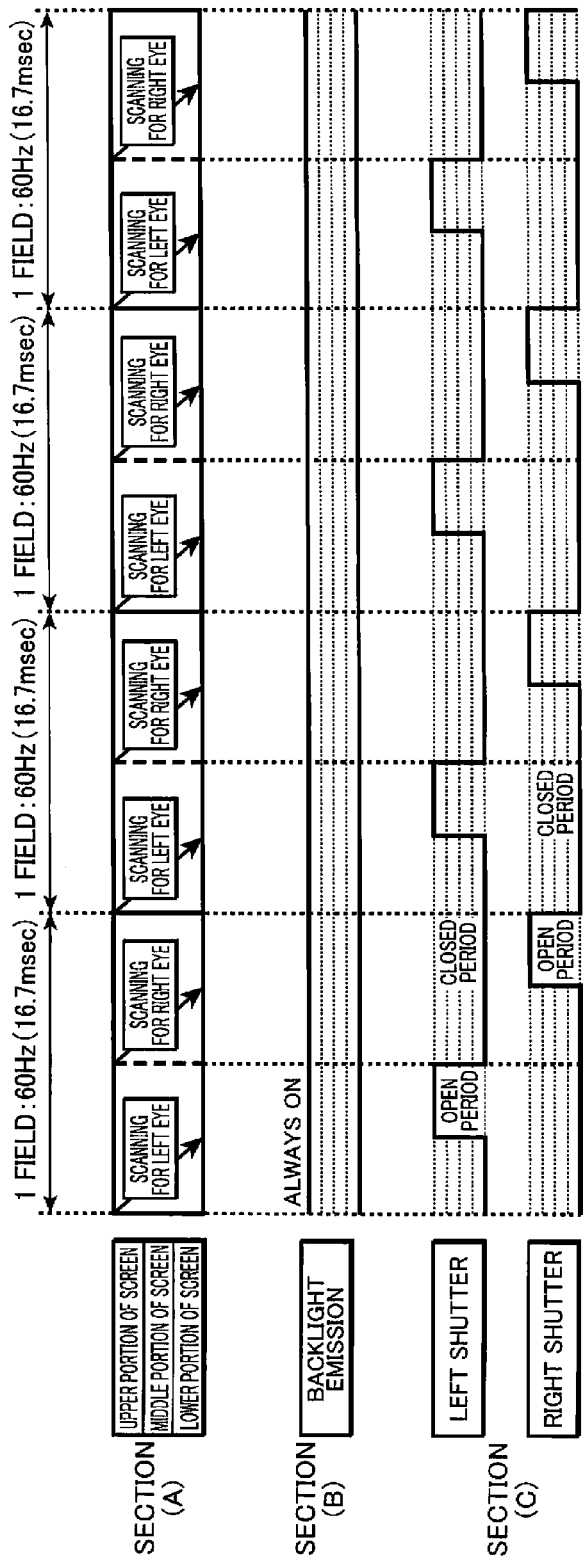
FIG. 33 is a control timing chart showing a control of the conventional video viewing system.
Figure 34:
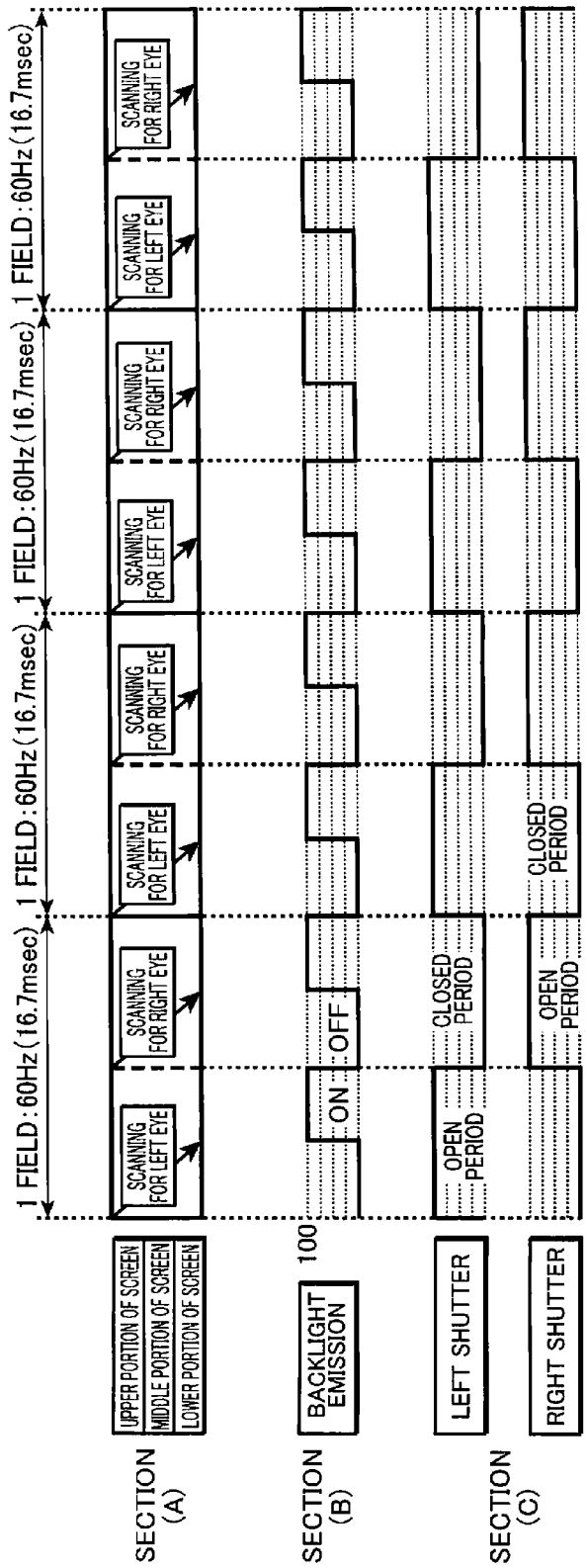
FIG. 34 is another control timing chart showing a control of the conventional video viewing system.

FIG. 31 is a schematic timing chart showing changes in luminance of pixels by means of the signal process described with reference to FIG. 30. The changes in the luminance of the pixels are described with reference to FIG. 21 and FIGS. 29 to 31.

The sections (A) to (D) of FIG. 31 are similar to the sections (A) to (D) of FIG. 21. The section (E) of FIG. 31 shows a change in luminance of a pixel on the even-numbered gate line $L_2$ in the upper portion of the liquid crystal panel 231. The section (F) of FIG. 31 shows a change in luminance of a pixel on the even-numbered gate line $L_{2t}$ in the lower portion of the liquid crystal panel 231.

Since the luminance values which the preceding L frame image signal SLn(2) defines for the pixels on the even-numbered gate lines $L_2$, $L_4$, ..., and $L_{2t}$ (where t is a natural number) are "0", the luminance values of the pixels on the even-numbered gate lines $L_2$, $L_4$, ..., and $L_{et}$ (where t is a natural number) starts changing from "0" in the first scanning operation of the N-th right period. Since the drive luminance values of "85" are set for all pixels on the data line M like the first embodiment, the liquid crystals corresponding to the pixels on the even-numbered gate lines $L_2$, $L_{2t}$ in the upper and lower portions of the liquid crystal panel 231 are driven toward the drive luminance value of "85". Thus, the pixels on the even-numbered gate line $L_2$ in the upper portion of the liquid crystal panel 231 achieve the drive luminance value of "50" when the second scanning operation starts. Meanwhile, since the liquid crystals corresponding to the pixels on the even-numbered gate line $L_{2t}$ positioned at the lower portion of the liquid crystal panel 231 are driven toward the drive luminance value of "85" over a period longer than that for the liquid crystals corresponding to the pixels on the even-numbered gate line $L_2$ positioned at the upper portion of the liquid crystal panel 231, the pixels on the even-numbered gate line $L_{et}$ positioned at the lower portion of the liquid crystal panel 231 achieve the drive luminance value of "65" when the second scanning operation starts.

Since the second image signal IRn(2) defines the drive luminance values of "65" for the pixels on the even-numbered gate line $L_2$ in the upper portion of the liquid crystal panel 231, the pixels on the even-numbered gate line $L_2$ in the upper portion of the liquid crystal panel 231 increases the luminance value in the second scanning period. As a result, the pixels on the even-numbered gate line $L_2$ in the upper portion of the liquid crystal panel 231 are close to the target luminance values of "60" defined by the R frame image signal SRn(2).

Since the second image signal IRn(2) defines the drive luminance values of "55" for the pixels on the even-numbered gate line $L_{2t}$ in the lower portion of the liquid crystal panel 231, the pixels on the even-numbered gate line $L_{2t}$ in the lower portion of the liquid crystal panel 231 reduce the luminance values in the second scanning period. As a result, the pixels on the even-numbered gate line $L_{2t}$ in the lower portion of the liquid crystal panel 231 are close to the target luminance values of "60" defined by the R frame image signal SRn(2).

Thus, the control in light of the luminance value of the pixels at the beginning of the right period and the pixel positions are achieved in the fifth embodiment, which results in stably decreased crosstalk regardless of frame image conditions and pixel positions.

In the aforementioned various embodiments, the drive luminance value for driving the liquid crystal are set in response to various factors such as a luminance level of a preceding frame image or a position of a pixel. In addition to the various factors used for setting the drive luminance value, other factors may be considered. For example, other influential factors on a temperature distribution and/or response speeds of the liquid crystals or luminance values of the pixels may be used for setting the drive luminance value.

The crosstalk of stereoscopic images in which the L and R frame images are alternately displayed is described in a series of the aforementioned embodiments. The principles described in the context of the aforementioned embodiments are applied even to several frame images of a video, which is two-dimensionally perceived. Crosstalk on a two-dimensional image resulting from a luminance value difference between a preceding frame image and a subsequent frame image is appropriately reduced by the principles described in the context of the aforementioned embodiments.

The aforementioned various embodiments are merely illustrative. Therefore, the principles of the aforementioned embodiments are not limited by components disclosed in the detailed descriptions and the drawings. It may be easily understood that those skilled in the art may conduct various modifications, combinations, and omission within the scope of the principle of the aforementioned embodiments.

The aforementioned specific embodiments mainly have a display device and a video viewing system with the following configurations.

According to one aspect of the present invention, a display device includes: a liquid crystal panel including a display surface on which frame images are displayed; a conversion portion configured to convert a frame image signal to display the frame image into a first image signal representing an image having a resolution lower than what the frame image signal represents and a second image signal representing an image having a resolution higher than what the first image signal represents; and a liquid crystal driver configured to drive the liquid crystal panel with performing a first scanning operation of the first image signal and a second scanning operation of the second image signal over pixels of the entire display surface, wherein the liquid crystal driver performs the second scanning operation with targeting a drive luminance value, which is determined in response to an expected value of an achieved luminance value during the first scanning operation for the pixel before the second scanning operation commences and a target luminance value defined for the pixel by the frame image signal.

According to the aforementioned configuration, the liquid crystal panel displays the frame images on the display surface. The conversion portion converts the frame image signal for displaying the frame image into the first image signal representing an image having a resolution lower than what the frame image signal represents and a second image signal representing an image having a resolution higher than what the first image signal represents. The liquid crystal driver performs the first scanning operation to scan the pixels over the entire display surface by means of the first image signal. Then, the liquid crystal driver performs the second scanning operation to scan the pixels over the entire display surface by means of the second image signal. Since the first scanning operation by means of the first image signal representing the image having the resolution lower than what the frame image signal represents is achieved in a shorter period than the second scanning operation, the period for performing the second scanning operation is appropriately secured. It is started early to drive the liquid crystal panel over the display surface, which results in decreased crosstalk, in particular, in an area of the display surface where the second scanning operation is performed at a relatively late timing.

As a result of the first scanning operation on the pixels of the display surface, the drive luminance value is set in response to the expected value of the achieved luminance value before the second scanning operation commences and the target luminance value which the frame image signal defines for the pixel. The liquid crystal driver drives the liquid crystal corresponding to the pixel with targeting the drive luminance value. Since the drive luminance value is adjusted in response to the expected value of the achieved luminance value and the target luminance value, the resolution reduction process for the first scanning operation becomes less influential on the displayed frame image.

In the aforementioned configuration, the frame images may include a left frame image, which is viewed by a left eye, and a right frame image, which is viewed by a right eye, and the liquid crystal panel alternately switches between the left and right frame images with time so as to make displayed images stereoscopically perceived on the display surface.

According to the above configuration, the liquid crystal panel alternately switches between the left and right frame images, which are viewed by the left and right eyes, respectively, to make the displayed images stereoscopically perceived on the display surface. A viewer may view stereoscopic images with reduced crosstalk, in particular, in an area of the display surface where the second scanning operation is performed at a relatively late timing.

In the aforementioned configuration, the display surface may include a pixel group including pixels aligned in a sub-scan direction, the conversion portion generates an equalizing signal, which defines a common equalized luminance value to the pixel group, in response to the frame image signal, and the liquid crystal driver simultaneously performs the first scanning operation for the pixels in the pixel group in response to the equalized luminance value.

According to the aforementioned configuration, the display surface has the pixel group including the pixels aligned in the sub-scan direction. The conversion portion generates the equalizing signal, which defines the common equalized luminance value to the pixel group in response to the frame image signal. The liquid crystal driver, which performs the first scanning operation, simultaneously drives the liquid crystals corresponding to the pixels in the pixel group in response to the equalized luminance value. Since the first scanning period becomes relatively short, the period for performing the second scanning operation is appropriately secured. It is started early to drive the liquid crystal panel over the display surface, which results in decreased crosstalk, in particular, in an area of the display surface where the second scanning operation is performed at a relatively late timing.

In the above configuration, the equalizing signal may define an averaged luminance value over luminance values which the frame image signal defines for the pixels in the pixel group, respectively, to allocate the averaged luminance value to the pixels in the pixel group, respectively.

According to the above configuration, the equalizing signal defines an averaged luminance value over luminance values which the frame image signal defines for the pixels in the pixel group to assign the averaged luminance value to the pixels in the pixel group, respectively. The liquid crystal driver simultaneously performs the first scanning operation for the pixels in the pixel group. Since the first scanning period becomes relatively short, the period for performing the second scanning operation is appropriately secured. It is started early to drive the liquid crystal panel over the display surface, which results in decreased crosstalk, in particular, in an area of the display surface where the second scanning operation is performed at a relatively late timing. Since the averaged luminance value is defined, the luminance values which are defined for all the pixels of the group may not be largely deviated from the luminance values which the frame image signal defines.

In the aforementioned configuration, the equalizing signal may allocates luminance values to the pixels in the pixel group so that the allocated luminance value is equivalent to a luminance value which the frame image signal defines for a pixel selected from the pixels in the pixel group.

According to the above configuration, the equalizing signal allocates luminance values to the pixels in the pixel group so that the allocated luminance value is equivalent to a luminance value which the frame image signal defines for a pixel selected from the pixels in the pixel group. The liquid crystal driver performs the first scanning operation simultaneously for the pixels in the pixel group. Since the first scanning period becomes relatively short, the period for performing the second scanning operation is appropriately secured. It is started early to drive the liquid crystal panel over the display surface, which results in decreased crosstalk, in particular, in an area of the display surface where the second scanning operation is performed at a relatively late timing. Since the selected luminance value is defined, the luminance value which the frame image signal defines is allocated at least to the selected pixel.

In the aforementioned configuration, a first scanning period during which the first scanning operation is performed by means of the first image signal over the pixels of the entire display surface is shorter than a second scanning period during which the second scanning operation is performed by means of the second image signal over the pixels of the entire display surface.

According to the aforementioned configuration, since the first scanning period during which the first scanning operation is performed by means of the first image signal over the pixels of the entire display surface is shorter than the second scanning period during which the second scanning operation is performed over the pixels of the entire display surface, the period for performing the second scanning operation is appropriately secured.

In the aforementioned configuration, the conversion portion may set the expected value of the achieved luminance value in response to a current luminance value of the pixel defined by the equalizing signal corresponding to a frame image of ongoing display, and a preceding luminance value of the pixel defined by the equalizing signal corresponding to a preceding frame image which was displayed immediately before the frame image of the ongoing display.

According to the above configuration, since the conversion portion sets the expected value of the achieved luminance value in response to the current luminance value of the pixel defined by the equalizing signal corresponding to the frame image of the ongoing display and the preceding luminance value of the pixels defined by the equalizing signal corresponding to the preceding frame image displayed just before the frame image of the ongoing display, the expected value become appropriate value. Since the drive luminance value is adjusted in response to the appropriately set expected value of the achieved luminance value and the target luminance value, the resolution reduction process for the first scanning operation becomes less influential on the displayed frame image.

In the aforementioned configuration, the conversion portion may set the expected values of the achieved luminance value in response to a sub-scan directional position of the pixel.

According to the above configuration, since the conversion portion sets the expected value of the achieved luminance value in response to the sub-scan directional position of the pixel, suitable luminance value control is achieved over the entire display surface.

In the aforementioned configuration, the conversion portion may set the drive luminance value by means of a first table including first data to determine the drive luminance value in response to the current luminance value and the preceding luminance value.

According to the above configuration, the conversion portion sets the drive luminance value by means of the first table including the first data representing the drive luminance value corresponding to the current luminance value and the preceding luminance value. Therefore, the setting process for the drive luminance value by the conversion portion is simplified.

In the aforementioned configuration, the conversion portion may set the drive luminance value so that a difference between the drive luminance value and the target luminance value increases as a difference between the expected value of the achieved luminance value and the target luminance value increases.

According to the aforementioned configuration, the conversion portion sets the drive luminance value so that the difference between the drive luminance value and the target luminance value increases as the difference between the expected value of the achieved luminance value and the target luminance value increases. Since the luminance value of the pixel is largely adjusted in the second scanning period as the difference between the expected value of the achieved luminance value and the target luminance value increases in the first scanning period, the pixel may achieve the target luminance value relatively early, which results in decreased crosstalk in the frame image.

In the aforementioned configuration, the conversion portion may set the drive luminance value in response to a sub-scan directional position of the pixel.

According to the aforementioned configuration, since the conversion portion sets the drive luminance value in response to the sub-scan directional position of the pixel, appropriate luminance value control is achieved over the entire display surface.

In the aforementioned configuration, the conversion portion may set the drive luminance value in response to the target luminance value for the pixel defined by the frame image signal corresponding to a preceding frame image which was displayed immediately before a frame image of ongoing display.

According to the above configuration, since the drive luminance value may be set for the pixel in response to the target luminance value defined by the frame image signal corresponding to the preceding frame image displayed immediately before the frame image of ongoing display, the preceding frame image signal becomes less influential.

In the aforementioned configuration, the conversion portion may the drive luminance value by means of a second table including second data to determine the drive luminance value in response to the expected value of the achieved luminance value and the target luminance value.

According to the aforementioned configuration, since the conversion portion sets the drive luminance value by means of the second table including second data to determine the drive luminance value in response to the expected value of the achieved luminance value and the target luminance value, the setting process of the drive luminance value by the conversion portion is simplified.

In the aforementioned configuration, the second table may include an expected value table which stores expected value data about the expected value of the achieved luminance value, and a determination table to determine the drive luminance value in response to the expected value data and the target luminance value.

According to the aforementioned configuration, the second table includes the expected value table which stores expected value data about the expected value of the achieved luminance value, and the determination table to determine the drive luminance value in response to the expected value data and the target luminance value. Therefore, the setting process of the drive luminance value by the conversion portion is simplified.

According to another aspect of the present invention, a video viewing system includes: a display device configured to display a left frame image, which is viewed by a left eye, and a right frame image, which is viewed by a right eye, so as to provide images which are stereoscopically perceived; and an eyeglass device including a left filter, which adjusts a light amount that reaches the left eye so that the left frame image is viewed, and a right filter, which adjusts a light amount that reaches the right eye so that the right frame image is viewed, wherein the display device includes a liquid crystal panel which alternately displays the left and right frame images on a display surface with time, a conversion portion configured to convert a frame image signal to display the left or right frame image into a first image signal representing an image having a resolution lower than what the frame image signal represents and a second image signal representing an image having a resolution higher than what the first image signal represents, and a liquid crystal driver configured to drive the liquid crystal drive panel with performing a first scanning operation of the first image signal and a second scanning operation of the second image signal over pixels of the entire display surface, and the liquid crystal driver performs the second scanning operation with targeting a drive luminance value, which is determined in response to an expected value of an achieved luminance value during the first scanning operation for the pixel before the second scanning operation commences and a target luminance value defined for the pixel by the frame image signal.

According to the above configuration, the display device displays the left and right frame images, which is viewed by the left and right eyes, respectively. The left filter of the eyeglass device adjusts the light amount which reaching the left eye so that the left frame image is viewed. The right filter of the eyeglass device adjusts the light amount which reaches the right eye so that the left frame image is viewed. The liquid crystal panel alternately displays the left and right frame images, which are viewed by the left and right eyes, respectively, on a display surface. Therefore, the viewer may stereoscopically perceive the images provided by the display device.

The conversion portion converts the frame image signal for displaying the left or right frame image into the first image signal representing images having resolutions lower than what the frame image signal represents and a second image signal representing images having resolutions higher than the first image signal represents. The liquid crystal driver performs the first scanning operation for scanning the pixels over the entire display surface by means of the first image signal. Then, the liquid crystal driver performs the second scanning operation for scanning the pixels over the entire display surface by means of the second image signal. Since the first scanning operation by means of the first image signal representing images having the resolutions lower than what the frame image signal represents is achieved in a shorter period than the second scanning operation, the period for performing the second scanning operation is appropriately secured. It is started early to drive the liquid crystal panel over the display surface, which results in decreased crosstalk, particularly, in an area of the display surface where the second scanning operation is performed at a relatively late timing.

As a result of the first scanning operation on the pixels of the display surface, the drive luminance value is set in response to the expected value of the achieved luminance value before the second scanning operation commences and the target luminance value which the frame image signal defines for the pixel. The liquid crystal driver drives the liquid crystal corresponding to the pixel with targeting the drive luminance value. Since the drive luminance value is adjusted in response to the expected value of the achieved luminance value and the target luminance value, the resolution reduction process for the first scanning operation becomes less influential on the displayed frame image.

The principles of the present embodiments are appropriate for a display device and a video viewing system to cause little crosstalk.

This application is based on Japanese Patent application No. 2010-290202 filed in Japan Patent Office on Dec. 27, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A display device comprising:
a liquid crystal panel including a display surface on which frame images are displayed;
a conversion portion configured to convert a frame image signal to display the frame image into a first image signal representing an image having a resolution lower than what the frame image signal represents and a second image signal representing an image having a resolution higher than what the first image signal represents; and
a liquid crystal driver configured to drive the liquid crystal panel with performing a first scanning operation of the first image signal and a second scanning operation of the second image signal over pixels of the entire display surface, wherein
the liquid crystal driver performs the second scanning operation with targeting a drive luminance value, which is determined in response to an expected value of an achieved luminance value during the first scanning operation for the pixel before the second scanning operation commences and a target luminance value defined for the pixel by the frame image signal.

2. The display device according to claim 1, wherein
the frame images include a left frame image, which is viewed by a left eye, and a right frame image, which is viewed by a right eye, and
the liquid crystal panel alternately switches between the left and right frame images with time so as to make displayed images stereoscopically perceived on the display surface.

3. The display device according to claim 1, wherein
the display surface has a pixel group including pixels aligned in a sub-scan direction,
the conversion portion generates an equalizing signal, which defines a common equalized luminance value to the pixel group, in response to the frame image signal, and the liquid crystal driver simultaneously performs the first scanning operation for the pixels in the pixel group in response to the equalized luminance value.

4. The display device according to claim 3, wherein the equalizing signal defines an averaged luminance value over luminance values which the frame image signal defines for the pixels in the pixel group, respectively, to allocate the averaged luminance value to the pixels in the pixel group, respectively.

5. The display device according to claim 3, wherein the equalizing signal allocates a luminance value to the pixels in the pixel group so that the allocated luminance value is equivalent to a luminance value which the frame image signal defines for a pixel selected from the pixels in the pixel group.

6. The display device according to claim 1, wherein a first scanning period during which the first scanning operation is performed by means of the first image signal over the pixels of the entire display surface is shorter than a second scanning period during which the second scanning operation is performed by means of the second image signal over the pixels of the entire display surface.

7. The display device according to claim 3, wherein the conversion portion sets the expected value of the achieved luminance value in response to a current luminance value of the pixel defined by the equalizing signal corresponding to a frame image of ongoing display, and a preceding luminance value of the pixel defined by the equalizing signal corresponding to a preceding frame image which was displayed immediately before the frame image of the ongoing display.

8. The display device according to claim 7, wherein the conversion portion sets the expected values of the achieved luminance value in response to a sub-scan directional position of the pixel.

9. The display device according to claim 7, wherein the conversion portion sets the drive luminance value by means of a first table including first data to determine the drive luminance value in response to the current luminance value and the preceding luminance value.

10. The display device according to claim 1, wherein the conversion portion sets the drive luminance value so that a difference between the drive luminance value and the target luminance value increases as a difference between the expected value of the achieved luminance value and the target luminance value increases.

11. The display device according to claim 1, wherein the conversion portion sets the drive luminance value in response to a sub-scan directional position of the pixel.

12. The display device according to claim 1, wherein the conversion portion sets the drive luminance value in response to the target luminance value for the pixel defined by the frame image signal corresponding to a preceding frame image which was displayed immediately before a frame image of ongoing display.

13. The display device according to claim 12, wherein the second table includes an expected value table which stores expected value data about the expected value of the achieved luminance value, and a determination table to determine the drive luminance value in response to the expected value data and the target luminance value.

14. The display device according to claim 1, wherein the conversion portion sets the drive luminance value by means of a second table including second data to determine the drive luminance value in response to the expected value of the achieved luminance value and the target luminance value.

15. A video viewing system comprising:
a display device configured to display a left frame image, which is viewed by a left eye, and a right frame image, which is viewed by a right eye, so as to provide images which are stereoscopically perceived; and
an eyeglass device including a left filter, which adjusts a light amount that reaches the left eye so that the left frame image is viewed, and a right filter, which adjusts a light amount that reaches the right eye so that the right frame image is viewed, wherein
the display device includes
a liquid crystal panel which alternately displays the left and right frame images on a display surface with time,
a conversion portion configured to convert a frame image signal to display the left or right frame image into a first image signal representing an image having a resolution lower than what the frame image signal represents and a second image signal representing an image having a resolution higher than what the first image signal represents, and
a liquid crystal driver configured to drive the liquid crystal drive panel with performing a first scanning operation of the first image signal and a second scanning operation of the second image signal over pixels of the entire display surface, and
the liquid crystal driver performs the second scanning operation with targeting a drive luminance value, which is determined in response to an expected value of an achieved luminance value during the first scanning operation for the pixel before the second scanning operation commences and a target luminance value defined for the pixel by the frame image signal.

* * * * *